United States Patent
Yan et al.

(10) Patent No.: US 12,529,037 B2
(45) Date of Patent: Jan. 20, 2026

(54) M1 VIRUS MUTANT AND USE THEREOF

(71) Applicant: GUANGZHOU VIROTECH PHARMACEUTICAL CO., LTD., Guangzhou (CN)

(72) Inventors: Guangmei Yan, Guangzhou (CN); Yuan Lin, Guangzhou (CN); Li Guo, Guangzhou (CN); Ziqing Lin, Guangzhou (CN); Guang'en Wu, Guangzhou (CN)

(73) Assignee: GUANGZHOU VIROTECH PHARMACEUTICAL CO., LTD., Guangzhou (CN)

( * ) Notice: Subject to any disclaimer, the term of this patent is extended or adjusted under 35 U.S.C. 154(b) by 973 days.

(21) Appl. No.: 17/595,889

(22) PCT Filed: May 31, 2020

(86) PCT No.: PCT/CN2020/093642
§ 371 (c)(1),
(2) Date: Nov. 29, 2021

(87) PCT Pub. No.: WO2020/239118
PCT Pub. Date: Dec. 3, 2020

(65) Prior Publication Data
US 2022/0315903 A1 Oct. 6, 2022

(30) Foreign Application Priority Data
May 31, 2019 (CN) .......................... 201910472439.7

(51) Int. Cl.
| | | |
|---|---|---|
| C12N 7/00 | (2006.01) | |
| A61K 35/768 | (2015.01) | |
| A61K 45/06 | (2006.01) | |
| A61P 35/00 | (2006.01) | |
| C07K 14/005 | (2006.01) | |
| C07K 14/11 | (2006.01) | |
| C12N 15/86 | (2006.01) | |

(52) U.S. Cl.
CPC .............. *C12N 7/00* (2013.01); *A61K 35/768* (2013.01); *A61K 45/06* (2013.01); *A61P 35/00* (2018.01); *C07K 14/005* (2013.01); *C07K 14/11* (2013.01); *C12N 15/86* (2013.01); *C12N 2770/36121* (2013.01); *C12N 2770/36122* (2013.01); *C12N 2770/36143* (2013.01)

(58) Field of Classification Search
None
See application file for complete search history.

(56) References Cited

U.S. PATENT DOCUMENTS

2017/0073377 A1   3/2017   Nabel et al.

FOREIGN PATENT DOCUMENTS

| CN | 104814984 A | 8/2015 |
|---|---|---|
| CN | 105456302 A | 4/2016 |
| CN | 106177955 A | 12/2016 |
| CN | 104814984 B | 9/2017 |
| CN | 107349226 A | 11/2017 |
| CN | 107456463 A | 12/2017 |
| CN | 108606982 A | 10/2018 |
| CN | 108686221 A | 10/2018 |
| CN | 109207491 A | 1/2019 |
| JP | 2017526612 A | 9/2017 |
| WO | 2016149643 A2 | 9/2016 |
| WO | 2018006005 A1 | 1/2018 |

OTHER PUBLICATIONS

Lundstrom et al., Front Mol Biosci, Apr. 14, 2022, 9:864981, 9 pages (Year: 2022).*
Greenman C, et al. "Patterns of somatic mutation in human cancer genomes." Nature 446: 153-158, 2007, Nature. Author manuscript; available in PMC Jul. 20, 2009, pp. 1-16 in pdf.
Wood LD, et al. "The genomic landscapes of human breast and colorectal cancers." Science 318: 1108-1113, 2007.
Pavet V, et al. "Towards novel paradigms for cancer therapy." Oncogene 30: 1-20, 2011.
Workenhe ST et al. "Oncolytic virotherapy and immunogenic cancer cell death: sharpening the sword for improved cancer treatment strategies." Mol Ther 22: 251-256, 2014, accepted manuscript, pp. 1-27 in pdf.
Sun Q, et al. "Nanomedicine and macroscale materials in immuno-oncology." Chemical Society Nov. 22, 2018.
Tran E, et al. "'Final common pathway' of human cancer immunotherapy: targeting random somatic mutations." Nature Immunology Feb. 15, 2017; 18(3): 255-262, Nat Immunol. Author manuscript; available in PMC Dec. 17, 2018, pp. 1-18 in pdf.
Das T, et al. "Chikungunya fever: CNS infection and pathologies of a re-emerging arbovirus." Prog Neurobiol 91: 121-129, 2010.
Kelvin AA. "Outbreak of Chikungunya in the Republic of Congo and the global picture." J Infect Dev Ctries 5: 441-444, 2011.

(Continued)

*Primary Examiner* — Stacy B Chen
(74) *Attorney, Agent, or Firm* — EVENTIDE LAW LLC

(57) ABSTRACT

Provided is an M1 virus. Further provided are a series of uses of said virus. The uses include, but are not limited to, viral vectors, anti-tumor agents, and pharmaceutical compositions. Said virus can effectively inhibit the growth of various tumor cells, and at the same time, has tumor targeting properties and is non-toxic to normal cells. Said virus can be administrated by means of intravenous injection, having operational convenience.

19 Claims, 12 Drawing Sheets

Specification includes a Sequence Listing.

(56) References Cited

OTHER PUBLICATIONS

Moran TP, et al. "Alphaviral vector-transduced dendritic cells are successful therapeutic vaccines against neu-overexpressing tumors in wild-type mice." Vaccine 25: 6604-6612, 2007.
Weaver SC, et al. "Re-emergence of epidemic Venezuelan equine encephalomyelitis in South America." VEE Study Group. Lancet 348: 436-440, 1996.
Li XD, et al. "Isolation of Getah virus from mosquitos collected on Hainan Island, China, and results of a serosurvey." Southeast Asian J Trop Med Public Health 23: 730-734, 1992.
Wen JS, et al. "Genomic analysis of a Chinese isolate of Getah-like virus and its phylogenetic relationship with other Alphaviruses." Virus Genes 35: 597-603, 2007.
Zhai YG, et al. "Complete sequence characterization of isolates of Getah virus (genus *alphavirus*, family Togaviridae) from China." J Gen Virol 89: 1446-1456, 2008.
Rafaluk C, et al. "When experimental selection for virulence leads to loss of virulence." Trends Parasitol. Sep. 2015; 31 (9): 426-34.
Martinez, J.L., et al. "Beyond serial passages:new methods for predicting the emergence of resistance to novel antibiotics." Current Opinion in Pharmacology 2011, 11: 439-445.
Pardoll, D.M., "The blockade of immune checkpoints in cancer immunotherapy." Nat Rev Cancer. ; 12(4): 252-264, Nat Rev Cancer. Author manuscript; available in PMC May 4, 2016, pp. 1-31 in pdf.
First Office action in corresponding Taiwanese Appl. No. 11020878470, mailed Sep. 9, 2021, pp. 1-8 in pdf (English translation included).
Mutso, M., et al., "Mutation of CD2AP and SH3KBP1 Binding Motif in Alphavirus nsP3 Hypervariable Domain Results in Attenuated Virus." Viruses 2018, 10, 226, doi: 10.3390/v10050226, pp. 1-21 in pdf.
Genbank Accession EU015061.1, "Getah virus strain M1, complete genome." May 19, 2008, pp. 1-14 in pdf.
Genbank Accession ATG71347.1, "structural polyprotein [Getah virus]." Oct. 7, 2017, pp. 1-3 in pdf.
Lin, Y., et al., "Identification and characterization of alphavirus M1 as a selective oncolytic virus targeting ZAP-defective human cancers." PNAS Early Edition, Oct. 6, 2014, www.pnas.org/cgi/doi/10.1073/pnas.1408759111, pp. 1-9 in pdf.
China Science and Technology Network. "Chinese scientists discover natural methovirus M1 with selective anti-tumor effects." 2014 (vol. 43), No. 10, vol. 1, www.wokeji.com, Oct. 15, 2014, pp. 1-2 in pdf.
International Search Report for PCT/CN2020/093642, mailed Aug. 31, 2020, pp. 1-11 in pdf.
Written Opinion for PCT/CN2020/093642, mailed Aug. 24, 2020, pp. 1-9 in pdf.
First Office Action for Chinese Application No. 202080040516.2, dated Apr. 27, 2023, pp. 1-14 (including English translation).
First Office Action for German Application No. 112020002641.8, dated Nov. 30, 2022, pp. 1-8 (including English translation).
Herlitze et al., "A general and rapid mutagenesis method using polymerase chain reaction"; Gene, vol. 91, pp. 143-147 (1990).
First Office Action for Australian Application No. 2020285291, dated Feb. 23, 2024, pp. 1-31.
Mazzon et al., "Alphavirus-induced hyperactivation of PI3K/AKT directs pro-viral metabolic changes", PLOS Pathogens, vol. 14, No. 1, pp. 1-22, e1006835, Jan. 29, 2018.
Hawman et al., "Mutations in the E2 Glycoprotein and the 3' Untranslated Region Enhance Chikungunya Virus Virulence in Mice"; Journal of Virology, vol. 91, Issue 20 , e00816-17, pp. 1-17, Oct. 2017.
Second Office action for Australian Application No. 2020285291, dated Sep. 10, 2024, pp. 1-3.
First Office Action for Japan Application No. 2021-571298, dated Dec. 21, 2022, pp. 1-16 (including English translation).
ABX40010, "nonstructural polyprotein [Cloning vector pCHIK-37997ic]", National Center for Biotechnology Information, Nov. 24, 2007, pp. 1-8 (including English translation).
QBB02187, "recombinant envelope protein 2 [synthetic construct]", National Center for Biotechnology Information, pgs. Feb. 13, 2019, 1-6 (including English translation).
ABX40011, "structural polyprotein [Cloning vector pCHIK-37997ic]", National Center for Biotechnology Information, Nov. 24, 2007, pp. 1-8 (including English translation).
Second Office Action for Japanese Patent Application No. 2021-571298, Sep. 11, 2023, pp. 1-6 (including English translation.
First Office Action for Japanese Application No. 2024-039612, dated May 7, 2025, pp. 1-17 (including English translation).
Second Office Action for Japanese Application No. 2024-039612, dated Sep. 4, 2025, pp. 1-6 (including English translation).

\* cited by examiner

A Nucleotide sequencing of sites near the 358th amino acid residue of theNS3 protein

SEQ ID NO: 34
SEQ ID NO: 35
SEQ ID NO: 36
SEQ ID NO: 37
SEQ ID NO: 38

B Nucleotide sequencing of sites near the 4th amino acid residue of the E2 protein

SEQ ID NO: 39
SEQ ID NO: 40
SEQ ID NO: 41
SEQ ID NO: 42
SEQ ID NO: 43

Fig. 1

M1 VIRUS MUTANT AND USE THEREOF

TECHNICAL FIELD

The present disclosure belongs to the field of biological medicines, and particularly relates to an M1 virus mutant and a use thereof.

BACKGROUND ART

Genic and epigenetic accumulated changes in normal cells drive normal cells to change into malignant tumor cells. This complex pathological process determines the diversity of mechanisms in the formation, maintenance, and metastasis of different tumors (1-3). Surgical excision, chemotherapy, and radiotherapy are conventional methods for treating tumors, the surgical excision easily leads to tumor recurrence, and the chemotherapy and the radiotherapy induce great toxic and side effects (4). Targeted therapies and tumor immunotherapy, including IL-2 control, adoptive cell therapy, and regulation of immune checkpoints such as PD-1, that have emerged in recent years have achieved certain effects in clinical treatment. However, the targeted therapies are prone to drug resistance, and the immunotherapy has a low response rate and may lead to serious immune-associated adverse events (5, 6). Therefore, it is urgent to develop more novel anticancer therapies which have low toxicity and high efficacy and difficultly cause drug resistance.

Oncolytic viruses not only kill tumor cells, but also alert a host's immune system of the presence of cancer. Virotherapy is a therapy based on characteristics of the oncolytic viruses that are more likely to attack cancer tissues rather than healthy tissues. In 2005, the China Food and Drug Administration approved the marketing of the first oncolytic virotherapy with a trade name of Oncorine. This is a genetically modified virus that preferentially attack tumor cells and has been used to treat head and neck cancers. In 2015, the U.S. Food and Drug Administration (FDA) approved a melanoma therapy T-VEC that uses genetically modified herpes viruses, and was approved in Australia and the European Union in the following year. In addition, there are also some oncolytic viruses under research. Although, in recent decades, the virotherapy has made great progress, it still faces numerous difficulties.

First, the efficacy is concerned. The oncolytic viruses have a limited anti-tumor effect or anti-tumor spectrum, many oncolytic viruses cannot well inhibit or kill tumor cells, and need to be used in combination with other chemotherapeutic drugs or immune checkpoint inhibitors, or used as a supplement to radiotherapy. For example, an M1 virus disclosed in a Chinese invention patent application 201410425510.3, when used as an anti-tumor drug, has a significantly effect on colorectal cancer, liver cancer, bladder cancer, and breast cancer, has a lower effect on pancreatic cancer, nasopharyngeal carcinoma, prostate cancer, and melanoma, has a much lower effect on a glioma, cervical cancer, and lung cancer, and has the lowest effect on stomach cancer.

Second, the safety is concerned. Certain viruses themselves are dangerous to human bodies, and the dangerous viruses need to be modified and attenuated before being used in the virotherapy. Even if the oncolytic viruses are modified and attenuated, they still can become "escaping viruses", i.e. viruses that change again or are bound to existing pathogens in a patient's body after release to rapidly infect healthy tissues.

Furthermore, the delivery of viruses is concerned. That is, how to deliver viruses to a lesion. In most of the existing oncolytic virotherapies such as the melanoma therapy T-VEC approved by the U.S. Food and Drug Administration (FDA), the oncolytic viruses are injected into a tumor tissue. However, lesions and micrometastases of many solid tumors cannot be injected directly, or non-solid tumors such as hematological tumors are distributed throughout a body without a fixed injection site. It is difficult to adopt the existing virotherapies to treat these types of tumors.

Therefore, the development of oncolytic viruses still poses great challenges.

Alphaviruses belong to the Togaviridae family, which are a class of single positive-stranded RNA viruses with an envelope structure. It is reported in literatures that a Chikungunya virus belonging to the Alphavirus is a pathogenic virus for humans and highly toxic, and causes fever, rash, arthritis, and even fatal encephalitis after infection (7, 8). It is reported that another virus, i.e. a Venezuelan equine encephalitis virus, belonging to the Alphavirus can be used as a vector to transduce dendritic cells so as to treat tumors (9), but this encephalitis virus has caused fever, convulsions, abortion, and even death in humans (10).

M1 virus (Alphavirus M1) belongs to the Alphavirus (Alphavirus). It was isolated from Culex mosquitoes on Hainan Island, China in 1964, and a method for isolating the virus has been disclosed in a literature (11). The M1 virus belongs to Getah-like viruses and its homology with the Getah virus is up to 97.8% (12). In 2008, the whole genome of an M1 strain was sequenced (13). According to the patent CN 201410425510.3, the M1 virus has an oncolytic effect, but the anti-tumor spectrum and anti-tumor strength of existing wild-type M1 viruses need to be improved.

SUMMARY OF THE INVENTION

In some embodiments, an M1 virus is provided. An amino acid residue corresponding to the 358th site of the NS3 protein of the M1 virus is not M; and/or an amino acid residue corresponding to the 4th site of the envelope protein E2 is not E or K.

In some embodiments, the amino acid residue corresponding to the 358th site of the NS3 protein (nonstructural protein 3) of the M1 virus is: G, A, L, I, V, P, S, Q, T, C, N, F, Y, W, D, E, K, R or H; and/or the amino acid residue corresponding to the 4th site of the envelope protein E2 (envelope protein 2) is: M, G, A, L, I, V, P, S, Q, T, C, N, F, Y, W, D, R or H.

In some embodiments, an amino acid sequence of the NS3 protein comprised in the M1 virus has at least 90% or at least 91% or at least 92% or at least 93% or at least 94% or at least 95% or at least 96% or at least 97% or at least 98% or at least 99% or at least 99.5% or at least 99.8% or at least 99.9% or 100% sequence identity (Identity) with an amino acid sequence shown as SEQ ID NO: 8 or SEQ ID NO: 18; and/or an amino acid sequence of the E2 protein comprised in the M1 virus has at least 90% or at least 91% or at least 92% or at least 93% or at least 94% or at least 95% or at least 96% or at least 97% or at least 98% or at least 99% or at least 99.5% or at least 99.8% or at least 99.9% or 100% sequence identity (Identity) with an amino acid sequence shown as SEQ ID NO: 12 or SEQ ID NO: 31. In some embodiments, an M1 virus is provided. An amino acid residue corresponding to the 358th site of the NS3 protein encoded by a nucleotide sequence of the M1 virus is not M; and/or an amino acid residue corresponding to the 4th site of the E2 protein is not E or K.

In some embodiments, the nucleotide sequence of the M1 virus has at least 90% or at least 91% or at least 92% or at least 93% or at least 94% or at least 95% or at least 96% or at least 97% or at least 98% or at least 99% or at least 99.5% or at least 99.8% or at least 99.9% or 100% sequence identity (Identity) with an M1 sequence shown as SEQ ID NO: 5 or SEQ ID NO: 15 or GenBank Accession No. EU015061.1 or GenBank Accession No. EF011023.1 or CCTCC V201423.

In some embodiments, preferably, the amino acid residue corresponding to the 358th site of the NS3 protein is: G, A, L, I, V, P, S, Q, T, C, N, F, Y, W, D, E, K, R or H; and/or the amino acid residue corresponding to the 4th site of the E2 protein is: M, G, A, L, I, V, P, S, Q, T, C, N, F, Y, W, D, R or H.

In some embodiments, the M1 virus has a mutation relative to a wild-type M1 virus or a pseudo-wild-type M1 virus.

In some embodiments, the M1 virus has a mutation relative to an M1 virus having a sequence shown as SEQ ID NO: 5 or an M1 virus having a sequence shown as SEQ ID NO: 15.

In some embodiments, the mutation is: M358G, M358A, M358L, M358I, M358V, M358P, M358S, M358Q, M358T, M358C, M358N, M358F, M358Y, M358W, M358D, M358E, M358K, M358R or M358H on the NS3 protein; and/or K4M, K4G, K4A, K4L, K4I, K4V, K4P, K4S, K4Q, K4T, K4C, K4N, K4F, K4Y, K4W, K4D, K4R, K4H, E4M, E4G, E4A, E4L, E4I, E4V, E4P, E4S, E4Q, E4T, E4C, E4N, E4F, E4Y, E4W, E4D, E4R or E4H on the E2 protein.

In some embodiments, the M1 virus is obtained by the mutation of an amino acid residue corresponding to the 358th site of the NS3 protein of the M1 virus having the sequence shown as SEQ ID NO: 5 into: G, A, L, I, V, P, S, Q, T, C, N, F, Y, W, D, E, K, R or H; and/or the mutation of an amino acid residue at the 4th site of the E2 into: M, G, A, L, I, V, P, S, Q, T, C, N, F, Y, W, D, R or H.

In some embodiments, the M1 virus is obtained by the mutation of an amino acid residue M corresponding to the 358th of the NS3 protein of the M1 virus having the sequence shown as SEQ ID NO: 15 into L; and/or by the mutation of an amino acid residue E corresponding to the 4th site of the E2 protein into D.

In some embodiments, a nucleotide sequence comprising any M1 virus described above is provided.

In some embodiments, an amino acid sequence corresponding to the NS3 protein of an M1 virus is provided. An amino acid residue corresponding to the 358th site of the amino acid sequence is not M.

In some embodiments, preferably, the amino acid residue corresponding to the 358th site is: G, A, L, I, V, P, S, Q, T, C, N, F, Y, W, D, E, K, R or H.

In some embodiments, the amino acid sequence corresponding to the NS3 of the M1 virus has at least 90% or at least 91% or at least 92% or at least 93% or at least 94% or at least 95% or at least 96% or at least 97% or at least 98% or at least 99% or at least 99.5% or at least 99.8% or at least 99.9% or 100% sequence identity (Identity) with an amino acid sequence shown as SEQ ID NO: 8 or SEQ ID NO: 18.

In some embodiments, an amino acid sequence corresponding to the E2 protein of an M1 virus is further provided. An amino acid residue corresponding to the 4th site of the amino acid sequence is not E or K.

In some embodiments, the amino acid residue corresponding to the 4th site is M, G, A, L, I, V, P, S, Q, T, C, N, F, Y, W, D, R or H.

In some embodiments, the amino acid sequence corresponding to the E2 protein of the M1 virus has at least 90% or at least 91% or at least 92% or at least 93% or at least 94% or at least 95% or at least 96% or at least 97% or at least 98% or at least 99% or at least 99.5% or at least 99.8% or at least 99.9% or 100% sequence identity (Identity) with an amino acid sequence shown as SEQ ID NO: 12 or SEQ ID NO: 31.

In some embodiments, a nucleotide sequence for encoding the amino acid sequence corresponding to the NS3 protein of the M1 virus is further provided.

In some embodiments, a nucleotide sequence for encoding the amino acid sequence corresponding to the E2 protein of the M1 virus is further provided.

In some embodiments, a vector is further provided. The vector comprises a nucleic acid for encoding the E2 protein and/or the NS3 protein of an M1 virus; an amino acid residue corresponding to the 358th site of the NS3 protein is not M; and an amino acid residue corresponding to the 4th site of the E2 protein is not E or K.

In some embodiments, the amino acid residue corresponding to the 358th site of the NS3 protein is: G, A, L, I, V, P, S, Q, T, C, N, F, Y, W, D, E, K, R or H.

In some embodiments, the amino acid residue corresponding to the 4th site of the E2 protein is: M, G, A, L, I, V, P, S, Q, T, C, N, F, Y, W, D, R or H.

In some embodiments, an amino acid sequence of the NS3 protein has at least 90% or at least 91% or at least 92% or at least 93% or at least 94% or at least 95% or at least 96% or at least 97% or at least 98% or at least 99% or at least 99.5% or at least 99.8% or at least 99.9% or 100% sequence identity (Identity) with an amino acid sequence shown as SEQ ID NO: 8 or SEQ ID NO: 18.

In some embodiments, an amino acid sequence of the E2 protein has at least 90% or at least 91% or at least 92% or at least 93% or at least 94% or at least 95% or at least 96% or at least 97% or at least 98% or at least 99% or at least 99.5% or at least 99.8% or at least 99.9% or 100% sequence identity (Identity) with an amino acid sequence shown as SEQ ID NO: 12 or SEQ ID NO: 31.

In some embodiments, the vector further comprises a coding sequence of the NS1 protein, the NS2 protein, the NS4 protein, the C protein, the E3 protein, the 6K protein, and/or the E1 protein of the M1 virus.

In some embodiments, an amino acid sequence of the NS1 protein has at least 90% or at least 91% or at least 92% or at least 93% or at least 94% or at least 95% or at least 96% or at least 97% or at least 98% or at least 99% or at least 99.5% or at least 99.8% or at least 99.9% or 100% sequence identity (Identity) with an amino acid sequence shown as SEQ ID NO: 6 or SEQ ID NO: 16.

In some embodiments, an amino acid sequence of the NS2 protein has at least 90% or at least 91% or at least 92% or at least 93% or at least 94% or at least 95% or at least 96% or at least 97% or at least 98% or at least 99% or at least 99.5% or at least 99.8% or at least 99.9% or 100% sequence identity (Identity) with an amino acid sequence shown as SEQ ID NO: 7 or SEQ ID NO: 17.

In some embodiments, an amino acid sequence of the NS4 protein has at least 90% or at least 91% or at least 92% or at least 93% or at least 94% or at least 95% or at least 96% or at least 97% or at least 98% or at least 99% or at least 99.5% or at least 99.8% or at least 99.9% or 100% sequence identity (Identity) with an amino acid sequence shown as SEQ ID NO: 9 or SEQ ID NO: 19.

In some embodiments, an amino acid sequence of the C protein has at least 90% or at least 91% or at least 92% or at least 93% or at least 94% or at least 95% or at least 96% or at least 97% or at least 98% or at least 99% or at least 99.5% or at least 99.8% or at least 99.9% or 100% sequence identity (Identity) with an amino acid sequence shown as SEQ ID NO: 10 or SEQ ID NO: 20.

In some embodiments, an amino acid sequence of the E3 protein has at least 90% or at least 91% or at least 92% or at least 93% or at least 94% or at least 95% or at least 96% or at least 97% or at least 98% or at least 99% or at least 99.5% or at least 99.8% or at least 99.9% or 100% sequence identity (Identity) with an amino acid sequence shown as SEQ ID NO: 11 or SEQ ID NO: 30.

In some embodiments, an amino acid sequence of the 6K protein has at least 90% or at least 91% or at least 92% or at least 93% or at least 94% or at least 95% or at least 96% or at least 97% or at least 98% or at least 99% or at least 99.5% or at least 99.8% or at least 99.9% or 100% sequence identity (Identity) with an amino acid sequence shown as SEQ ID NO: 13 or SEQ ID NO: 32.

In some embodiments, an amino acid sequence of the E1 protein has at least 90% or at least 91% or at least 92% or at least 93% or at least 94% or at least 95% or at least 96% or at least 97% or at least 98% or at least 99% or at least 99.5% or at least 99.8% or at least 99.9% or 100% sequence identity (Identity) with an amino acid sequence shown as SEQ ID NO: 14 or SEQ ID NO: 33.

In some embodiments, the vector further comprises exogenous genes relative to the M1 virus.

In some embodiments, the exogenous genes express anti-tumor-associated molecules.

In some embodiments, the vector is selected from viruses.

In some embodiments, the vector is selected from a retrovirus, a Newcastle disease virus, a rabies virus, a vesicular stomatitis virus, a Maraba virus, an alphavirus, a Newcastle disease virus, a reovirus, an adenovirus, an adeno-associated virus, a herpes simplex virus, a vaccinia virus, and a measles virus.

In some embodiments, the vector is selected from plasmids.

In some embodiments, a vector is provided. The vector comprises the nucleotide sequence described above.

In some embodiments, the vector is selected from plasmids.

In some embodiments, a virus vector is provided. The virus is any M1 virus described above.

In some embodiments, the vector is inserted with exogenous genes.

In some embodiments, the exogenous genes express anti-tumor-associated molecules.

In some embodiments, a use of the M1 virus, or the prepared nucleotide sequence, or the amino acid sequence of the NS3 protein of the M1 virus, or the amino acid sequence of the E2 protein of the M1 virus, or the nucleotide sequence corresponding to the NS3 protein or the E2 protein, or the vector, or the virus vector in the preparation of an anti-tumor drug is further provided.

In some embodiments, an anti-tumor agent is further provided. The anti-tumor agent comprises the M1 virus, or the nucleotide sequence, or the amino acid sequence of the NS3 protein of the M1 virus, or the amino acid sequence of the E2 protein of the M1 virus, or the nucleotide sequence, or the vector, or the virus vector.

In some embodiments, a composition is further provided. The composition comprises an effective amount of the M1 virus, or the nucleotide sequence, or the amino acid sequence of the NS3 protein of the M1 virus, or the amino acid sequence of the E2 protein of the M1 virus, or the vector, or the virus vector, and a pharmaceutically acceptable carrier.

In some embodiments, the composition further comprises an immune checkpoint inhibitor.

In some embodiments, the composition further comprises a chemotherapeutic agent.

Of course, in some embodiments, the M1 virus may also optionally not include the immune checkpoint inhibitor and/or the chemotherapeutic agent. In an embodiment of the present disclosure, in a case without any other anti-cancer agent (e.g. a chemotherapeutic agent, an immune checkpoint inhibitor, and other existing substances or tools that have a tumor inhibitory effect), the M1 virus has a high tumor inhibitory effect when used alone.

In some embodiments, the composition comprises $10^1$ virus particles or PFUs.

In some embodiments, the composition comprises $10^1$ to $10^{30}$ virus particles or PFUs.

In some embodiments, the compositions comprises $10^1$, $10^2$, $10^3$, $10^4$, $10^5$, $10^6$, $10^7$, $10^8$, $10^9$, $10^{10}$, $10^{11}$, $10^{12}$, $10^{13}$, $10^{14}$, $10^{15}$, $10^{16}$, $10^{17}$, $10^{18}$, $10^{19}$, $10^{20}$, $10^{21}$ or $10^{22}$ virus particles or PFUs.

In some embodiments, the composition comprises $2\times10^6$ virus particles or PFUs.

In some embodiments, the composition is used to resist a tumor.

In some embodiments, a dosage form of the anti-tumor agent or the composition is selected from: an injection, a tablet, a capsule, a kit, and a patch.

In some embodiments, the dosage form is an injection.

In some embodiments, in the use, or the anti-tumor agent, or the composition, the tumor is selected from a solid tumor and a hematological tumor.

In some embodiments, the solid tumor is selected from one or more of liver cancer, colorectal cancer, bladder cancer, breast cancer, cervical cancer, prostate cancer, a glioma, melanoma, pancreatic cancer, nasopharyngeal carcinoma, lung cancer, stomach cancer, adrenocortical carcinoma, accessory renal cortical carcinoma, anal cancer, appendix cancer, astrocytoma, atypical teratoma, a rhabdoid tumor, basal cell carcinoma, cholangiocarcinoma, bladder cancer, bone cancer, a brain tumor, a bronchial tumor, Burkitt lymphoma, a carcinoid tumor, a heart tumor, cholangiocarcinoma, chordoma, carcinoma of large intestine, craniopharyngioma, ductal carcinoma in situ, a germ tumor, endometrial cancer, ependymoma, esophageal cancer, olfactory neuroblastoma, a intracranial germ Cell tumor, an extragonadal germ cell tumor, ocular cancer carcinoma of fallopian tube, carcinoma of gallbladder, head and neck cancer, hypopharyngeal cancer, Kaposi's sarcoma, renal carcinoma, Langerhans cell histiocytosis, laryngeal cancer, lip cancer, oral cancer, Merkel cell carcinoma, malignant mesothelioma, multiple endocrine neoplasia syndrome, mycosis fungoides, carcinoma of nasal cavity and nasal sinuses, neuroblastoma, non-small cell lung cancer, ovarian cancer, a pancreatic neuroendocrine tumor, an islet cell tumor, papillomatosis, paraganglioma, carcinoma of nasal sinuses and nasal cavity, parathyroid carcinoma, carcinoma of penis, throat cancer, a pituitary tumor, pleuropulmonary blastoma, primary peritoneal carcinoma, retinoblastoma, a salivary gland tumor, sarcoma, Sezary syndrome, skin cancer, small cell lung cancer, carcinoma of small intestine, soft tissue sarcoma, squamous cell carcinoma, testicular cancer, thymoma and thymic cancer, thyroid cancer, urethral cancer, uterine cancer, endometrium and uterine sarcoma, vaginal cancer, a vascular tumor, vulvar cancer, and solitary myeloma.

In some embodiments, the hematological tumor is selected from one or more of B-cell acute lymphoblastic leukemia (BALL), T-cell acute lymphoblastic leukemia (TALL), acute lymphoblastic leukemia (ALL), chronic myelogenous leukemia (CML), chronic lymphocytic leukemia (CLL), B-cell promyelocytic leukemia, blastic plasmacytoid dendritic cell neoplasm, Burkitt lymphoma, diffuse large B-cell lymphoma, follicular lymphoma, hairy cell leukemia, small cell or large cell-follicular lymphoma, MALT lymphoma, mantle cell lymphoma, marginal zone lymphoma, multiple myeloma, non-Hodgkin lymphoma, plasmablastic lymphoma, plasmacytoid dendritic cell neoplasm, Waldenstrom macroglobulinemia, and pre-leukemia.

In some embodiments, the tumor is selected from one or more of liver cancer, colorectal cancer, bladder cancer, breast cancer, cervical cancer, prostate cancer, a glioma, melanoma, pancreatic cancer, nasopharyngeal carcinoma, lung cancer, and stomach cancer.

In some embodiments, the obtained M1 virus can effectively treat a variety of tumors including: liver cancer, colorectal cancer, bladder cancer, breast cancer, cervical cancer, prostate cancer, a glioma, melanoma, pancreatic cancer, nasopharyngeal carcinoma, lung cancer, and stomach cancer. In vitro experiments prove that the M1 virus of the present disclosure can induce the apoptosis of a variety of tumor cells; and in vivo experiments prove that the M1 virus of the present disclosure significantly inhibits the growth of liver cancer and colorectal cancer in vivo. No matter in vivo or in vitro, the M1 virus of the present disclosure has higher efficacy compared with the wild-type virus in general.

In some embodiments, the obtained M1 virus has good selectivity and safety. Cell experiment results show that the M1 virus of the present disclosure can selectively kill tumor cells and is non-toxic to normal cells, which indicates that the M1 of the present disclosure is targeted to tumors; animal experiment results show that after being injected into the tail vein, the M1 virus of the present disclosure does not affect the weight and mental state of the nude mouse and is not distributed to normal organs, which indicates that the M1 virus of the present disclosure is safe.

In some embodiments, the obtained M1 virus significantly inhibits the growth of tumors when administrated by intratumor or intravenous injection. Compared to intratumor injection of existing commercially available oncolytic viruses, this administration needs to be carried out by specially trained doctors or nurses, has low patient acceptance, and is not suitable for deep organ tumors and micrometastasis. However, the M1 virus of the present disclosure can be administrated by intravenous injection for treatment, which indicates that the M1 virus of the present disclosure is more convenient and practicable in clinical uses and has a broader use range.

In the present disclosure, unless the context requires otherwise, the words "comprise" and "include" should be understood as including the described steps or elements or collections of steps and elements, but do not exclude any other steps or elements or collections of steps and elements; that is, the words are open limitations.

For example, in some embodiments, the M1 virus "comprises mutations of . . . ", the "comprise" refers to that the mutations may also include other mutations (especially a silent mutation) in addition to the described mutations (e.g. of the amino acid residue at the 358th site of the nonstructural protein NS3 and/or the amino acid residue at the 4th of the structural protein E2), such as mutations that do not affect functions of the virus; or some mutations that improve certain abilities or reduce the toxicity or improve the stability of the virus without affecting and interfering basic functions of the mutant M1.

In some embodiments, the M1 virus has double-site mutations: M358L on the NS3 protein, and any one of K4N, K4D, E4N, or E4D on the E2 protein. It refers to that the mutant has and only has these mutations, and does not have other mutations.

In some embodiments, a wild-type M1 virus corresponding to the M1 virus is a virus with a Accession No. CCTCC V201423 (specifically described in a Chinese patent 104814984A).

In some embodiments, a genomic sequence of the wild-type M1 virus corresponding to the M1 virus has at least 95%, at least 96%, at least 97%, at least 98%, at least 99%, at least 99.5% or at least 99.8% identity with a genomic sequence of the virus with a Accession No. CCTCC V201423 (described in the Chinese patent 104814984A).

In some embodiments, a wild-type M1 virus corresponding to the M1 virus is shown as GenBank Accession No. EU015061.1 or EF011023.1 (subject to the information on the application date/priority date).

In some embodiments, a genomic sequence of the wild-type M1 virus corresponding to the M1 virus has at least 95%, at least 96%, at least 97%, at least 98%, at least 99%, at least 99.5% or at least 99.8% identity with a genomic sequence of GenBank Accession No. EU015061.1 or EF011023.1 (subject to the information on the application date/priority date) or a virus reported by Zhai Y G (13), and is regarded as a virus probably derived from the same strain as CCTCC V201423.

In some embodiments, the protein described above is isolated polypeptide.

In some embodiments, the nucleic acid described above is isolated polynucleotide.

In some embodiments, the M1 virus described above is an isolated virus.

BRIEF DESCRIPTION OF THE DRAWINGS

FIG. 1 shows nucleotide sequencing of mutant sites of 4 mutant viruses (rM1-NS3M, rM1-E2M, rM1-N3E2M, and rM1-c6v1). FIG. 1A shows nucleotide sequencing of amino acid residues near the 358th site of the NS3 protein. A nucleotide sequence at this site of a wild-type is CCA, and a corresponding amino acid is M; a nucleotide sequence of the mutant is CCC, and a corresponding amino acid is L; and FIG. 1B shows nucleotide sequencing of amino acid residues near the 4th site of the E2 protein. A nucleotide sequence at this site of the wild-type is AAA or GAA, and a corresponding amino acid is K or E; and a nucleotide sequence of the mutant is AAC or GAC, and a corresponding amino acid is N or D.

FIG. 2A shows the cell morphology of the HCT 116 cells infected in 1 MOI for 48 h; FIG. 2B shows comparison of survival rates of the cells infected with rM1-WT, rM1-NS3M, rM1-E2M, and rM1-N3E2M viruses in 0.001 to 10 MOI for 72 h by an MTT method.

FIG. 3A shows growth changes of the tumor in the subcutaneous tumor-bearing nude mouse model, and FIG. 3B shows weight changes of the nude mouse in the subcutaneous tumor-bearing nude mouse model.

FIG. 6A shows growth changes of the tumor in the subcutaneous tumor-bearing mouse model, and FIG. 6B shows weight changes of the nude mouse in the subcutaneous tumor-bearing mouse model.

FIG. 7A shows rM1-WT (E2-4K) (AAA); FIG. 7Z shows a mutant strain (NS3-358H, ATG→CAT).

FIG. 8A shows a kill curve of rM-WT (E2-4K); FIG. 8Z shows a kill curve of a mutant strain NS3-358H.

DETAILED DESCRIPTION OF THE INVENTION

Figure 2:
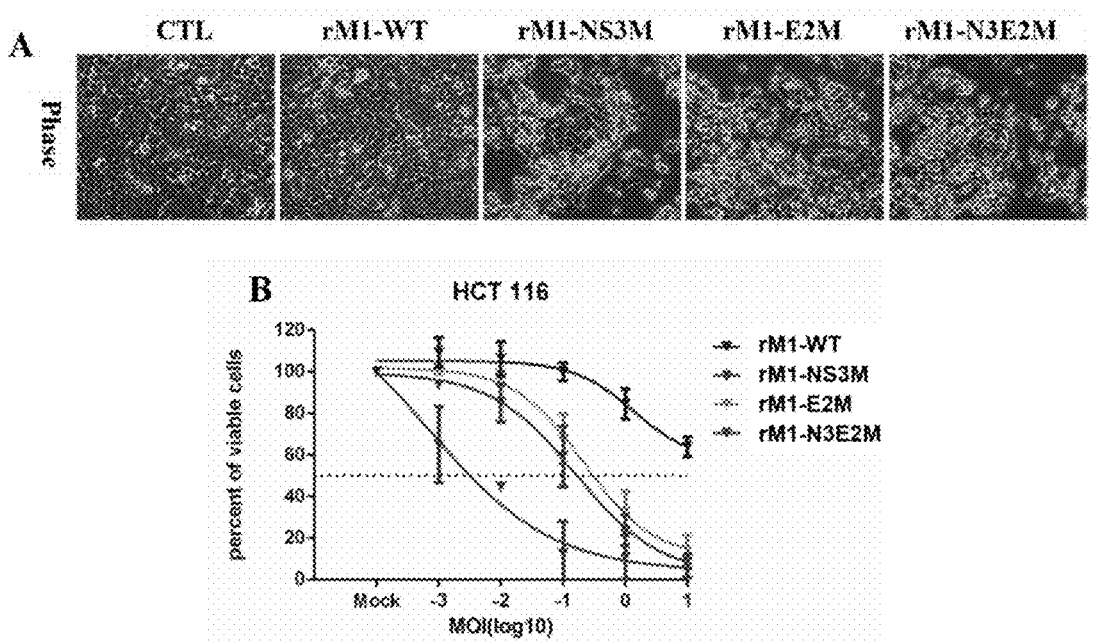
FIG. 2 shows enhanced oncolytic effects of site-directed mutant viruses (rM1-NS3M, rM1-E2M, and rM1-N3E2M) on an HCT 116 cell line.

The technical solutions of the present disclosure will be further described below with reference to specific embodiments, which are not intended to limit the scope of protection of the present disclosure. Some non-essential modifications and adjustments made by others based on the concept of the present disclosure shall fall within the scope of protection of the present disclosure.

Definition

Unless otherwise defined, all technical and scientific terms used in the present disclosure have the same meanings as commonly understood by those of ordinary skill in the art to which the present disclosure belongs.

Unless otherwise specified, the mutation of the present disclosure is: a natural mutation, a mandatory mutation or a selective mutation, and includes but is not limited to gene modification, and sequence increase or deletion or partial substitution.

It should be noted that in the present disclosure, the "mutation" includes an artificial mutation (induced mutation or genetic engineering) at a specific site of a wild-type virus strain. It is well known in the art that the wild-type and the mutant are relative to each other, and wild-type virus strains themselves have differences in nucleotide or amino acid residue sequences.

The term "and/or" as used herein refers to and covers any and all possible combinations of one or more of the associated listed items. When used in a list of two or more items, the term "and/or" means that any of the listed items can be used separately, or any combination of two or more of the listed items can be used. For example, if a composition, a combination or a structure is described as including (or comprising) components A, B, C, and/or D, the composition may only comprise A, only comprise B, only comprise C, only comprise D, comprise a combination of A and B, comprise a combination of A and C, comprise a combination of A and D, comprise a combination of B and C, comprise a combination of B and D, comprise a combination of C and D, comprise a combination of A, B, and C, comprise a combination of A, B, and D, comprise a combination of A, C, and D, comprise a combination of B, C, and D, or comprise a combination of A, B, C, and D.

Here, for example, M358G of the NS3 protein refers to an M358G mutation of an amino acid residue at the 358th of the NS3 protein of a M1 virus, and the amino acid residue mutates from M into G; and for example, "M358A" refers to an M358A mutation of the amino acid residue at the 358th site of the NS3 protein of the M1 virus, and the amino acid residue mutates from M into A. The other is the same.

Here, for example, K4M of the E2 protein refers to a K4M mutation of an amino acid residue at the 4th of the E2 protein of the M1 virus, and the amino acid residue mutates from K into M; and for example, K4A of the E2 protein refers to a K4A mutation of the amino acid residue at the 4th site of the E2 protein of the M1 virus, and the amino acid residue mutates from K into A. The other is the same.

TABLE 1

List of amino acids

| name | Abbreviation | | Structural formula |
|---|---|---|---|
| Glycine | Gly | G | $CH_2-COO^-$ \| $^+NH_3$ |
| Alanine | Ala | A | $CH_3-CH-COO^-$ \| $^+NH_3$ |
| Leucine | Leu | L | $(CH_3)_2CHCH_2-CHCOO^-$ \| $^+NH_3$ |
| Isoleucine | Ile | I | $CH_3CH_2CH-CHCOO^-$ \| $CH_3$ $^+NH_3$ |
| Valine | Val | V | $(CH_3)_2CH-CHCOO^-$ \| $^+NH_3$ |
| Proline | Pro | P | (pyrrolidine-COO⁻) |
| Serine | Ser | S | $HOCH_2-CHCOO^-$ \| $^+NH_3$ |
| Glutamine | Gln | Q | $H_2N-\overset{O}{\overset{\|}{C}}-CH_2CH_2CHCOO^-$ \| $^+NH_3$ |
| Threonine | Thr | T | $CH_3CH-CHCOO^-$ \| $OH$ $^+NH_3$ |
| Cysteine | Cys | C | $HSCH_2-CHCOO^-$ \| $^+NH_3$ |
| Asparagine | Asn | N | $H_2N-\overset{O}{\overset{\|}{C}}-CH_2CHCOO^-$ \| $^+NH_3$ |
| Methionine | Met | M | $CH_3SCH_2CH_2-CHCOO^-$ \| $^+NH_3$ |
| Phenyl-alanine | Phe | F | $C_6H_5-CH_2-CHCOO^-$ \| $^+NH_3$ |

TABLE 1-continued

List of amino acids

| name | Abbreviation | | Structural formula |
|---|---|---|---|
| Tyrosine | Tyr | Y | $HO-C_6H_4-CH_2-CHCOO^-$ \| $^+NH_3$ |
| Tryptophan | Trp | W | (indole)-$CH_2CH-COO^-$ \| $^+NH_3$ |
| Aspartic acid | Asp | D | $HOOCCH_2CHCOO^-$ \| $^+NH_3$ |
| Glutamic acid | Glu | E | $HOOCCH_2CH_2CHCOO^-$ \| $^+NH_3$ |
| Lysine | Lys | K | $^+NH_3CH_2CH_2CH_2CH_2CHCOO^-$ \| $NH_2$ |
| Arginine | Arg | R | $H_2N-\overset{^+NH_2}{\overset{\|}{C}}-NHCH_2CH_2CH_2CHCOO^-$ \| $NH_2$ |
| Histidine | His | H | (imidazole)-$CH_2CH-COO^-$ \| $^+NH_3$ |

NS3 protein: nonstructural protein 3.

E2 protein: envelope protein 2.

Here, the number of various sequences is shown in Table 27 below:

TABLE 27

| | Sequence name (220) | Sequence No. |
|---|---|---|
| PCR primer | Mutant protein NS3 F primer | (SEQ ID NO: 1) |
| | Mutant protein NS3 R primer | (SEQ ID NO: 2) |
| | Mutant protein E2 F primer | (SEQ ID NO: 3) |
| | Mutant protein E2 R primer | (SEQ ID NO: 4) |
| M1 virus artificially synthesized according to a sequencing result of CCTCC V201423 | Genome | (SEQ ID NO: 5) |
| | NS1 protein | (SEQ ID NO: 6) |
| | NS2 protein | (SEQ ID NO: 7) |
| | NS3 protein | (SEQ ID NO: 8) |
| | NS4 protein | SEQ ID NO: 9) |
| | C protein | (SEQ ID NO: 10) |
| | E3 protein | (SEQ ID NO: 11) |
| | E2 protein | (SEQ ID NO: 12) |
| | 6K protein | (SEQ ID NO: 13) |
| | E1 protein | (SEQ ID NO: 14) |
| M1-c6 virus | Genome | (SEQ ID NO: 15) |
| | NS1 protein | (SEQ ID NO: 16) |
| | NS2 protein | (SEQ ID NO: 17) |
| | NS3 protein | (SEQ ID NO: 18) |
| | NS4 protein | (SEQ ID NO: 19) |
| | C protein | (SEQ ID NO: 20) |
| | E3 protein | (SEQ ID NO: 30) |
| | E2 protein | (SEQ ID NO: 31) |
| | 6K protein | (SEQ ID NO: 32) |
| | E1 protein | (SEQ ID NO: 33) |
| Site-directed | 5173 | (SEQ ID NO: 21) |

TABLE 27-continued

| Sequence name (220) | Sequence No. |
|---|---|
| mutation primer 5230 | (SEQ ID NO: 22) |
| 4907 | (SEQ ID NO: 23) |
| 5298 | (SEQ ID NO: 24) |
| 7104 | (SEQ ID NO: 25) |
| 9420 | (SEQ ID NO: 26) |
| 9510 | (SEQ ID NO: 27) |
| 9486 | (SEQ ID NO: 28) |
| 10521 | (SEQ ID NO: 29) |

Wild-type M1 virus: it refers to a virus individual obtained in nature, and its corresponding genome is a wild-type genome. The wild-type genome may have diversity at certain specific sites. For example, an amino acid residue at the 4th site of the E2 protein of the known wild-type M1 virus is E or K.

Pseudo-wild-type M1 virus: it refers to an M1 virus having a sequence that does not coincide exactly with that of the known wild-type M1 virus and having biological characteristics that do not significantly differ from those of the known wild-type M1 virus.

In some embodiments, the wild-type M1 virus, for example, may be a M1 virus with a Accession No. CCTCC V201423 or a monoclonal virus M1-c6 virus, or, for example, may be EU015061.1 or EF011023.1.

For example, in some embodiments, mutations may occur at one or more of the following sites on the basis of the wild-type: on amino acid residues at the 2nd site and/or the 786th site of the nonstructural protein NS2; on amino acid residues at the 30th site and/or the 393rd site of the nonstructural protein NS3; on an amino acid residue at the 381st site of the nonstructural protein NS3; on an amino acid residue at the 154th site of the structural protein C; and on an amino acid residue at the 246th site of the structural protein E2.

rM1-WT: it refers to an M1 virus having a genome sequence shown as SEQ ID NO: 5, and it comprises an NS1 protein sequence shown as SEQ ID NO: 6; an NS2 protein sequence shown as SEQ ID NO: 7; an NS3 protein sequence shown as SEQ ID NO: 8; an NS4 protein sequence shown as SEQ ID NO: 9; a C protein sequence shown as SEQ ID NO: 10; an E3 protein sequence shown as SEQ ID NO: 11; an E2 protein sequence shown as SEQ ID NO: 12; a 6K protein sequence shown as SEQ ID NO: 13; and an E1 protein sequence shown as SEQ ID NO: 14. An amino acid residue at the 358th site of the NS3 protein comprised in the M1 virus is M, and an amino acid residue at the 4th of the E2 protein is K.

rM1-NS3M: a recombinant M1 virus obtained by an M358L mutation (i.e. M mutates into L) of an amino acid residue at the 358h site of the NS3 protein on the basis of rM1-WT.

rM1-E2M: a recombinant M1 virus obtained by a K4N mutation (i.e. K mutates into N) of an amino acid residue at the 4th site of the E2 protein on the basis of rM1-WT.

rM1-N3E2M: a recombinant M1 virus obtained by an M358L mutation (i.e. M mutates into L) of an amino acid residue at the 358th site of the NS3 protein on the basis of rM1-WT and a K4N mutation (i.e. K mutates into N) of an amino acid residue at the 4th site of the E2 protein.

M1-c6: it refers to an M1 virus having a genome sequence shown as SEQ ID NO: 15, and it comprises an NS1 protein sequence shown as SEQ ID NO: 16; an NS2 protein sequence shown as SEQ ID NO: 17; an NS3 protein sequence shown as SEQ ID NO: 18; an NS4 protein sequence shown as SEQ ID NO: 19; a C protein sequence shown as SEQ ID NO: 20; an E3 protein sequence shown as SEQ ID NO: 30; an E2 protein sequence shown as SEQ ID NO: 31; a 6K protein sequence shown as SEQ ID NO: 32; and an E1 protein sequence shown as SEQ ID NO: 33. An amino acid residue at the 358th site of the NS3 protein of the M1 virus is M, and an amino acid residue at the 4th of the E2 protein is E.

M1-c6v1: a recombinant M1-c6 virus obtained by an M358L mutation (i.e. M mutates into L) of an amino acid residue at the 358th site of the NS3 protein on the basis of M1-c6 and an E4D mutation (i.e. E mutates into D) of an amino acid residue at the 4th site of the E2 protein.

Amino acid residue at the 358th site of the NS3 protein: in the currently known wild-type M1 virus, this site is ranked 358th in the NS3 protein. A sequence of 3 amino acid residues of the upstream of N-terminal is YET, and a sequence of 3 amino acid residues of the downstream of C-terminal is EVV. The number "358" should not be regarded as an absolute limitation, and whether a specific amino acid residue (e.g. a variant amino acid residue) is located at this site should be determined based on a functional domain or motif where the amino acid residue is located. For example, it is not excluded that in sequences of other pseudo-wild type M1 viruses, this site is not necessarily ranked 358th in the primary structure of the NS3 protein. At this time, "358" should not be regarded as an absolute limitation, and whether the specific amino acid residue belongs to the amino acid residue at the 358th site of the NS3 protein of the present disclosure should be determined based on a functional domain or motif where the amino acid residue is located.

Amino acid residue at the 4th site of the E2 protein: in the currently known wild-type M1 virus, this site is ranked 4th in the E2 protein. A sequence of 3 amino acid residues of the upstream of N-terminal is SVT, and a sequence of 3 amino acid residues of the downstream of C-terminal is HFN. The number "4" should not be regarded as an absolute limitation, and whether a specific amino acid residue (e.g. a variant amino acid residue) is located at this site should be determined based on a functional domain or motif where the amino acid residue is located. For example, it is not excluded that in sequences of other pseudo-wild type M1 viruses, this site is not necessarily ranked 4th in the primary structure of the E2 protein. At this time, "4" should not be regarded as an absolute limitation, and whether the specific amino acid residue belongs to the amino acid residue at the 4th site of the E2 protein of the present disclosure should be determined based on a functional domain or motif where the amino acid residue is located.

Pharmaceutically acceptable carrier: it refers to a molecular entity or a composition that do not produce allergic or similar adverse reactions when administered to humans. The pharmaceutically acceptable carriers include any and all solvents, dispersion media, intermedia, coatings, diluents, antibacterial agents, antifungal agents, isotonic agents, absorption delaying agents, buffers, carrier solutions, suspensions, colloids, etc. The use of these media and reagents for active substances of drugs is well known in the art. The pharmaceutically acceptable carrier is expected to be used in a therapeutic composition except in a case where any conventional medium or agent is incompatible with an active ingredient.

Immune checkpoint inhibitor: it refers to molecules integrally or partially reducing, inhibiting, interfering or regulating one or more checkpoint proteins. The checkpoint proteins regulate and control the activation and functions of T cells. The known checkpoint proteins include, for example, CTLA-4 and ligands CD80 and CD86 thereof; and PD1 and ligands PDL1 and PDL2 thereof (Pardoll, Nature Reviews Cancer 12: 252-264, 2012). These proteins are responsible for the co-stimulation or inhibition of interactions of the T-cell response. The immune checkpoint proteins regulate and control and maintain their tolerance and the duration and range of the physiological immune response. The immune checkpoint inhibitors include antibodies or are derived from antibodies.

Chemotherapeutic agent: a compound that can be used to treat cancer.

Treatment: it refers to alleviating symptoms, temporarily or permanently eliminating the cause of symptoms, or preventing or slowing down symptoms of a specified disease or disorder.

Effective amount: it refers to the quantity of an alphavirus or a proteasome inhibitor used in the present disclosure that is required by a desired therapeutic effect. Required precise amount varies depending on objects and the following factors: treated species, age and general conditions of a treated object, the severity of a treated disease, an administrated particular agent, an administration method, etc. However, for a given situation, those of ordinary skill in the art can adjust the dosage of the pharmaceutical composition of the present disclosure according to the severity of symptoms, the frequency of recurrence, and the physiological response to a therapeutic regimen.

Example 1 Construction and Identification of M1 Site-Directed Mutant Virus Strains Materials:
1. Cloning: TOP10 competent cells, plasmid micro-extraction kits, DNA product recovery kits; Gibson Assembly Master Mix; Phanta Max Super-Fidelity DNA Polymerase.
2. Restriction endonucleases SpeI, SwaI, XhoI, ApaI, and XbaI.
3. Site-directed mutation primers shown in Table 2:

TABLE 2

List of site-directed mutation primers

| Name | Sequence |
| --- | --- |
| 5173 | TTGACCAGACCGTCCCGTCACTAGTAAGTCCCAGAAAGTACATACAGCA (SEQ ID NO: 21) |
| 5230 | ACTTCCAGGGTTTCGTAGGTCGT (SEQ ID NO: 22) |
| 4907 | ACTCCAAGATGCTAACGAGCAGATCTGCCTGTACGCCCTAGGGAGAC (SEQ ID NO: 23) |
| 5298 | ACGACCTACGAAACCCTGGAAGT (SEQ ID NO: 24) |
| 7104 | CTGACTTCATCATAGCACCGAATTTAAATCTTGTACCGGTAGGTAGATGCACACTCGT (SEQ ID NO: 25) |
| 9420 | CGGGCTACTACGACCTGCTCGAGGCCACGATGACGTGTAACAACAGTGCACGCC (SEQ ID NO: 26) |
| 9510 | TTGTAGACATTGAAGTGGTTCGTCACACTGCGACGGTGGCGTGCACTGTTGTTACACG (SEQ ID NO: 27) |
| 9486 | TGACGAACCACTTCAATGTCTACAA (SEQ ID NO: 28) |
| 10521 | GGTTTGCCTTCAGTTGTCAGCTGGGCCCACAAGCGCACGGGTGGG (SEQ ID NO: 29) |

4. Full-length genome plasmids of the wild-type M1 virus: pBR-M1-WT is a plasmid vector comprising an M1 full-genome that has a sequence shown as SEQ ID NO: 5. A full-genome is synthesized according to the sequence shown as SEQ ID NO: 5, and the M1 sequence is cloned between ClaI and EcoRI cleavage sites of a pBR322 vector (added with multiple cloning sites) by a recombinant DNA technology to form the pBR-M1-WT vector. A pBR-M1-c6 vector is constructed by a similar method, wherein M1-c6 is a M1 virus having a sequence shown as SEQ ID NO: 15, an amino acid residue at the 358th site of the NS3 protein of M1-c6 virus is M, and an amino acid residue at the 4th site of the E2 protein is E.
5. Full-length genome plasmids of mutant viruses: mutations are introduced into the pBR-M1-WT vectors by a site-directed mutation technology to form pBR-M1-NS3M (i.e. an M358L mutation of an amino acid residue at the 358th site of the comprised NS3 protein), pBR-M1-E2M (i.e. a K4N mutation of an amino acid residue at the 4th site of the E2 protein), and pBR-M1-N3E2M (i.e. an M358L mutation of an amino acid residue at the 358th site of the NS3 protein and a K4N mutation of an amino acid residue at the 4th site of the E2 protein); mutations are introduced into pBR-M1-c6 to form pBR-M1-c6v1 (i.e. an M358L mutation of an amino acid residue at the 358th site of the contained NS3 protein and an E4D mutation of the amino acid residue at the 4th site of the E2 protein).
6. DH5α competent cells, high-purity plasmid micro-extraction kits; JM110 competent cells; and Lipofectamine RNA iMAX Transfection Reagent.
7. RNA extraction: TRIzol; chloroform, isopropanol, and anhydrous ethanol.
8. Reverse transcription: Random hexamer, dNTP, MMLV, and RNaseOUT.
9. PCR: Q5 high-fidelity enzymes, and PCR primers shown in Table 3. The primers are synthesized by Invitrogen.
10. Agarose gel DNA recovery kits.
11. DNA electrophoresis: Agarose, SYBR green, and DNA marker.

TABLE 3

List of PCR primers

| Mutant protein | Forward Primers (F) | Reverse Primers (R) |
|---|---|---|
| NS3 | GCTCCTCCTTTCCATTGC (SEQ ID NO: 1) | TTCTTCTCTTTCTTGGTGCC (SEQ ID NO: 2) |
| E2 | TGATGATGTGCGTCTTAGC C (SEQ ID NO: 3) | ATCGTGCCTCGAATAGCG (SEQ ID NO: 4) |

Method:

1. Construction of Vectors for Full-Length Gene Plasmids of Viruses pBR-M1-WT and pBR-M1-c6 bacteria were added into 5 mL of LB media and shaken at 37° C. overnight. Plasmids were extracted by using a plasmid micro-extraction kit, and the DNA concentration of the plasmids was measured by using Nanodrop. A PCR amplification system is shown in Table 4.

TABLE 4

PCR amplification system for site-directed mutation

| Reagent | Volume (μL) |
| --- | --- |
| 2× Phanta Max Buffer | 25 |
| dNTP Mix (10 mM each) | 1 |
| DNA | 1 |
| Forward primer | 1 |
| Reverse primer | 1 |
| Phanta Max Super-Fidelity DNA Polymerase (1 U/μl) | 1 |
| ddH$_2$O | 20 |

Reaction conditions: pre-degeneration was carried out at 98° C. for 3 min; amplification was carried out at 98° C. for 15 s, at 58° C. for 15 s, and at 72° C. for 45 s, respectively, and was cycled for 35 times; extension was carried out at 72° C. for 5 min, and after the reaction was completed, the system was cooled to 4° C. Whether products existed and the size was correct were determined by means of agarose gel electrophoresis.

Enzyme cleavage of vector plasmids: enzyme cleavage systems for NS3 and E2 mutations shown in Table 5 were prepared:

TABLE 5

Restrictive endonuclease enzyme cleavage system

| NS3 | E2 |
| --- | --- |
| pBR-M1-WT 1 μg | pBR-M1-WT 1 μg |
| 10× buffer 2 μL | 10× buffer 2 μL |
| SpeI 1 μL | apaI 1 μL |
| SwaI 1 μL | XhoI 1 μL |
| ddH$_2$O 6 μL | ddH$_2$O 6 μL |

The systems reacted at 37° C. for 1 h; plasmids after enzyme cleavage were recovered by using a kit, and the concentration was measured.

The vector and PCR fragments were assembled by using a Gibson Assembly Master Mix kit. Reaction system: PCR fragment 1+PCR fragment 2+plasmids+2× Mix+H$_2$O=1+1+1+10+7 (μL). Reaction conditions: 50° C., 1 h.

Transformation and cloning: 100 μL of DH5α competent cells were transformed with 10 μL of conjugates and were selected on an Ampicillin-resistant plate. Clones were selected for sample sequencing. A double-site mutant virus was obtained by an NS3 mutation on plasmids of the vector with an E2 mutation.

2. Preparation of Site-Directed Mutant Viruses pBR-M1-NS3M, pBR-M1-E2M, pBR-M1-N3E2M, and pBR-M1-c6v1 bacteria were inoculated into 5 mL of LB media and shaken at 37° C. overnight. Plasmids were extracted by using a kit, and the concentration was measured. JM110 were transformed (the transformation efficiency of the JM110 competent cells was relatively low, a relative large amount of plasmids were required to transform 100 μL of competent cells, 300 μL of LB solution was added, and after being recovered for 1 h, the cells were coated on a plate) and selected on an Ampicillin-resistant plate. Monoclones were selected and added into 500 μL of LB/Ampicillin media, the bacteria were shaken at 37° C. for 12 h, the culture system was amplified, and the bacteria were shaken at 37° C. for 14 to 16 h. When the concentration of the bacterial solution was appropriate, the bacteria were stored with glycerol at the final concentration of 15 to 30%.

Plasmids were extracted by using an endotoxin-free plasmid extraction kit, and the concentration was measured. An XbaI endonuclease for linearizing plasmids is shown in Table 6:

TABLE 6

Plasmid linearization enzyme cleavage system

| Reagent | Volume (μL) |
| --- | --- |
| 10× buffer | 10 |
| XbaI | 5 |
| DNA(10 μg) | x |
| ddH$_2$O | 85-x |

The system was divided into two tubes and reacted at 37° C. for 2 h. Proteinase K digestion: Proteinase K (20 mg/mL) was diluted 10 times, 2.5 μL of the diluted Proteinase K was added into each tube, 5 μL of 10% SDS was added, and incubated at 50° C. for 30 min. Linearized plasmids after enzyme cleavage were recovered by using a kit, and the DNA concentration was measured. In vitro transcription: the reaction was carried out at 37° C. for 2 h, after the reaction, products were not cryopreserved and used directly in the next operation. A system is shown in Table 7:

TABLE 7

In vitro transcription system

| Reagent | Sample volume (μL) |
| --- | --- |
| SP6 Transcription 5× Buffer | 4 |
| rNTPs (100 mM) (A + C + U + G) | 1 + 1 + 1 + 0.6 |
| Linearized DNA template (1 to 2 μg) | 8.4 |
| Ribo m$^7$G Cap Analog, 40 mM | 2 |
| Enzyme Mix | 2 |
| Total volume | 20 |

DNA template removal: RQ1 RNase-Free DNase (1 U/μL) was added into the DNA template at 1 U/μg, and reacted at 37° C. for 15 min. RNA transfection: Vero cells were inoculated into a 6-well plate at 3×10$^5$ cells/well one day in advance and cultured with 1.5 mL of complete media; 125 μL of Opti-MEM was uniformly mixed with 3.75 μL of LipomRNA, 125 μL of Opti-MEM was uniformly mixed with 2.5 μg of RNA respectively, then the two were placed into a tube and uniformly mixed, and stood at room temperature for 5 min; a complex of RNA and the transfection reagent was added into the cell culture dish, whether the cytopathic morphology appeared was observed in the next 2 to 4 days, a supernatant was collected, and the virus was amplified with Vero cells.

3. RNA Extraction by a TRIzol Method

Fully lysed the cells by pipetting with TRIzol. If precipitates appeared, the cell solution was centrifuged at 12,000 g and 4° C. for 10 min, and a supernatant was collected. 200 μL of chloroform was added, the mixture was shaken violently and uniformly mixed, and the mixture was stood at room temperature for 3 min. The mixture was centrifuged at 12,000 g and 4° C. for 15 min, about 500 μL of upper aqueous phase was sucked into a new EP tube. 500 μL of isopropanol was added, and the mixture was gently mixed by reversing and stood at room temperature for 10 min. The mixture was centrifuged at 12,000 g and 4° C. for 10 min, and a supernatant was removed. Precipitates were washed with 500 μL of pre-cooled 75% ethanol, the mixture was centrifuged at 12,000 g and 4° C. for 5 min, and a supernatant was removed. After being dried in air, RNA precipitates were dissolved in an appropriate amount of DEPC-treated water. The RNA concentration was measured by using Nanodrop.

4. Reverse Transcription

The reverse transcription was carried out by using MMLV reverse transcriptase:

TABLE 8

| | Volume (μL) |
|---|---|
| 50 μM random hexamer | 1 |
| 10 mM dNTP | 1 |
| RNA (1 to 5 μg) | x |
| DEPC-treated water | 10-x |

Various reaction components shown in Table 8 were added, and the system was pre-degenerated at 65° C. for 5 min and placed on ices immediately for 2 to 3 min;

4 μL of 5× buffer reaction solution, 2 μL of RNaseOUT regent, 1 μL of DTT, and 1 μL of reverse transcriptase MMLV were added, and the system reacted at 25° C. for 10 min, at 37° C. for 50 min, and at 70° C. for 15 min.

5. PCR

Reversely transcribed cDNA was diluted 2 to 5 times, and DNA was subjected to PCR amplification by using a Q5 high-fidelity enzyme (the genome of M1 was divided into 10 fragments and amplified):

TABLE 9

| | Volume (μL) |
|---|---|
| 2× Mix | 25 |
| 10 μM F | 1 |
| 10 μM R | 1 |
| cDNA | 1 |
| ddH$_2$O | 22 |

Reaction conditions: predegeneration was carried out at 98° C. for 30 s; amplification was carried out at 98° C. for 10 s, at 58° C. for 30 s, and at 72° C. for 1 min, and was cycled for 35 times; extension was carried out at 72° C. for 2 min, and after the reaction was completed, the system was cooled to 4° C.

Detection of PCR products by means of 1% agarose gel electrophoresis: 0.5 g of agarose gel was weighted and added into 50 mL of water, the mixture was heated to dissolve the agarose gel thoroughly, after the mixture was cooled to about 50° C., an SYBR green dye was added in a ratio of 1/10000, the mixture was poured into a gel preparation plate, a comb was inserted; after completely solidifying, the mixture was placed into an electrophoresis tank at 5 μL/well and subjected to electrophoresis at a voltage of 100 V for about 40 min; and DNA products were observed and photographed by using a Tanon imager.

TABLE 10

| | Volume (μL) |
|---|---|
| 5× buffer | 4 |
| Vector | 1 |
| Exnase | 2 |
| DNA(10 to 100 ng) | x |
| ddH$_2$O | 13-x |

6. The PCR Products were Delivered to Thermo Scientific for Sequencing.

Results:

As shown in FIG. 1, by comparing gene sequences, it is found that all the site-directed mutant viruses are constructed successfully and are the following four mutant viruses, respectively:

(1) rM1-NS3M: an amino acid residue at the 358th site of the NS3 protein of a M1 virus having a sequence shown as SEQ ID NO: 5 mutates from methionine (M) into leucine (L);

(2) rM1-E2M: an amino acid residue at the 4th site of the E2 protein of a M1 virus having a sequence shown as SEQ ID NO: 5 mutates from lysine (K) into asparagine (N);

(3) rM1-N3E2M: an amino acid residue at the 358th site of the NS3 protein of a M1 virus having a sequence shown as SEQ ID NO: 5 mutates from methionine (M) into leucine (L); and an amino acid residue at the 4th site of the E2 protein of the M1 virus mutates from lysine (K) into asparagine (N); and (4) rM1-c6v1: an amino acid residue at the 358th site of the NS3 protein of a M1 virus (i.e. M1-c6) having a sequence shown as SEQ ID NO: 15 mutates from methionine (M) into leucine (L), and an amino acid residue at the 4th site of the E2 protein mutates from glutamic acid (E) into aspartic acid (D).

Conclusions:

4 mutant viruses rM1-NS3M, rM1-E2M, rM1-N3E2M, and rM1-c6v1 are constructed by means of site-directed mutation. The mutant viruses rM1-NS3M, rM1-E2M, and rM1-N3E2M are obtained on the basis of site-directed mutations of the M1 virus having the sequence shown as SEQ ID NO: 5; and rM1-c6v1 is obtained on the basis of site-directed mutations of the M1 virus (M1-c6) having the sequence shown as SEQ ID NO: 15.

Example 2 Anti-Tumor Effects of Four Mutant M1 Viruses on a Variety of Tumor Cells 1. Experimental Materials and Instruments 1.1 Main Drugs, Reagents and Preparations Main Drugs and Reagents:

M1 viruses: rM1-WT, rM1-NS3M, rM1-E2M, rM1-N3E2M, M1-c6, and M1-c6v1

Cell Counting Kit-8 (CCK-8) purchased from Dojindo China Co., Ltd. (item No.: CK-04)

Potassium chloride purchased from Merck Chemicals (Shanghai) Co., Ltd. (batch No.: K46837809603)

Potassium dihydrogen phosphate purchased from Merck Chemicals (Shanghai) Co., Ltd. (batch No.: AM1217539805)

Sodium bicarbonate purchased from Merck Chemicals (Shanghai) Co., Ltd. (batch No.: K49804023804)

Disodium hydrogen phosphate dodecahydrate purchased from Chengdu Huayi Pharmaceutical Excipient Manufacturing Co., Ltd. (batch No.: 20170402)

Anhydrous calcium chloride purchased from Hebei Huachen Pharmaceutical Co., Ltd. (batch No.: 171009)

Magnesium chloride hexahydrate purchased from Chengdu Huayi Pharmaceutical Excipient Manufacturing Co., Ltd. (batch No.: 20170807)

Mannitol purchased from France Roquette company (batch No.: E939X)

Trehalose purchased from U.S. Pfanstiehl (batch No.: 36358A)

Human serum albumin purchased from Shenzhen Weiguang Biological Products Co., Ltd (batch No.: 20171144B)

1.2 Main Instruments

TABLE 11

Main experimental instruments

| Instrument | Manufacturer | Model |
|---|---|---|
| Inverted microscope | Nikon | ECLIPSE Ti-S |
| Biological safety cabinet | Thermo Fisher (Suzhou) Instruments | 1374 |
| Cell counting and analysis instrument | Chemometec | Nucleocounter NC200 |
| Electric-heated thermostatic water bath | Shanghai Yiheng Technology Instrument | HWS-24 |
| Desktop computer | Dell | OptiPlext 3020 |
| Refrigerator | Panasonic | BCD-Z51WZ |
| Cell incubator | Thermo Fisher | 3111 |
| Absorbance microplate reader | Biotek | ELX800 |
| Clean bench | Suzhou Antai | SW-CJ-2FD |
| Centrifuge | Jintan Kexi Instruments | 80-2 |

2. Sources of Experimental Cells

The cells were purchased from ATCC or National Collection of Authenticated Cell Cultures.

3. Experimental Methods

Cell culture

Appropriate culture conditions were selected according to instructions of various cells, and the cell amplification and passage was carried out according to passage ratios on the instructions.

Experimental grouping and processing

Inhibitory effects of M1-c6v1 on the growth of various cells were detected. Specific grouping and processing are shown in Table 12.

TABLE 12

Grouping and processing of an inhibitory effect experiment of M1-c6v1 on the growth of cells

| Group | Processing |
|---|---|
| Blank control | without cells + excipient solutions |
| Solvent control | excipient solutions |
| Positive control | 15 mg/mL or 20 mg/mL 5-Fu solution |
| Positive solvent control | 1× PBS |
| M1-c6v1 | M1-c6v1 at various concentrations |

After being subcultured to the logarithmic growth phase, the cells were digested, the cells were inoculated into a 48-well plate at a corresponding density, experiments were set according to the above groups, 3 duplicated wells were provided for each group, and the blank control group was not inoculated with the cells. After the cells were subjected to adherent culture for 24 h, the sample were added, the culture was continued for 72 h, and the cell viability was detected at the end point.

Detection of the cell viability by a CCK-8 method

The original culture solutions in the 48-well plate was removed, a color-developing agent (100% complete medium+10% CCK-8 solution) was slowly added along the wall at 200 μL/well, and after the cells were cultured at 37° C. for 0.5 to 3 h, absorbance values of various wells were detected in a wavelength of 450 nm by using an absorbance microplate reader.

Calculation of median inhibitory concentration (IC50) of the M1 viruses against various cells Cell growth inhibition rates of various wells were calculated according to the detected absorbance values of various wells by a formula of cell growth inhibition rate (IR)= (Average $OD_{negative}$–$OD_{experiment}$)/(Average $OD_{negative}$–Average $OD_{blank}$)×100%, cell growth inhibition curves were drawn by using GraphPad Prism 7.0 software, and a median inhibitory concentration (IC50) value of M1-c6v1 or rM1-c6 against tumor cells was calculated by a log (inhibitor) vs. response-variable slope (four parameters) analysis equation.

Detection of the cell activity by using MTT

The cells were inoculated into a 24-well plate at 20,000 cells/well, with 500 μl of medium per well, and the cells were subjected to adherent culture for 24 h. The wild-type and the mutant viruses were diluted in a 10-fold equal ratio, and the viruses were added into the 24-well plate in 10 MOI. After the cells were infected with the viruses for 72 h, 50 μL of MTT was added into each well and uniformly mixed with the cells, and the 24-well plate was placed in the incubator for 2 to 4 h. A supernatant was sucked away carefully, 500 μL of DMSO was added into each well to dissolve bluish violet crystalline formazan, which was thoroughly dissolved and mixed on a microporous oscillator, and the absorbance was detected in a wavelength of 570 nm by using the microplate reader. The experiment was repeated at least 3 times. Absorbance values of various groups were normalized according to the blank control group, a relative cell survival rate of each processing group was calculated, and a survival curve of the cells was drawn.

Statistics processing

All the experiments were repeated twice or more times separately, and experimental results were recorded as mean value±standard deviation.

4. Experimental Results

As shown in FIG. 2A, it is observed under a microscope that after being infected with the rM1-NS3M and rM1-E2M viruses, the infected cells have lesions, which indicates that a single-site mutation can independently enhance the replication and oncolytic effect of the M1 virus in tumor cells. Compared with the wild-type and the single-site mutant viruses, after the cells were infected with the rM1-N3E2M double-site mutant virus, an infection rate is more than 90%, and most of the cells have lesions. Kill effects of the rM1-WT, rM1-NS3M, rM1-E2M, and rM1-N3E2M on HCT 116 cells are further compared by an MTT method. Consistent with the observation under the microscope, dose-effect curves of the rM1-NS3M and rM1-E2M viruses shift to the left, the EC50 shift is respectively increased by 80 times and 60 times according to calculation, a dose-effect curve of the rM1-N3E2M virus shift to the left to a larger extent, and the EC50 shift is increased by 7,600 times (see FIG. 2B), which indicates that two mutant sites synergistically enhance the oncolytic effect of the virus.

Oncolytic effects and safety of rM1-WT and 3 M1 virus mutants, i.e. rM1-NS3M, rM1-E2M, and rM1-N3E2M, are compared by using more tumor cells and normal cells, and results are shown in Table 13 to Table 15. The results show that: compared with the rM1-WT virus, the 3 M1 virus mutants have improved oncolytic effects to different extents, and are not obviously toxic to the detected normal cells.

TABLE 13

Kill effect of rM1-NS3M to tumor cells
(denoted as a survival rate % of tumor cells)

| Cell line | Disease source | Survival rate % of rM1-WT group | Survival rate % of rM1-NS3M group |
|---|---|---|---|
| HCT-8 | Colorectal cancer | 64.1 | 10.7 |
| SW620 | Colorectal adenocarcinoma | 21.7 | 6.8 |
| SW480 | Colorectal cancer | 55.3 | 8.1 |
| HCT-15 | Colorectal adenocarcinoma | 29.3 | 19.8 |
| Huh-7 | Liver cancer | 30.9 | 10.8 |

TABLE 14

Kill effect of rM1-E2M to tumor cells
(denoted as a survival rate % of tumor cells)

| Cell line | Disease source | Survival rate % of rM1-WT group | Survival rate % of rM1-E2M group |
|---|---|---|---|
| HCT-8 | Colorectal cancer | 64.1 | 9.4 |
| SW620 | Colorectal adenocarcinoma | 21.7 | 6.9 |
| SW480 | Colorectal cancer | 55.3 | 7.2 |
| HCT-15 | Colorectal adenocarcinoma | 29.3 | 15.2 |
| Huh-7 | Liver cancer | 30.9 | 8.5 |

TABLE 15

Kill effect of rM1-N3E2M to tumor cells
(denoted as a survival rate % of tumor cells)

| Cell line | Disease source | Survival rate % of rM1-WT group | Survival rate % of rM1-N3E2M group |
|---|---|---|---|
| HCT-8 | Colorectal cancer | 64.1 | 8.7 |
| SW620 | Colorectal cancer | 21.7 | 10.3 |
| SW480 | Colorectal cancer | 55.3 | 19.6 |
| Huh-7 | Liver cancer | 30.9 | 6.9 |
| SK-HEP-1 | Liver cancer | 85.9 | 44.6 |
| MDA-MB-231 | Breast cancer | 17.0 | 3.0 |
| MDA-MB-435S | Breast cancer | 38.0 | 4.0 |
| BT-20 | Breast cancer | 20.0 | 8.0 |
| BT549 | Breast cancer | 98.0 | 65.0 |
| T47D | Breast cancer | 22.0 | 3.0 |
| ZR-75-1 | Breast cancer | 81.0 | 42.0 |
| SW1990 | Pancreatic cancer | 32.9 | 16.1 |
| MIA PACA-2 | Pancreatic cancer | 45.2 | 27.7 |
| BxPC-3 | Pancreatic cancer | 23.9 | 10.1 |
| ScaBER | Bladder cancer | 6.7 | 6.6 |
| SK-BR-3 | Breast cancer | 6.0 | 5.0 |
| MDA-MB-468 | Breast cancer | 7.0 | 2.0 |
| L-02 | Normal hepatocytes | 101.6 | 92.6 |
| NCM460 | Normal colorectal cells | 102.8 | 87.9 |

Similarly, the oncolytic effects and safety of the M1-c6 and M1-c6v1 viruses mutant are compared by using a variety of tumor cell lines and normal cells, and results are shown in Table 16. M1-c6v1 has a significant kill effect on a majority of malignant tumor cells. M1-c6v1 also has a significant kill effect on a majority of murine malignant tumor cells. Compared with the kill effect (IC50) of M1-c6, IC50 of M1-c6v1 is reduced by 1.3 to 20.5 times relative to IC50 of M1-c6, which indicates that the oncolytic effect of M1-c6v1 is generally better than that of M1-c6.

TABLE 16

Kill effects of M1-c6v1 and rM1-c6 on malignant tumor cells

| No. | Tumor type | Cell name | IC50 (MOI) of M1-c6v1 mean value ± standard deviation | IC50 (MOI) of M1-c6 mean value ± standard deviation |
|---|---|---|---|---|
| 1 | Human liver cancer cell | Hep 3B | <0.001 | <0.001 |
| 2 | | Hep G2 | <0.001 | <0.001 |
| 3 | | PLC | <0.001 | <0.001 |
| 4 | | SNU-387 | 0.0103 ± 0.0063 | 0.0499 ± 0.0186 |
| 5 | | SNU-423 | 0.0479 ± 0.0150 | 0.0619 ± 0.0068 |
| 6 | | SNU-449 | 0.2054 ± 0.1898 | 0.3806 ± 0.4177 |
| 7 | | SNU-475 | <0.001 | 0.0041 ± 0.0031 |
| 9 | Human lung cancer cell | SHP-77 | 0.0574 ± 0.0420 | 0.0861 ± 0.0607 |
| 10 | Human colon cancer cell | HCT 116 | 0.0350 ± 0.0426 | 0.7181 ± 0.7789 |
| 11 | | HCT-8 | 0.0174 ± 0.0062 | 0.0365 ± 0.0188 |
| 12 | Human bladder transitional cell carcinoma | UM-UC-3 | 0.01450 ± 0.0233 | 0.0233 ± 0.0090 |
| 13 | Osteosarcoma cell | MNNG/HOSCl #5 | <0.001 | <0.001 |
| 15 | Human cervical cancer cells | C-33 A | $4.77 \times 10^{-6} \pm 4.52 \times 10^{-7}$ | $3.61 \times 10^{-6} \pm 2.19 \times 10^{-6}$ |
| 16 | Human malignant melanoma cell | A-375 | 0.1360 ± 0.0713 | 0.7155 ± 0.6710 |
| 17 | Human glioma cells | U87MG | 0.0007 ± 0.0014 | 0.0003 ± 0.0006 |
| 18 | Murine liver cancer cell | Hepa 1-6 | 0.0202 ± 0.0081 | 0.0181 ± 0.0077 |
| 19 | Murine breast cancer cell | 4T1 | 0.7666 ± 2.2841 | 1.1892 ± 1.7708 |
| 21 | Murine colon cancer cell | MC38 | <0.001 | <0.001 |
| 22 | | C26 | 0.0089 ± +0.0086 | 0.0257 ± 0.038 |
| 23 | Murine cutaneous melanoma cell | B16-F10 | <0.01 | <0.01 |

5. Experimental Conclusions

The mutant strains rM1-NS3M, rM1-E2M, rM1-N3E2M, and M1-c6v1 have significant kill effects on a majority of malignant tumor cells of the human and murine malignant tumors.

Example 3 Study on the In Vivo Efficacy and Safety of the rM1-N3E2M Virus

Materials:
1. rM1-N3E2M and rM1-WT viruses
2. Colorectal cancer cell lines HCT 116
3. 30 female BALB/c-nu/nu nude mice at the age of 6 to 8 weeks Method:
1. Female nude mice at the age of 4 to 6 weeks were purchased, sufficient HCT 116 cells were cultured in advance, digested cells were resuspended with aseptic PBS, counted, and prepared into cell suspensions as needed, and the HCT 116 cells were subcutaneously injected into backs of the nude mice at $5\times10^6$ cells/100 µL. After tumors grew to about 50 mm³, the nude mice were grouped randomly, and administration was carried out for 6 consecutive days. Lengths and widths of the tumor were measured every three days, volumes (volume=(length×width²)/2) of the tumors were calculated, and growth curves were drawn. The tumor tissues and normal organs such as liver, heart, brain, and lung were isolated on the third day after administration, and fixed with 4% paraformaldehyde for immunohistochemical experiments.
2. Immunohistochemical experiment: the tumor tissues and the normal organs of the nude mice were selected and fixed with 4% paraformaldehyde, and the samples were delivered to Guge Biotechnology for detection of the quantity of Cleaved-caspase 3 and Ki67.

Figure 3:
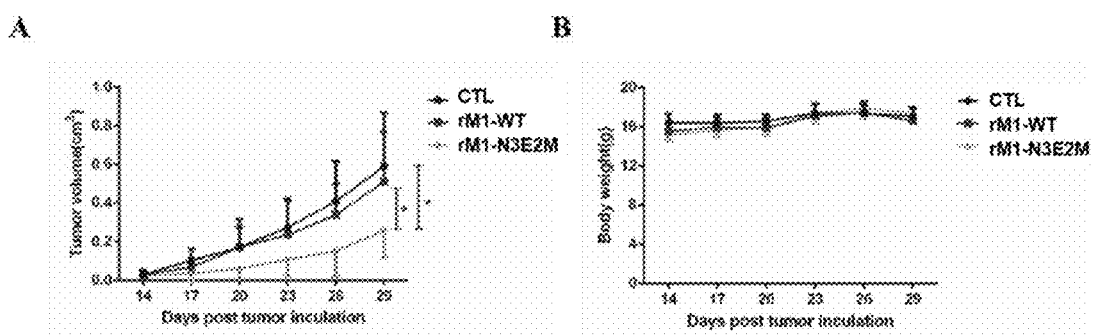
FIG. 3 shows safety and efficacy tests of an rM1-N3E2M virus on an animal model. A nude mouse subcutaneously bears a tumor HCT116 and is administrated with the virus by intravenous injection 14 days after the tumor inoculation; the volume of the tumor and the weight of the nude mouse are repeatedly measured and subjected to statistics by ANOVA, and when *p<0.05, the result has statistical significance.
Figure 4:
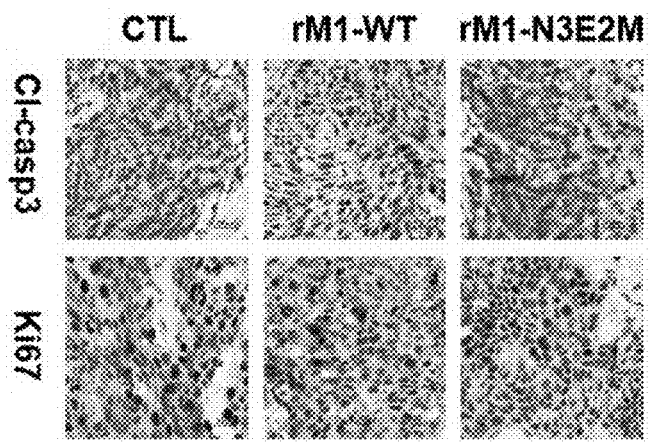
FIG. 4 shows rM1-N3E2M virus infection, the expression of an apoptosis index Cl-casp3 is up-regulated in a tumor tissue, and the expression of a cell proliferation index Ki67 is down-regulated. After subcutaneous tumor-bearing nude mouse models are treated with rM1-WT and rM1-N3E2M for 3 days, tumor tissues are dissected, and expressions of Cl-casp3 and Ki67 are detected by means of immunohistochemical staining.
Figure 5:
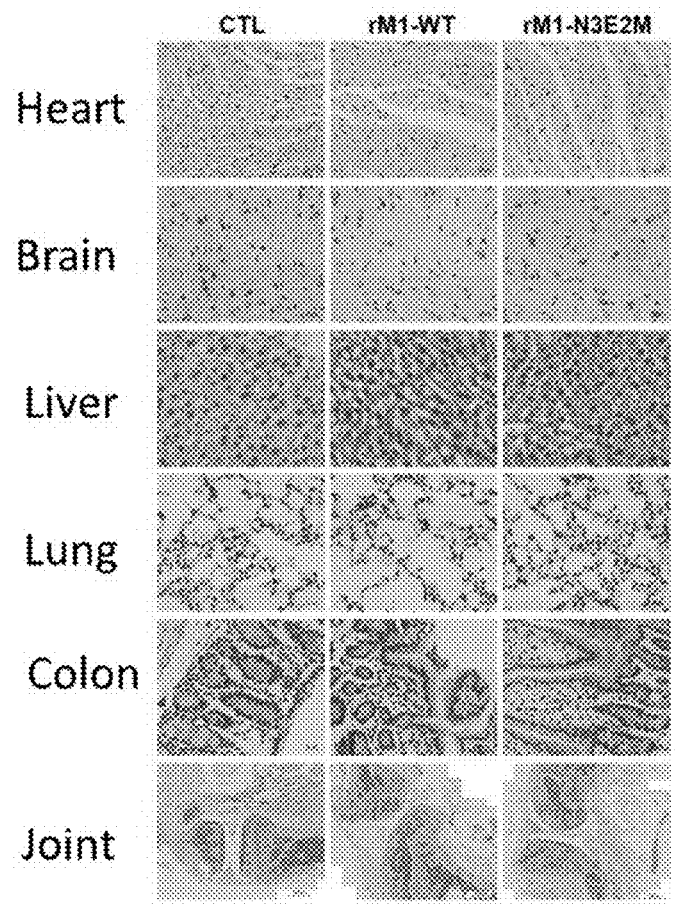
FIG. 5 shows that an rM1-N3E2M virus has no toxic lesion in normal organs and tissues.

Results:
1. Subcutaneous tumor-bearing models were constructed on the BALB/c nude mice, and the administration (intravenous injection) was carried out for 6 consecutive times, survival states of the nude mice were observed. It is found that compared with the control group, weights of the nude mice of the administration groups do not change significantly (see FIG. 3B), and mental states are good, which indicates that the rM1-N3E2M mutant virus has good safety to a certain extent. Compared with the control group, the volumes of the tumors of the nude mice of the rM1-N3E2M administration groups are reduced significantly (see FIG. 3A), which indicates that the rM1-N3E2M virus can reach tumor cells and kill the tumor cells to inhibit the growth of the tumor.
2. In order to study an inhibitory effect of rM1-N3E2M on the growth of a tumor in vivo, after the administration was carried out for 3 days, the tumor tissue was dissected, and cleaved caspase-3 (Cl-casp3) and Ki67 were subjected to immunohistochemical staining. Cl-casp3 is a marker for apoptosis, and its expression quantity indicates the degree of apoptosis and necrosis of tumor cells. Ki67 is a marker for proliferation, and its expression quantity indicates the proliferation ability of tumor cells. As shown in FIG. 4, the brown color refers to positive signals. The rM1-N3E2M virus can significantly induce up-regulation of the expression of Cl-casp3 and down-regulation of the expression of Ki67, which indicates that it can induce apoptosis of tumor cells and a malignant phenotype of rapid proliferation of the tumor cells at the same time.
3. The safety of an oncolytic virotherapy is very important, it is proved that the rM1-N3E2M virus is safe to normal cell lines, but its safety in vivo needs to be further studied. Main organs including heart, brain, liver, lung, colon, arthrosis, and other tissues of the experimental animals of various groups were isolated on the third day after the nude mouse subcutaneous tumor-bearing models were administrated, and whether the expression of the rM1-N3E2M virus protein existed was observed by an immunohistochemical method. The rM1-N3E2M virus was obtained by continuous passage on a colorectal cancer cell line, and therefore, whether the virus replicated in colonic epithelial cells of the mice in addition to important organs such as heart and brain was also concerned. In addition, it is reported that a variety of alphaviruses can cause arthritis, and therefore, whether the two experimental viruses replicated in joint tissues are observed. It can be seen from FIG. 5 that the viruses do not replicate, the cell morphologies of various organs do not change, which proves that the rM1-N3E2M virus has good safety in the immunodeficient nude mice Conclusions:
The animal experiments verify that the rM1-N3E2M virus can effectively play a role in resisting a tumor in vivo, and inhibit the growth of the tumor; rM1-N3E2M induces apoptosis of a tumor tissue and inhibits a malignant phenotype of the tumor cells; during the experiments, the weights of the nude mice do not change significantly, virus replication is not detected in the normal tissues and organs, and therefore, the safety of rM1-N3E2M is good.

Example 4 Effective Inhibition of the M1-c6v1 Virus Against a Tumor In Vivo

Materials:
1. M1-c6v1 and M1-c6 viruses
2. Murine melanoma B16-F10 cells
3. 40 female C57 BL/6 mice at the age of 5 to 6 weeks Method: female C57 BL/6 mice at the age of 5 to 6 weeks were purchased, sufficient B16-F10 cells were cultured in advance, digested cells were resuspended with aseptic PBS, counted, and prepared into cell suspensions as needed, and the B16-F10 cells were subcutaneously injected into backs of the mice at $5\times10^4$ cells/100 µL. After tumors grew to about 60 mm³, the mice were grouped randomly, and intratumoral injection was carried out for 7 consecutive days. Lengths and widths of the tumors were measured every three days, volumes (volume=(length×width²)/2) of the tumors were calculated, and growth curves were drawn.

Figure 6:
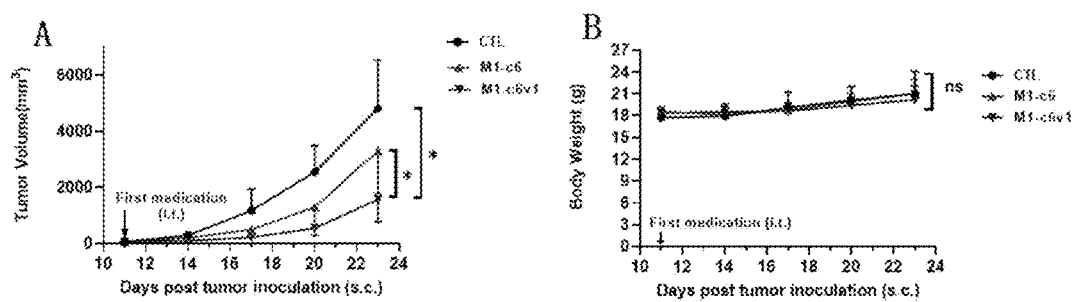
FIG. 6 shows safety and efficacy experiment results of an M1-c6v1 virus on an animal model: a C57 BL/6 mouse subcutaneously bears a tumor B16-F10 and is administrated with the virus by intravenous injection 11 days after the tumor inoculation; the volume of the tumor and the weight of the nude mouse are repeatedly measured and subjected to statistics by ANOVA, and when *p<0.05, the result has statistical significance.
Figure 7A:
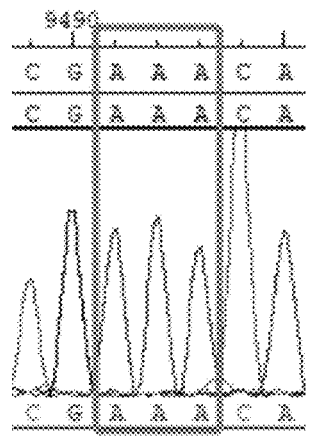
FIGS. 7A to 7Z show sequencing of mutant sites of various site-directed mutant strains of an M1 virus.
Figure 7B:
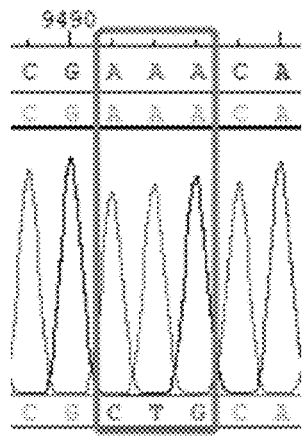
FIG. 7B shows a mutant strain (E2-4L, AAA→CTG)
Figure 7C:
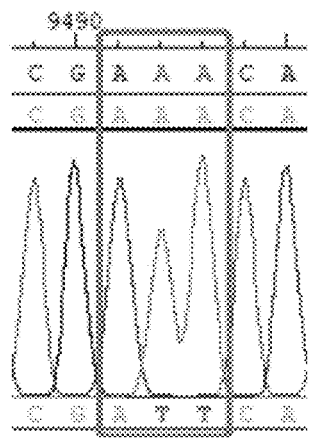
FIG. 7C shows a mutant strain (E2-4I, AAA→ATT)
Figure 7D:
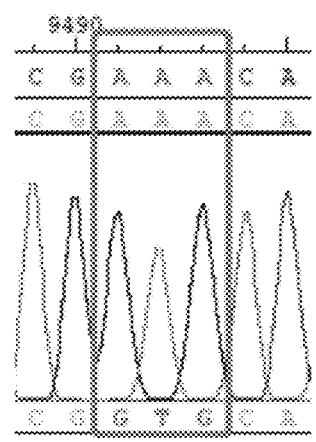
FIG. 7D shows a mutant strain (E2-4V, AAA→GTG)
Figure 7E:
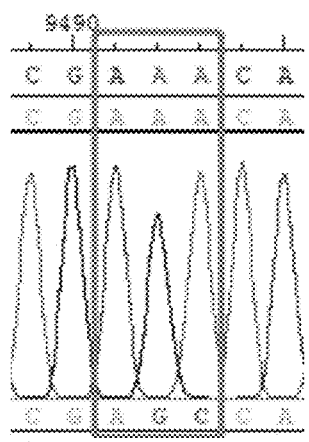
FIG. 7E shows a mutant strain (E2-4S, AAA→AGC)
Figure 7F:
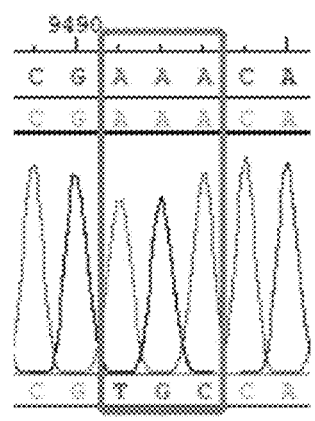
FIG. 7F shows a mutant strain (E2-4C, AAA→TGC)
Figure 7G:
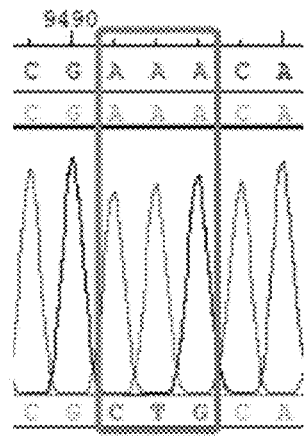
FIG. 7G shows a mutant strain (E2-4L, AAA→CTG)
Figure 7H:
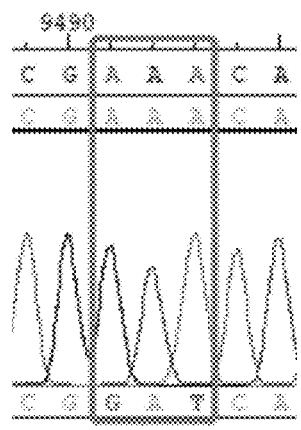
FIG. 7H shows a mutant strain (E2-4D, AAA→GAT)
Figure 7I:
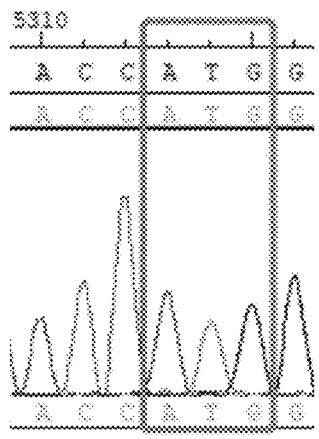
FIG. 7I shows rM1-WT (NS3-358M, ATG)
Figure 7J:
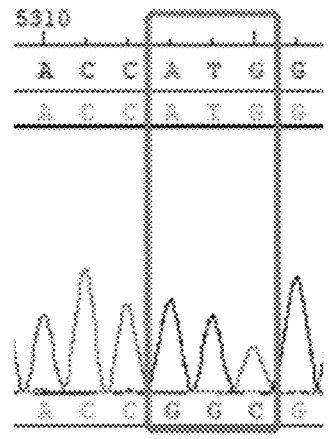
FIG. 7J shows a mutant strain (NS3-358G, ATG→GGC)
Figure 7K:
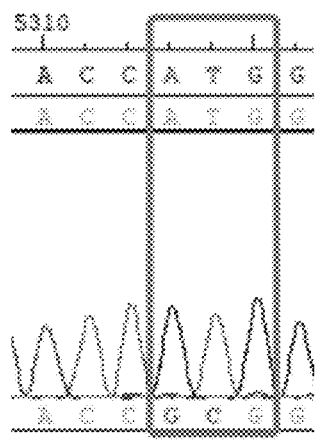
FIG. 7K shows a mutant strain (NS3-358A, ATG→GCG)
Figure 7L:
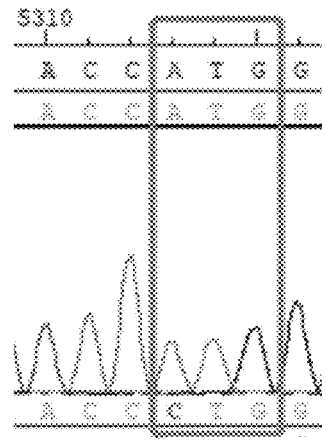
FIG. 7L shows a mutant strain (NS3-358L, ATG→CTG)
Figure 7M:
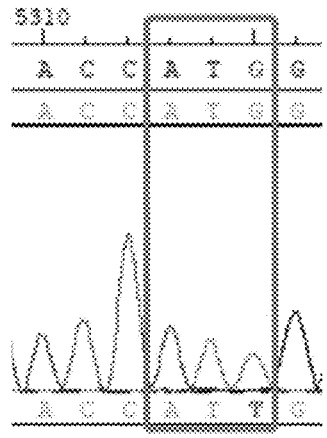
FIG. 7M shows a mutant strain (NS3-358I, ATG→ATT)
Figure 7N:
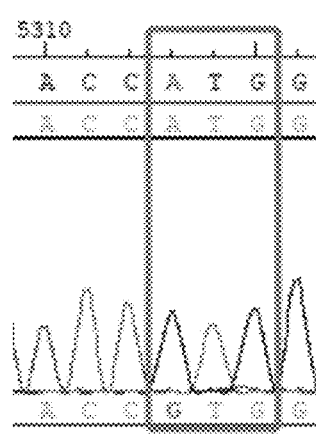
FIG. 7N shows a mutant strain (NS3-358V, ATG→GTG)
Figure 7O:
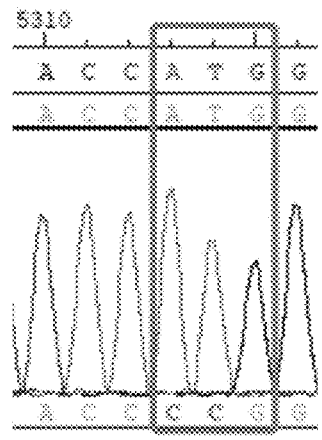
FIG. 7O shows a mutant strain (NS3-358P, ATG→CCG)
Figure 7P:
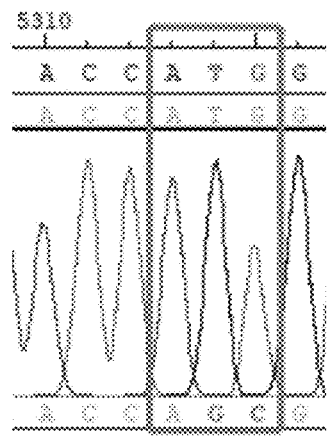
FIG. 7P shows a mutant strain (NS3-358S, ATG→AGC)
Figure 7Q:
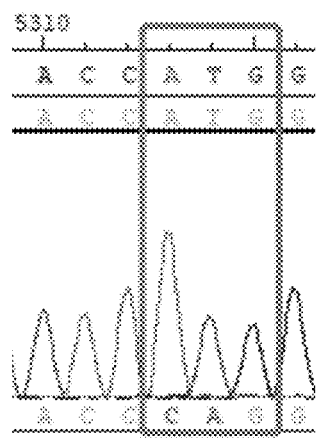
FIG. 7Q shows a mutant strain (NS3-358Q, ATG→CAG)
Figure 7R:
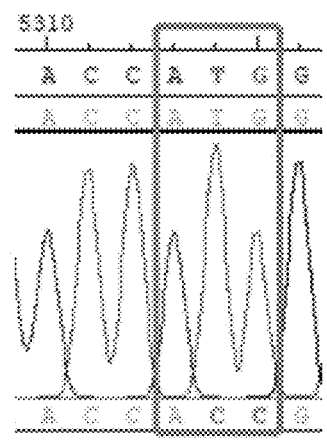
FIG. 7R shows a mutant strain (NS3-358T, ATG→ACC)
Figure 7S:
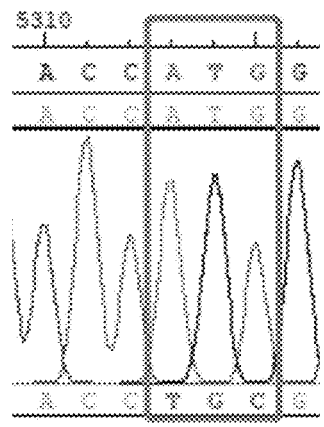
FIG. 7S shows a mutant strain (NS3-358C, ATG→TGC)
Figure 7T:
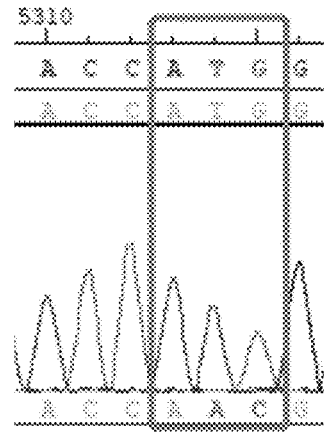
FIG. 7T shows a mutant strain (NS3-358N, ATG→AAC)
Figure 7U:
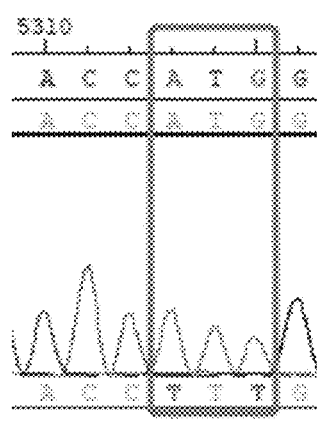
FIG. 7U shows a mutant strain (NS3-358F, ATG→TTT)
Figure 7V:
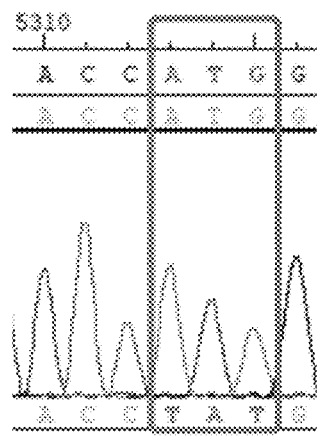
FIG. 7V shows a mutant strain (NS3-358Y, ATG→TAT)
Figure 7W:
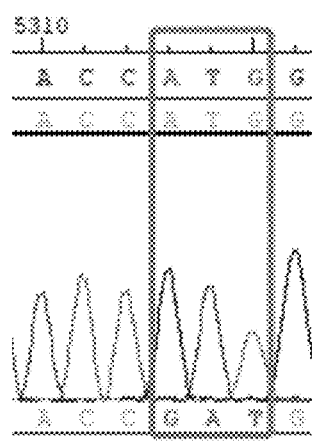
FIG. 7W shows a mutant strain (NS3-358D, ATG→GAT)
Figure 7X:
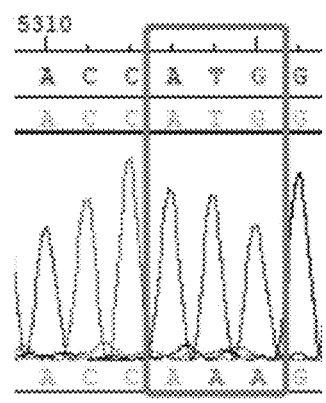
FIG. 7X shows a mutant strain (NS3-358K, ATG→AAA)
Figure 7Y:
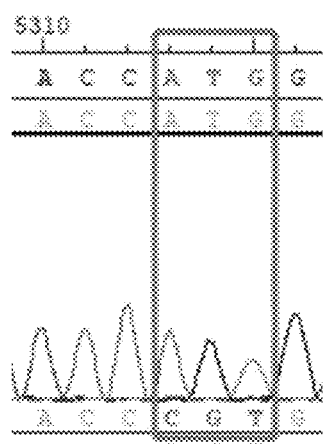
FIG. 7Y shows a mutant strain (NS3-358R, ATG→CGT)
Figure 7Z:
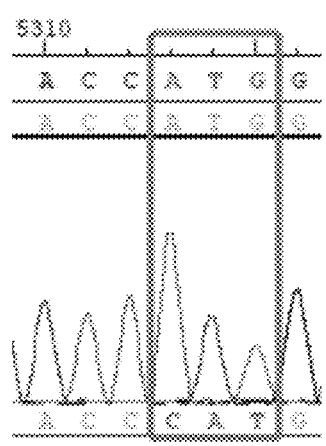

Results: subcutaneous tumor-bearing models were constructed on the C57 BL/6 mice, and after the intratumoral injection was carried out for 7 consecutive days, survival states of the mice were observed. It is found that compared with the control group, weights of the mice of the administration groups do not change significantly (see FIG. 6B), and mental states are good, which indicates that the M1-c6v1 mutant virus has good safety to a certain extent. Compared with the control group and the M1-c6 administration group, the volumes of the tumors of the mice of the M1-c6v1 administration groups are significantly reduced (see FIG. 6A), which indicates that the M1-c6v1 virus can kill the tumor cells to inhibit the growth of the tumor.

Conclusions:
The animal experiments verify that the M1-c6v1 virus can effectively play a role in resisting a tumor in vivo, and inhibit the growth of the tumor; during the experiments, the weights of the mice do not change significantly, which indicates that the safety of M1-c6v1 is good.

Example 5 Construction, Identification, and Efficacy Tests of M1 Site-Directed Mutant Virus Strains Process of Point Mutation:

A series of site-directed mutations were performed on the basis of rM1-WT viruses having a genome sequence shown as SEQ ID NO: 5 (by GenScript Biotech Co., Ltd.), and pBR-M1-E2-4K, pBR-M1-E2-4L, pBR-M1-E2-4I, pBR-M1-E2-4V, pBR-M1-E2-4S, pBR-M1-E2-4C, pBR-M1-E2-4L, and pBR-M1-E2-4D plasmids; and pBR-M1-NS3-358M, pBR-M1-NS3-358G, pBR-M1-NS3-358A, pBR-M1-NS3-358L, pBR-M1-NS3-358I, pBR-M1-NS3-358V, pBR-M1-NS3-358P, pBR-M1-NS3-358S, pBR-M1-NS3-358Q, pBR-M1-NS3-358T, pBR-M1-NS3-358C, pBR-M1-NS3-358N, pBR-M1-NS3-358F, pBR-M1-NS3-358Y, pBR-M1-NS3-358D, pBR-M1-NS3-358K, pBR-M1-NS3-358R, and pBR-M1-NS3-358H were respectively obtained.

5.1 Reagents and Consumables

Main Drugs and Reagents
- DMEM/F12 (Gibco, 11320-033)
- MEM (Gibco, C11095500BT)
- DMEM (Corning, 10-013-CVRC)
- New-born calf serum (Hangzhou Tianhang Biotechnology, 22011-8615)
- Fetal calf serum (Corning, 35-081-CV)
- Protease K (Tiangen, RT403)
- Trypsin (Thermo, 25200-072)
- Lipofectamine Messenger MAX Transfection Reagent (Thermo, LMRNA003)
- Opti-MEM I Reduced Serum Medium (1×) (Thermo, 31985-070)
- Restriction endonuclease XbaI (NEB, R0145S)
- Ribo m$^7$G Cap Analog (Promega, P1711)
- DNA purification and recovery kit (Tiangen, DP209)
- PBS (Gibco, 20012027)
- RiboMAX™ Large Scale RNA Production System (Promega, P1280)
- Goscript™ Reverse Transcription System (Promega, A5001)
- Total RNA extraction kit (Promega, LS1040)
- Virus Production Serum Free Medium (VP-SFM) (Gibco, 11681-020)
- GlutaMax I (100×) (Gibco, 35050061)
- MEM NEAA (100×) (Gibco, 11140050)
- Primers for E2 sequencing (GENEWIZ, order No. 80-423889537)
- Primers for N3 sequencing (GENEWIZ, order No. 80-429401706 and 80-426066909)

Preparation of Main Solutions

Preparation of a VP-SFM solution 10 mL of 100×MEM NEAA and 20 mL of 100× GlutaMax I were added into 1 L of VP-SFM, and the mixture was uniformly mixed and stored at 4° C. for later use.

5.2 Instruments and Equipment

TABLE 17

Main experimental instruments

| Instrument | Manufacturer | Model |
|---|---|---|
| Inverted microscope | Nikon | Eclipse TS2R |
| Biological safety cabinet | Thermo | 1374 |
| Electric-heated thermostatic water bath | Shanghai Yiheng Technology Instrument | HWS-24 |
| Desktop computer | Dell | OptiPlext 3020 |
| Refrigerator | Panasonic | BCD-Z51WZ |

TABLE 17-continued

Main experimental instruments

| Instrument | Manufacturer | Model |
|---|---|---|
| Cell incubator | Thermo | 3111 |
| Absorbance microplate reader | Biotek | ELX800 |
| Clean bench | Suzhou Antai | SW-CJ-2FD |
| Centrifuge | Jintai Kexi Instruments | 80-2 |
| Benchtop refrigerated centrifuge | Eppendorf | 5424R |
| Cell counter | Nexcelom | Auto T4 |
| Low-speed benchtop centrifuge | Shanghai Anting | TDL-80-2B |
| Thermal cycler | ABI | Simpliamp |

5.3 Experimental Cells

TABLE 18

Sources of experimental cells

| No. | Tumor type | Cell name | Cell source (bank level, record No.) | Medium |
|---|---|---|---|---|
| 1 | African green monkey kidney cell | Vero | Production cell bank, 3020014-01 | 3% NBS DMEM/F12 |
| 2 | Human colon cancer cell | HCT-116 | Master cell bank, master 20170505 | 10% FBS DMEM |
| 3 | Hamster kidney cell | BHK-21 | Working cell bank, 20170331-071/100 | 10% FBS MEM |

5.4. Test Procedure 5.4.1 Construction of Original Seed Lot Viruses (1) Linearization of Plasmids

TABLE 19

Plasmid linearization system

| Components | Addition amount (µL) |
|---|---|
| 10× Fast Digest Buffer | 10 |
| XbaI | 10 |
| Plasmids (10 µg) + water | 80 |

A. the system was prepared according to Table 19 in a PCR tube, and the tube was placed in a PCR instrument for incubation at 37° C. for 1 h; and B. 5 µL of Protease K was added into each tube, and the tube was placed in the PCR instrument for incubation at 50° C. for 30 min.

(2) Purification and Recovery of DNA

A. 500 µL of BL was added into an adsorption column and centrifuged at 12,000 rpm for 1 min;

B. linearized plasmids were transferred into a 1.5 mL EP tube, 500 µL of PB was added, and the mixture was uniformly mixed;

C. the mixture was transferred into the adsorption column, stood at room temperature for 2 min, and centrifuged at 12,000 rpm for 1 min, and a filtrate was removed;

D. 600 µL of PW was added, the mixture was stood for 2 min and centrifuged at 12,000 rpm for 1 min, and a filtrate was removed;

E. step D was repeated;

F. a filtrate was removed, the empty tube was centrifuged at 12,000 rpm for 2 min, opened lid, and dried at room temperature for 5 min;

G. 30 μL of aseptic DEPC-treated water was added, the mixture was stood for 1 min and eluted twice, and a filtrate was collected; and H. DNA was quantified.

(3) In Vitro Transcription

TABLE 20

Preparation of in vitro transcription system

| Reagent | Addition amount (μL) |
|---|---|
| SP6 Transcription 5× Buffer | 8 |
| rNTPs (100 mM) (A + C + U + G) | 2 + 2 + 2 + 1.2 |
| Linearized DNA template (1 to 2 μg) + water | 16.8 |
| Ribo m$^7$G Cap Analog, 40 mM | 4 |
| Enzyme Mix | 4 |
| Total volume | 40 |

A. the system was prepared according to Table 20 in a PCR tube, and the tube was placed in a PCR instrument for incubation at 37° C. for 2 h; and B. RQ1 RNase-Free DNase (1 μL/1 μg DNA) was added, and the tube was placed in the PCR instrument for incubation at 37° C. for 15 min.

(4) RNA Transfection

Planking of Cells

Appropriate culture conditions were selected according to instructions of various cells, and the cell amplification and passage was carried out according to passage ratios on the instructions. After being subcultured to the logarithmic growth phase, the cells were digested, and the Vero cells were inoculated into T25 culture flasks at a density of 4×10$^5$/flask, placed in the cell incubator, and subjected to adherent culture for 24 hours.

B. Transfection

250 μL of Opti-MEM medium and 7.5 μL of Messenger-MAX were added into a 1.5 mL centrifuge tube, 125 μL of Opti-MEM medium and all the RNA were added into another centrifuge tube, the solutions in the two tubes were uniformly mixed and dropwise added to the Vero cells, and the cells were placed in the virus incubator for culture.

(5) Collection of Viruses

The cell morphology and whether fluorescence appeared were observed every day, the cells were photographed for record when fluorescence was increased significantly, and when more than 90% of cells floated up, a Vero cell supernatant was collected and centrifuged at 4,000 rpm for 5 min. The supernatant was subpackaged into cryopreservation tubes, used as original seed lots, and stored with liquid nitrogen.

5.4.2 Sequencing of Seed Lot Viruses (1) Extraction of RNA

A. the seed lot virus sample stored with liquid nitrogen was taken out and defrosted;

B. 100 μL of sample was sucked and placed into a 1.5 mL centrifuge tube;

C. 300 μL of lysate was added, and the mixture was eddied, centrifuged transitorily, and stood at room temperature for 5 min;

D. 300 μL of diluent was added, and the mixture was eddied, centrifuged transitorily, and stood at room temperature for 5 min;

E. 350 μL of anhydrous ethanol was added, and the mixture was eddied, centrifuged transitorily, and stood at room temperature for 5 min;

F. the mixture was transferred into a centrifuge column (provided in a kit), and was loaded and subjected to column chromatography in two times. The mixture was centrifuged at 12,000 rpm for 1 min, and a filtrate was removed;

G. 600 μL of RNA washing solution was added, the mixture was centrifuged at 12,000 rpm for 1 min, and a filtrate was removed; and H. 50 μL of DNase I incubation solution shown as Table 21 was added to the center of an adsorption film and was stood at room temperature for 15 min;

TABLE 21

Preparation of DNase I incubation solution

| Reagent | Volume/ μL |
|---|---|
| 10× DNase I buffer | 5 |
| DNase I | 5 |
| Nuclease-free water | 40 |

I. 600 μL of RNA washing solution was added, the mixture was centrifuged at 12,000 rpm for 1 min, a filtrate was removed, the mixture was washed twice, and a filtrate was removed. The centrifuge column was placed on a collection tube again and centrifuged at 12,000 rpm for 2 min; and J. the centrifuge column was transferred to an elution tube, 50 μL of nuclease-free water was added to the center of a film of the centrifuge column, stood at room temperature for 2 min and centrifuged at 12,000 rpm for 1 min, and RNA was stored at −80° C.

(2) Reverse Transcription, as Table 22:

TABLE 22

Reverse transcription RT-PCR two-step reaction system

| Components | Volume (μL) | Note |
|---|---|---|
| Template RNA | 10 | First step: |
| Oligo | 1.5 | 1. 70° C., 5 min |
| | | 2. place on an ice box for fast cooling for 5 min |
| | | 3. Transitory centrifuge |
| 5× reaction buffer | 4.0 | Second step: |
| MgCl$_2$ | 2.0 | 4. uniformly mix, and add |
| dNTP Mix (10 mM) | 1.0 | 17 μL of reaction mixture into each sample |
| Ribonuclease Inhibitor | 0.5 | 5. react at 25° C. for 5 min, at 42° C. for 1 h, and at 70° C. |
| RTase | 1.0 | for 5 min, and store at 4° C. |

(3) PCR Amplification

A. cDNA obtained at the previous step was used as a template for PCR of fragments. A reaction system is shown in Table 23:

TABLE 23

PCR reaction system

| Components | Volume (μL) |
|---|---|
| Q5 high-fidelity 2× Master mix | 25 |
| cDNA template | 1.0 |
| H$_2$O | 20 |
| Forward/reverse primer pair (10 μM each) | 4 |

B. reaction conditions are shown in Table 24:

TABLE 24

PCR reaction conditions

| Temperature | Time | Number of cycles |
|---|---|---|
| 98° C. | 2 min | 1 cycle |
| 98° C. | 10 s | |
| 60° C. | 20 s | 30 cycles |
| 72° C. | 1 min | |
| 72° C. | 10 min | 1 cycle |

(4) Sequencing

Sequencing results are shown in FIG. 7. Various mutant viruses achieved site-directed mutation as expected.

5.4.3 Establishment of a Virus Working Bank (1) Planking of Cells, Inoculation of Viruses, and Collection of Samples Appropriate cultural conditions were selected according to instructions of various cells, and the cell amplification and passage was carried out according to passage ratios on the instructions. After being subcultured to the logarithmic growth phase, the cells were digested, inoculated into T25 culture flasks at 6×10$^5$ cells/flask, and subjected to adherent culture for 24 h;

After the cells were subjected to adherent culture for 24 h, the original medium was sucked away, a VP-SFM virus culture medium mixed with 20 μL of seed lot viruses was added, and placed in the virus incubator to wait for the cells to produce viruses. The cell morphology and whether fluorescence appeared were observed every 24 h, when more than 90% of cells floated up, the cells were photographed for record, and a Vero cell supernatant was collected and centrifuged at 4,000 rpm for 5 min. 100 μL of supernatant was placed into a 1.5 mL centrifuge tube and used as a sample for virus titer detection, and the rest was subpackaged into cryopreservation tubes (about 1.5 mL/tube) and stored with liquid nitrogen.

(2) Virus Titer Detection ((1)) BHK-21 cells were planked in a 96-well plate at 1,500 cells/well, and cultured at 37° C. under a 5% CO$_2$ condition. After being planked, the cells were used within 12 to 36 hours.

((2)) an appropriate amount of MEM basic medium was poured into a loading slot, the medium was added into a 96-well plate at 180 μL/well and used as diluent for later use. The MEM diluents were prepared according to the number of samples to be detected, 2 duplications were prepared for each sample, and 4 duplications were prepared for a reference sample;

((3)) the samples to be detected were oscillated thoroughly in a vortex oscillator for 15 to 30 seconds. 20 μL of sample to be detected was added into wells of the 1st column of "((2))". The mixture was uniformly mixed, and 20 μL of the mixture was sucked into wells of the next column. The sample was gradually diluted until wells of the 8th column. The tip should be changed for operation of each column, the diluted sample to be detected was fixed on a microplate mixer and oscillated at 3,000 rpm for 3 minutes;

((4)) the diluted virus solution was added to the cells at 20 μL/well, 10$^{-3}$ to 10$^{-8}$ virus solutions were added into the cells in the 96-well plate, and each plate was used for detection of two samples;

((5)) after the samples were loaded, the cells were cultured at 37° C. under a 5% CO$_2$ condition for 5 days (taking the day of virus loading as the first day);

((6)) 5 days later, whether the cells had an cytopathic effect (CPE) was observed under the microscope, and recorded; and ((7)) CCID50 values were calculated by a Spearman-Karber method. lg(CCID50×20/1000)=L−D(S−0.5), where L represents a logarithm of the maximum dilution, −1; D represents a difference between logarithms of the dilution, 1; and S represents a sum of proportions of positive wells (sum of the number of CPE/8)

Titer detection results of the working lot viruses are shown in Table 25.

TABLE 25

Titer results of working lot viruses

| No. | Virus strain | Virus titer CCID50/mL |
|---|---|---|
| 1 | E2-4K | 2.00 × 10$^7$ |
| 2 | E2-4L | 2.67 × 10$^6$ |
| 3 | E2-4I | 1.84 × 10$^6$ |
| 4 | E2-4V | 2.00 × 10$^6$ |
| 5 | E2-4S | 5.83 × 10$^6$ |
| 6 | E2-4C | 2.00 × 10$^6$ |
| 7 | E2-4M | 5.21 × 10$^5$ |
| 8 | E2-4D | 5.21 × 10$^7$ |
| 9 | NS3-358M | 2.00 × 10$^7$ |
| 10 | NS3-358G | 2.93 × 10$^7$ |
| 11 | NS3-358A | 5.00 × 10$^6$ |
| 12 | NS3-358L | 5.21 × 10$^7$ |
| 13 | NS3-358I | 3.28 × 10$^7$ |
| 14 | NS3-358V | 1.85 × 10$^7$ |
| 15 | NS3-358P | 2.11 × 10$^7$ |
| 16 | NS3-358S | 2.93 × 10$^5$ |
| 17 | NS3-358Q | 2.20 × 10$^7$ |
| 18 | NS3-358T | 3.75 × 10$^5$ |
| 19 | NS3-358C | 2.46 × 10$^5$ |
| 20 | NS3-358N | 9.26 × 10$^6$ |
| 21 | NS3-358F | 8.89 × 10$^6$ |
| 22 | NS3-358Y | 2.11 × 10$^6$ |
| 23 | NS3-358D | 6.67 × 10$^6$ |
| 24 | NS3-358K | 7.78 × 10$^7$ |
| 25 | NS3-358R | 5.83 × 10$^6$ |
| 26 | NS3-358H | 8.89 × 10$^6$ |

5.4.4 Kill Effects of the Viruses on HCT 116 Cells (1) Inoculation of Cells and Administration The cell amplification and passage was carried out according to culture conditions and passage ratios on instructions of various cells. After being cultured to the logarithmic growth phase, the cell were digested, and inoculated into a 48-well plate at a density of 10,000 cells/well, and a total volume of each well was 200 μL; blank control groups, negative control groups, and multiple gradients of the viruses: ((1)) 0.1 ((2)) 1 ((3)) 10 MOI experimental groups (3 duplicated plated for each group, see Table 26, A to H in the table represented different viruses) were set, the blank control groups were not inoculated with cells, and the negative control groups were inoculated with VP-SEM in the quantity equal to the inoculation dosage of the viruses.

TABLE 26

Administration design for 48-well plate

| Blank control | Negative control | Negative control | Negative control | Negative control | Negative control | Negative control | Blank control |
|---|---|---|---|---|---|---|---|
| Blank control | A((1)) | A((2)) | A((3)) | B((1)) | B((2)) | B((3)) | Blank control |
| Blank control | C((1)) | C((2)) | C((3)) | D((1)) | D((2)) | D((3)) | Blank control |
| Blank control | E((1)) | E((2)) | E((3)) | F((1)) | F((2)) | F((3)) | Blank control |
| Blank control | G((1)) | G((2)) | G((3)) | H((1)_) | H((2)) | H((3)) | Blank control |
| Blank control | Negative control | Negative control | Negative control | Negative control | Negative control | Negative control | Blank control |

After the viruses were loaded, the cells were continuously cultured for 72 h, the cell morphology was observed under the microscope at the end point and photographed for record, the cell viability was detected, and IC50 of various viruses on the detected cells were calculated.

(2) Detection of the Cell Viability by a CCK-8 Method

The original culture solution in the 48-well plate was removed, a color-developing agent (90% complete medium+10% CCK-8 solution) was slowly added along the wall at 200 μL/well, and after the cells were cultured at 37° C. for 0.5 to 3 h, absorbance values of various wells were detected in a wavelength of 450 nm by using the absorbance microplate reader.

(3) Calculation of Median Inhibitory Concentrations (IC50) of the Viruses Against Various Cells Cell growth inhibition rates of various wells were calculated according to the detected absorbance values of various wells by a formula of cell growth inhibition rate (IR)= (Average $OD_{solvent}$–$OD_{experiment}$)/(Average $OD_{solvent}$–Average $OD_{blank}$)×100%, cell growth inhibition curves were drawn by using GraphPad Prism 8.0 software, and median inhibitory concentration (IC50) values of various viruses against tumor cells were calculated by a log (inhibitor) vs. response-variable slope (four parameters) analysis equation.

Figure 8A:
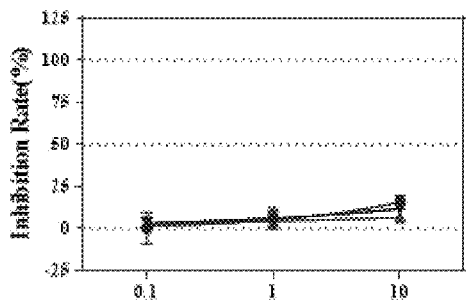
FIGS. 8A to 8Z show kill curves of various site-directed (single-point mutant) mutant strains of an M1 virus to HCT 116.
Figure 8B:
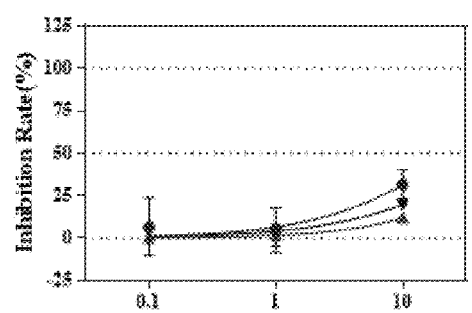
FIG. 8B shows a kill curve of a mutant strain E2-4L.
Figure 8C:
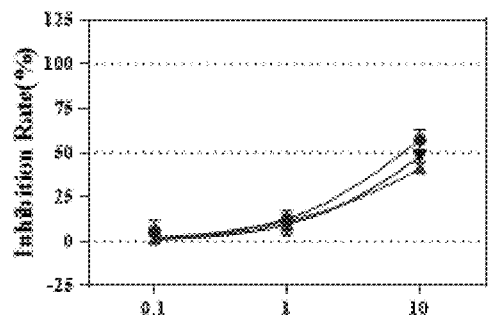
FIG. 8C shows a kill curve of a mutant strain E2-4I.
Figure 8D:
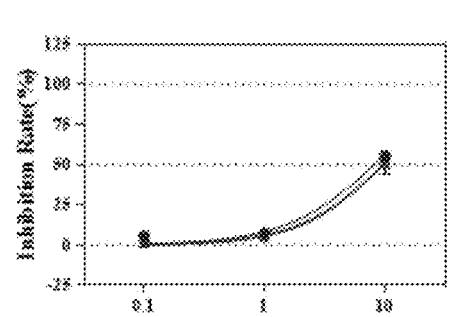
FIG. 8D shows a kill curve of a mutant strain E2-4V.
Figure 8E:
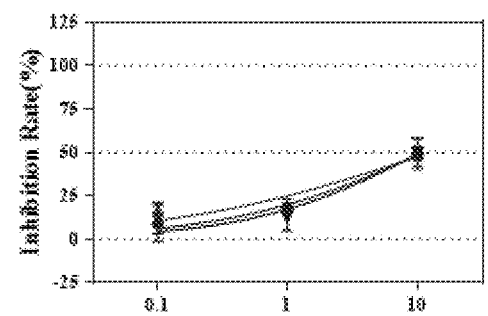
FIG. 8E shows a kill curve of a mutant strain E2-4S.
Figure 8F:
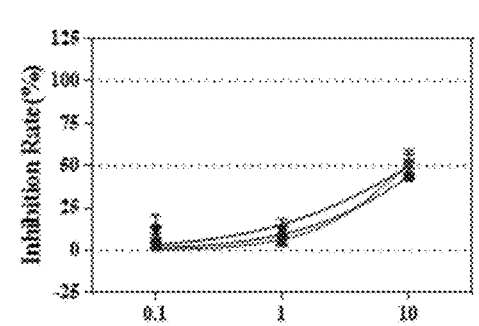
FIG. 8F shows a kill curve of a mutant strain E2-4C.
Figure 8G:
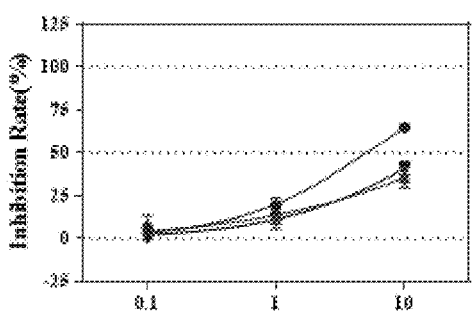
FIG. 8G shows a kill curve of mutant strain E2-4M.
Figure 8H:
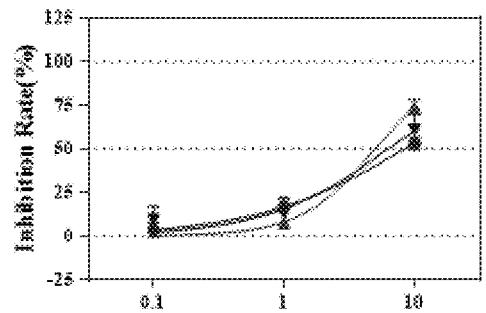
FIG. 8H shows a kill curve of a mutant strain E2-4D.
Figure 8I:
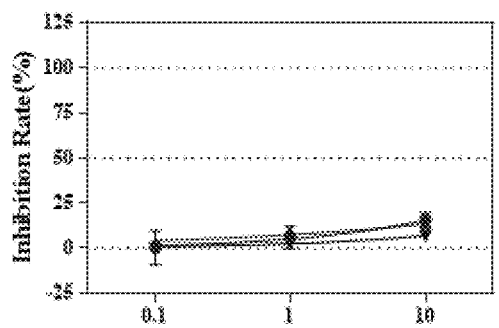
FIG. 8I shows a kill curve of rM-WT (NS3-358M)
Figure 8J:
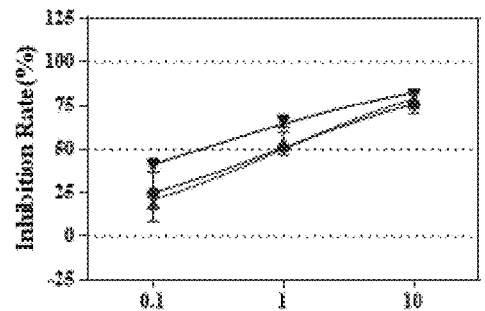
FIG. 8J shows a kill curve of a mutant strain NS3-358G.
Figure 8K:
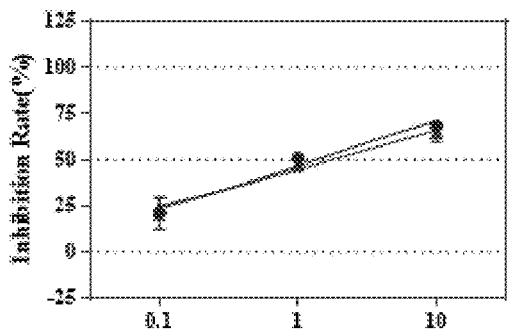
FIG. 8K shows a kill curve of a mutant strain NS3-358A.
Figure 8L:
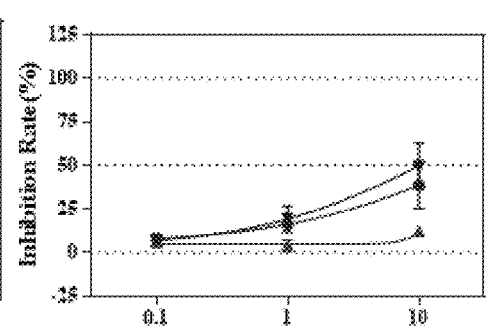
FIG. 8L shows a kill curve of a mutant strain NS3-358L.
Figure 8M:
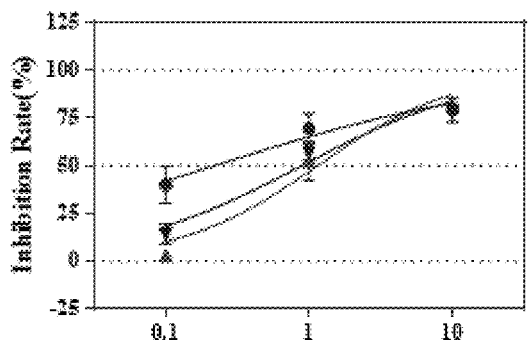
FIG. 8M shows a kill curve of a mutant strain NS3-358I.
Figure 8N:
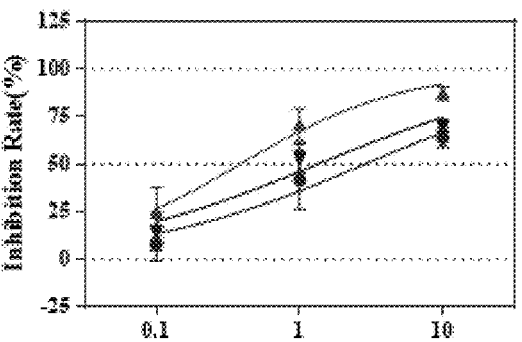
FIG. 8N shows a kill curve of a mutant strain NS3-358V.
Figure 8O:
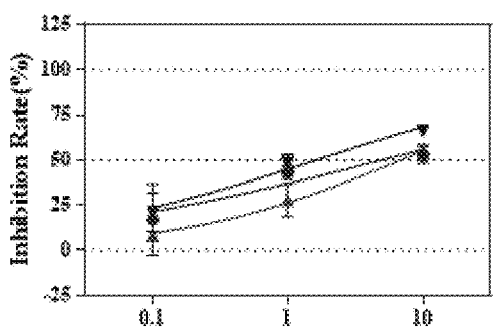
FIG. 8O shows a kill curve of a mutant strain NS3-358P.
Figure 8P:
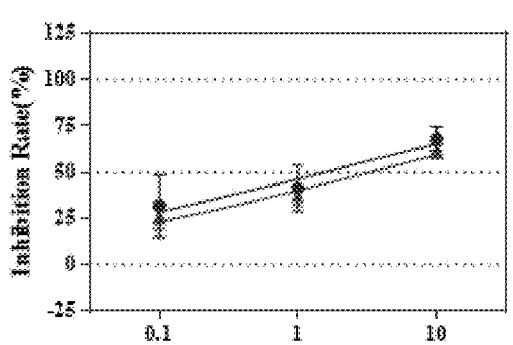
FIG. 8P shows a kill curve of a mutant strain NS3-358S.
Figure 8Q:
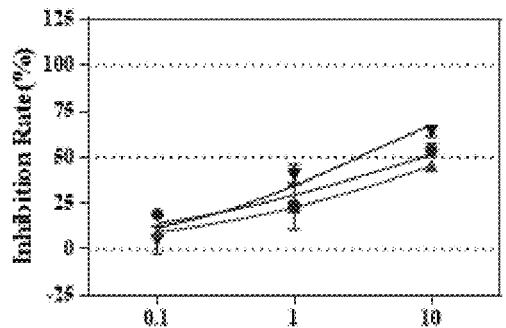
FIG. 8Q shows a kill curve of a mutant strain NS3-358Q.
Figure 8R:
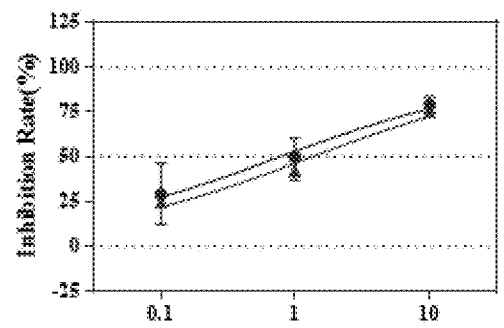
FIG. 8R shows a kill curve of a mutant strain NS3-358T.
Figure 8S:
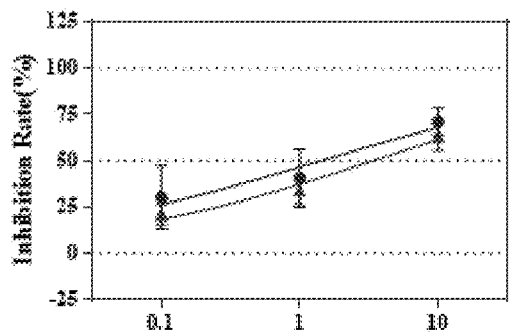
FIG. 8S shows a kill curve of a mutant strain NS3-358C.
Figure 8T:
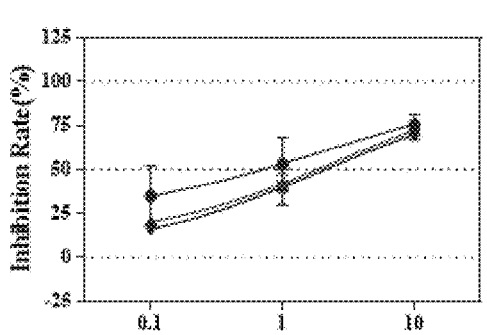
FIG. 8T shows a kill curve of a mutant strain NS3-358N.
Figure 8U:
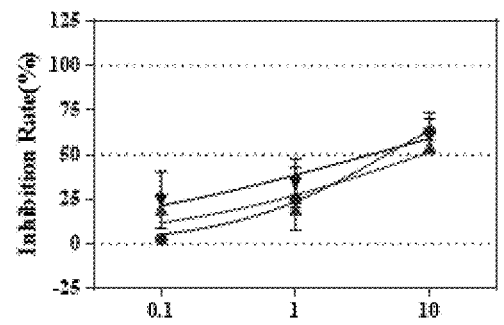
FIG. 8U shows a kill curve of a mutant strain NS3-358F.
Figure 8V:
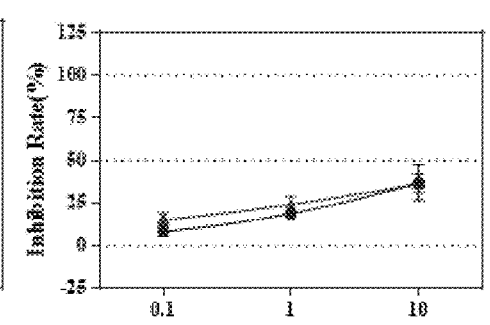
FIG. 8V shows a kill curve of a mutant strain NS3-358Y.
Figure 8W:
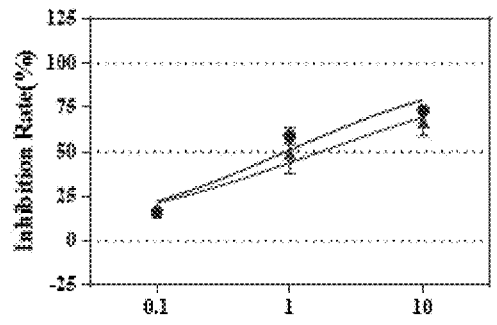
FIG. 8W shows a kill curve of a mutant strain NS3-358D.
Figure 8X:
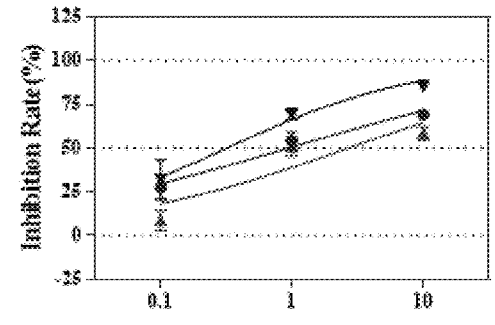
FIG. 8X shows a kill curve of a mutant strain NS3-358K.
Figure 8Y:
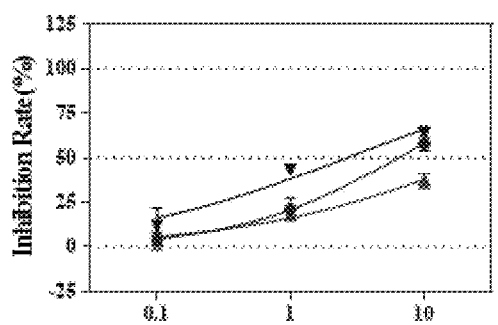
FIG. 8Y shows a kill curve of a mutant strain NS3-358R.
Figure 8Z:
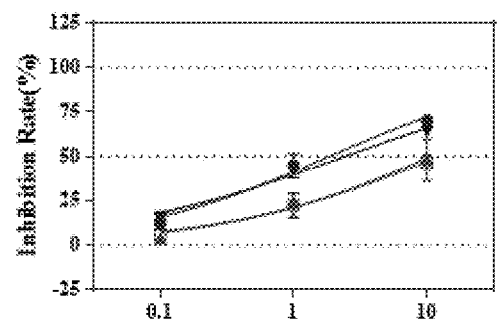

Kill curves of various site-directed mutant strains of the M1 virus are shown in FIG. 8A to 8Z (note: each curve in the figures represents one independent experiment, the x-axis represents virus infection MOI, and the y-axis represents the inhibitory rate).

REFERENCES

1. Greenman C, Stephens P, Smith R, et al. Patterns of somatic mutation in human cancer genomes. Nature 446: 153-158, 2007.
2. Wood L D, Parsons D W, Jones S, et al. The genomic landscapes of human breast and colorectal cancers. Science 318: 1108-1113, 2007.
3. Pavet V, Portal M M, Moulin J C, Herbrecht R, and Gronemeyer H. Towards novel paradigms for cancer therapy. Oncogene 30: 1-20, 2011.
4. Workenhe S T and Mossman K L. Oncolytic virotherapy and immunogenic cancer cell death: sharpening the sword for improved cancer treatment strategies. Mol Ther 22: 251-256, 2014.
5. Sun Q1, Barz M2, De Geest B G3, et al. Nanomedicine and macroscale materials in immuno-oncology. Chemical Society 2018 Nov. 22.
6. Tran E1, Robbins P F1, Rosenberg S A. 'Final common pathway' of human cancer immunotherapy: targeting random somatic mutations. Nature Immunology 2017 Feb. 15; 18(3): 255-262.
7. Das T, Jaffar-Bandjee M C, Hoarau J J, et al. Chikungunya fever: CNS infection and pathologies of a re-emerging arbovirus. Prog Neurobiol 91: 121-129, 2010.
8. Kelvin A A. Outbreak of Chikungunya in the Republic of Congo and the global picture. J Infect Dev Ctries 5: 441-444, 2011.
9. Moran T P, Burgents J E, Long B, et al. Alphaviral vector-transduced dendritic cells are successful therapeutic vaccines against neu-overexpressing tumors in wild-type mice. Vaccine 25: 6604-6612, 2007.
10. Weaver S C, Salas R, Rico-Hesse R, et al. Re-emergence of epidemic Venezuelan equine encephalomyelitis in South America. VEE Study Group. Lancet 348: 436-440, 1996.
11. Li X D, Qiu F X, Yang H, Rao Y N, and Calisher C H. Isolation of Getah virus from mosquitos collected on Hainan Island, China, and results of a serosurvey. Southeast Asian J Trop Med Public Health 23: 730-734, 1992.
12. Wen J S, Zhao W Z, Liu J W, et al. Genomic analysis of a Chinese isolate of Getah-like virus and its phylogenetic relationship with other Alphaviruses. Virus Genes 35: 597-603, 2007.
13. Zhai Y G, Wang H Y, Sun X H, et al. Complete sequence characterization of isolates of Getah virus (genus Alphavirus, family Togaviridae) from China. J Gen Virol 89: 1446-1456, 2008.
14. Charlotte Rafaluk, Gunther Jansen, Hinrich Schulenburg, and Gerrit Joop. When experimental selection for virulence leads to loss of virulence. Trends Parasitol. 2015 September; 31 (9): 426-34.
15. Jose Luis Martinez, Fernando Baquero and Dan I Andersson. Beyond serial passages: new methods for predicting the emergence of resistance to novel antibiotics. Current Opinion in Pharmacology 2011, 11: 439-445.

REFERENCE TO A "SEQUENCE LISTING," A TABLE, OR A COMPUTER PROGRAM LISTING APPENDIX SUBMITTED AS AN ASCII TEXT FILE

The material in the ASCII text file, name "WANH-65386-Sequence-Listing_ST25.txt", created Nov. 27, 2021, file size 102,400 bytes, is hereby incorporated by reference.

The invention claimed is:

1. An M1 virus comprising:
   an NS3 protein comprising an amino acid sequence having at least 90% or at least 91% or at least 92% or at least 93% or at least 94% or at least 95% or at least 96% or at least 97% or at least 98% or at least 99% or at least 99.5% or at least 99.8% or at least 99.9% or 100% sequence identity with an amino acid sequence shown as SEQ ID NO: 8; and in which amino acid residue M at 358th site in SEQ ID NO:8 is substituted into G, A, L, I, V, P, S, Q, T, C, N, F, Y, D, K, R or H; and/or
   an envelope protein comprising an amino acid sequence having at least 90% or at least 91% or at least 92% or at least 93% or at least 94% or at least 95% or at least 96% or at least 97% or at least 98% or at least 99% or at least 99.5% or at least 99.8% or at least 99.9% or 100% sequence identity with an amino acid sequence shown as SEQ ID NO: 12 or SEQ ID NO: 31; and in which amino acid residue K at 4th site in the SEQ ID NO: 12 or amino acid residue E at 4th site in the SEQ ID NO: 31 is substituted into M, L, I, V, S, C, N, or D.

2. An M1 virus comprising: an NS3 protein and an envelope protein E2 encoded by a nucleotide sequence of the M1 virus, wherein
   the NS3 protein comprising an amino acid sequence having at least 90% or at least 91% or at least 92% or at least 93% or at least 94% or at least 95% or at least 96% or at least 97% or at least 98% or at least 99% or at least 99.5% or at least 99.8% sequence identity with the amino acid sequence shown as SEQ ID NO: 8, and in which amino acid residue M at 358th site in the SEQ ID NO:8 is substituted into G, A, L, I, V, P, S, Q, T, C, N, F, Y, D, K, R or H; and/or
   the envelope protein E2 comprising an amino acid sequence having at least 90% or at least 91% or at least 92% or at least 93% or at least 94% or at least 95% or at least 96% or at least 97% or at least 98% or at least 99% or at least 99.5% or at least 99.8% sequence identity with the amino acid sequence shown as SEQ ID NO: 12 or SEQ ID NO: 31, and in which amino acid residue K at 4th site in the SEQ ID NO: 12 or amino acid residue E at 4th site in the SEQ ID NO: 31 is substituted into M, L, I, V, S, C, N, or D.

3. A virus vector, wherein the virus is an M1 virus according to claim 1.

4. A method for treating a tumor in a subject in need thereof, comprising: administering to the subject an effective amount of M1 virus according to claim 1.

5. The method according to claim 4, wherein the tumor is selected from a solid tumor.

6. A method for treating a tumor in a subject in need thereof, comprising: administering to the subject an effective amount of the M1 virus according to claim 2.

7. A method for treating a tumor in a subject in need thereof, comprising: administering to the subject an effective amount of vector according to claim 3.

8. An anti-tumor agent, comprising an M1 virus according to claim 1.

9. An anti-tumor agent, comprising a vector according to claim 3.

10. An anti-tumor composition, comprising an effective amount of M1 virus according to claim 1 and a pharmaceutically acceptable carrier.

11. A composition, comprising a vector according to claim 3 and a pharmaceutically acceptable carrier.

12. An M1 virus, comprising:
    an NS3 protein comprising an amino acid sequence in which amino acid residue M at 358th site in SEQ ID NO:8 is substituted into G, A, L, I, V, P, S, Q, T, C, N, F, Y, D, K, R or H; and/or
    an envelope protein E2 comprising an amino acid sequence in which amino acid residue K at the 4th site in SEQ ID NO: 12 or amino acid residue E at the 4th site in SEQ ID NO: 31 is substituted into M, L, I, V, S, C, N, or D.

13. The M1 virus according to claim 1, wherein:
    the M1 virus is obtained by a mutation of an amino acid residue M corresponding to the 358th site of the NS3 protein of the M1 virus having the sequence shown as SEQ ID NO: 5 into G, A, L, I, V, P, S, Q, T, C, N, F, Y, D, K, R or H; and/or
    a mutation of an amino acid residue K at the 4th site of the E2 protein into M, L, I, V, S, C, N, or D.

14. The M1 virus according to claim 1, wherein:
    the amino acid residue M corresponding to the 358th site of the NS3 protein of the M1 virus mutates into L relative to the M1 virus having the sequence shown as SEQ ID NO: 15; and/or
    the amino acid residue E corresponding to the 4th site of the E2 protein mutates into D.

15. The virus vector according to claim 3, wherein the vector is inserted with exogenous genes.

16. The virus vector according to claim 15, wherein the exogenous genes express anti-tumor-associated molecules.

17. The method according to claim 5, wherein:
    the solid tumor is selected from one or more of liver cancer, colorectal cancer, bladder cancer, breast cancer, cervical cancer, prostate cancer, a glioma, melanoma, pancreatic cancer, nasopharyngeal carcinoma, lung cancer, stomach cancer, adrenocortical carcinoma, accessory renal cortical carcinoma, anal cancer, appendix cancer, astrocytoma, atypical teratoma, a rhabdoid tumor, basal cell carcinoma, cholangiocarcinoma, bladder cancer, bone cancer, a brain tumor, a bronchial tumor, Burkitt lymphoma, a carcinoid tumor, a heart tumor, cholangiocarcinoma, chordoma, carcinoma of large intestine, craniopharyngioma, ductal carcinoma in situ, a germ tumor, endometrial cancer, ependymoma, esophageal cancer, olfactory neuroblastoma, a germ Cell tumor, an extragonadal germ cell tumor, retinoblastoma, carcinoma of fallopian tube, carcinoma of gallbladder, head and neck cancer, hypopharyngeal cancer, Kaposi's sarcoma, renal carcinoma, Langerhans cell histiocytosis, laryngeal cancer, lip cancer, oral cancer, Merkel cell carcinoma, malignant mesothelioma, multiple endocrine neoplasia syndrome, mycosis fungoides, carcinoma of nasal cavity and nasal sinuses, neuroblastoma, non-small cell lung cancer, ovarian cancer, a pancreatic neuroendocrine tumor, an islet cell tumor, papillomatosis, paraganglioma, carcinoma of nasal sinuses and nasal cavity, parathyroid carcinoma, carcinoma of penis, throat cancer, a pituitary tumor, pleuropulmonary blastoma, primary peritoneal carcinoma, retinoblastoma, a salivary gland tumor, sarcoma, Sezary syndrome, skin cancer, small cell lung cancer, carcinoma of small intestine, soft tissue sarcoma, squamous cell carcinoma, testicular cancer, thymoma and thymic cancer, thyroid cancer, urethral cancer, uterine cancer, endometrium and uterine sarcoma, vaginal cancer, a vascular tumor, vulvar cancer, and solitary myeloma.

18. The anti-tumor composition according to claim 10, wherein the composition further comprises an immune checkpoint inhibitor.

19. The anti-tumor composition according to claim 10, wherein the composition further comprises a chemotherapeutic agent.

* * * * *

SEQUENCE LISTING

<160> NUMBER OF SEQ ID NOS: 43

<210> SEQ ID NO 1
<211> LENGTH: 18
<212> TYPE: DNA
<213> ORGANISM: Artificial sequence
<220> FEATURE:
<223> OTHER INFORMATION: Synthetic construct Mutant protein NS3 F primer

<400> SEQUENCE: 1
gctcctcctt tccattgc                                                 18

<210> SEQ ID NO 2
<211> LENGTH: 20
<212> TYPE: DNA
<213> ORGANISM: Artificial sequence
<220> FEATURE:
<223> OTHER INFORMATION: Synthetic construct Mutant protein NS3 R primer

<400> SEQUENCE: 2
ttcttctctt tcttggtgcc                                               20

<210> SEQ ID NO 3
<211> LENGTH: 20
<212> TYPE: DNA
<213> ORGANISM: Artificial sequence
<220> FEATURE:
<223> OTHER INFORMATION: Synthetic construct Mutant protein E2 F primer

<400> SEQUENCE: 3
tgatgatgtg cgtcttagcc                                               20

<210> SEQ ID NO 4
<211> LENGTH: 18
<212> TYPE: DNA
<213> ORGANISM: Artificial sequence
<220> FEATURE:
<223> OTHER INFORMATION: Synthetic construct Mutant protein E2 R primer

<400> SEQUENCE: 4
atcgtgcctc gaatagcg                                                 18

<210> SEQ ID NO 5
<211> LENGTH: 11696
<212> TYPE: RNA
<213> ORGANISM: Unknown
<220> FEATURE:
<223> OTHER INFORMATION: Alphavirus M1 genome

<400> SEQUENCE: 5
auggcggacg ugugacauca ucguucgcuc uuucuaggau ccuuugcuac uccacauagu      60
gagagacaaa caacccaaau gaagguaacc guggacguug aggcugauag cccauuccuu     120
aaggcccuuc agaaggcguu ucccgccuuu gagguugaau cacagcaggu cacaccgaau     180
gaccaugcua acgcuagagc auuuucgcau cuggcuacua aacugauuga gcaagagguu     240
ccaacaggcg ucaccauccu ggacguggu agugcacccg caaggagguu gaugucugac      300
cacaccuacc acugcaucug ccccaugaaa agugcggaag acccagagag gcuggcgaau     360
uacgcucgaa agcuggcgaa agcacgggga cugugcuag acaagaaugu guccggaaag     420
auaacggacc ucaagacgu cauggccacu ccagacuugg aauccccgac uuuuugccug     480
cacacugacg agacgugccg cacuagggcu gaggucgcug uguaccagga cguauacgcu     540
gugcacgcac cgacgucacu guauaccag gccaucaaag gugucaggac ggcguauugg     600

-continued

```
auuggauucg acaccacucc auucauguuc gaggcacuag cgggcgcgua uccugcguac    660
ucgaccaacu gggcagauga gcaagugcug caggcucgua acaucggccu gugcgcgaca    720
ggccucuccg aggggcgucg cggcaaacuc uccaucauga gaaagaagug cuugcgaccg    780
agcgacagag uaauguuuuc ggucgggucc accuuguaca ccgagagccg aaagcugcug    840
cgcagcuggc auuuaccuuc cguguuucac cugaagggua agaacaguuu uaccugcagg    900
ugcgacacgg uggugucaug cgaagguuac gugguaaaga agaucaccau aagcccgggc    960
auauauggaa aaacagucga uuacgcaguu acccaucacg cagaggguuu ucggugugu    1020 aagaucacug uacagucag aggagaaaga gucucuuucc cggucuguac cuaugugccu    1080
gcaaccauau gcgaucagau gacggguaua cuugccaccg acgugacacc agaggaugcc    1140
cagaagcucc ugguuggauu gaaccaacgc auagugguga augguaggac gcaaagaaac    1200
acaaacacaa ugaaaaacua ucuacugcca gugguagcgc aagcauucag uaaaugggca    1260
cgagaggcac gcgcagacau ggaggaugaa aaaccccuag gcaccagaga acgcacguug    1320 acguuguu ccugugggc guuuaaaagc cacaaaaccc acaccaugua uaagcggccu    1380
gaaacucaaa cuaucgucaa agugccuucc acuuuugacu ccuuugugau accgagccug    1440
aggucaucca gucuuuccau ggauaucaga cggaggauca aacugcuacu cagcgcaaga    1500
auggcccaag gccuaccaua cucaggagac cgcacugaag cucgcgcggc agaagaagaa    1560
gagaaggagg cgcaggaggc agaacuuacg agggcagcgc ugccaccgcu agugagcggc    1620
ucuugcgcug acgauaucgc ccagguggau guagaggaau uaaccuucag agccggagcc    1680 ggguugugg aaacacccag gaaugcccug aagguuacac cgcaagcaca cgaccaccuc    1740
auaggcuccu acuugauccu uuccccccaa acgguguuga aaagcgagaa gcuugcacccс    1800 auccaccccuc uugcugagca agucacgguc augcccacu cuggaagauc cggcagauac    1860
ccagucgaca aguacgacgg acgguauug aucccaacag gagcggccau cccagugagu    1920 gaguccagg cacucagcga gagcgcaacc augguguaca augagaggga auuuauaaau    1980
cgcaagcuac accacauagc gcuauacggg ccagccuuga uaccgacga ggaaagcuac    2040 gaaaaaguga gagcugagag ggcagagaca gaguaugugu uugacgugga caagaaggca    2100
uguaucaaga aggaggaggc aucaggccuu guguuaacag gggaccuaau caauccaccu    2160
uuccacgaau ucgauacga aggacucaag auccgcccag cagccccgua ccacgacgacg    2220 aucauuggug uguuuggcgu uccagguucg ggcaagucgg cuaucauuaa gaacauggug    2280
acgacucgcg aucggggugc caguggaaag aaggagaacu gccaagagau caugaaugau    2340
guaaagaggc aacgcgggu ggacgugacc gcuaggaccg ucgacucaau cuuauugaau    2400 ggggcaaga aaggcguaga aaaccuuuac gucgaugagg cguucgcgug ucacucgggc    2460
acuuugcuag cgcucaucgc gcuggugaga ccgucaggua agguaguacu gugcggcgac    2520
cccaagcagu ugguuucuu caauuugaug caacugaagg ugcacuauaa ccacaacauu    2580
uguacaaggg ugcuccauaa gagcaucccc agaagaugca cucuaccugu uacggcgauc    2640
guguccaccu ugcacuacca agggaagaug agaacgacga accgaugcaa cacccccauu    2700
cagauugaca ccaccgguuc uuccaaacca gccucaggag auaucguguu aacgugcuuc    2760
cgcggcuggg ugaagcaacu gcaaaucgac uaucguggac acgaggugau gaccgcagcu    2820
gcuucccagg gucugacaag gaaaggcgug uacgccguga cagaaagu gaacgaaaac    2880 ccacuguacu caccacuguc ggagcacgu aaugugcugu ugacccgaac ugaaaaccga    2940
```

-continued

```
cuggugugga agacacuguc gggugacccg uggauaaagg uguuaaccaa uguuccacgu    3000
ggggauuuca gugcaacuuu ggaggaaugg caagaagaac augacgguau caugagagug    3060
uugaacgagc gaccggcgga gguugaucca uuccaaaaca aggccaaagu gugcugggca    3120
aaaugucugg ugcaaguucu ugagacggcc ggaauacgua ugacggcaga ugaauggaac    3180
accaucuugg cuucagagag ggacagagcg uacucaccag aagucgcucu caacgagauu    3240
ugcacucguu acuacggcgu ugaccuagac agcggccuau ucuagcgca gucaguuucc    3300
cucuuuuaug agaacaacca cugggacaac aggcccggag gacgcaugua cgggucaac     3360
caugaaguag ccaggaaaua ugcagccagg uuuccauuuc uacgugcgaa caugaacucg    3420
gggcuacaac uaaacgucccu ugagaggaag cuccaaccuu uuagcgcuga augcaauaua   3480
gucccauccaa aucgucgguu accgcaugcu cuagucacaa gcaucagca ugccguggg     3540
gagagggugag aguguuugcu gaaaaagauu ccaggucacc aaauguuacu uguaagugag   3600
uacaaccugg ugauaccuca caaaagaguc uucggauug caccuccgcg ggugucaggc     3660
gcggaccgca cguacgacau ggaccuaggg uuaccuaugg augcaggccg uuacgaucug    3720
guauucguca acauccauac ugaguaccgg caacaccacu accaacaaug cgucgaccau    3780
ucaaugcguc ugcagaugcu gggagggggau ucacuacacc ugcuuagacc aggaggcucg   3840
cugcugauga gagcauaugg uuacgcagac agagucagcg agaugguggu gacagcccug    3900
gcuaggaaau ucucggcguu ccgucccug agaccggcgu gugugacgag caacacagaa     3960
guguuccugc uguuuucaaa cuuugauaac ggcagaagag cgguaaccuu gcaccaagcu    4020
aaccagaaac uuagcucaau guaugccugc aacggacugc acacugcugg cugugcaccg    4080
ucauacaggg uccgccgcgc agauauauca ggacacggug aggaagcagu cguaaaugcu    4140
gccaaugcca agggugaccgu gagcgaugga gugugcaggg cggucgcuaa gaaguggcca   4200
ucaucuuuca aagggggcugc aacuccaguc ggcacagcca agaugauccg cgcagauggc    4260
augaccguaa uccacgcagu gggaccgaac uucuccaccg uaacagaagc cgaagggggac   4320
agagagcuag cggccgcgua ccgagcugug gcuagcauaa uuaguaccaa caacauaaag    4380
agcgucgcag uaccgcugcu auccacaggc accuuuuccg gcgguaagga cagagugaug    4440
caguccuuga accacuuauu cacggcauug gaugccaccg augcagacgu gguuaucuac    4500
ugcagagaua aaaacuggga aaagaagauu caggaagcca ucgacaggcg gacggcaaua    4560
gagcucguau ccgaagacgu gaccuuggaa accgaucugg uuaggguaca cccggacagu    4620
ugcuuagucg gcagaaaugg uuacagugca acugacggua aacuguacuc uuaccuugag    4680
ggcacgaggu uccaccagac ggcggucgac auggcugaaa uaucaacuuu auggccaaga    4740
cuccaagaug cuaacgagca gaucugccug uacgcccuag gggagacgau ggacagcaua    4800
cgcacuaaau gcccaguaga ggacgccgau ucgucuacgc cgccgaaaac gguaccgugu    4860
cuaugucggu acgcgaugac cgcggagcgg guugccagac uuaggaugaa uaacaccaaa    4920
aacaucaucg ugugcuccuc cuuuccauug ccgaaguaca ggauagaagg cgucagaag    4980
gugaaguguc accgagugcu aauuuuugac cagaccgucc cgucacuagu aagucccaga    5040
aaguacauac agcagccgcc ggaacagcug gauaaugugu gccugacuuc uacgacgucg    5100
acgggauccg cauggucauu uccaucggaa acgaccuacg aaaccaugga agucguagcc    5160
gagguacaca ccgaaccucc gauccuuccg ccucgccgac guagagcagc cgucgcccaa    5220
cuuuagacagg aucuggaagu caccgaggag aucgagccgu acgugauaca gcaagcagag    5280
aucauggguca uggagagggu cgcgacgaca gacauacgcg cuaucccagu cccggcacgg    5340
```

```
cgggccauua caaugccagu cccagccccc aguguucgua aggucgcuac cgaaccucca   5400
uuagaaccgg aagcuccuau cccggcacca agaaagagaa gaaccacugg caccacaccu   5460
ccgcauaacc ccgaggauuu cguucccagg guaccgguug aguuaccgug ggagccggaa   5520
gaccuagaca uccaauucgg ugacuuggag ccacgccgcc ggaacaccag ggaccgagau   5580
gucagcacag gaauacaguu cggugacauc gacuuuaacc aguccugacu aggcagggcu   5640
ggcgcguaua ucuuuucguc ugacacuggc ccgggucacc uacagcagaa guccguaagg   5700
caacaugaau ugccaugcga gacucuguau gcccaugaag acgaacgcau uacccgccg    5760 gcauuugacg gagagaaaga gaagguacuc caggcaaaga ugcagauggc cccgacagaa   5820
gcgaauaaga gcagguacca gucgaggaaa guagagaaca ugaaggcauu aauuguagaa   5880
agacuacgcg aaggagcaaa gauguaccuc caugagcaaa ccgacaaagu acccacguac   5940
accagcaagu acccuagacc uguguacuca ccaucggugg augacagccu gagcgauccg   6000
gauguggcug uggccgccug uaacucuuuc uuagaggaga uuauccgac cguggcgaac   6060 uaccagauaa ccgaugagua ugacgcuuau cuggacuugg ucgacggcuc ugaaagcugc   6120
cucgacagag cuacguucug cccggccaaa cuaagauguu acccuaagca ccacgcauac   6180
caccaaccac aaaucaggag cgcaguaccu uccccuuucc aaaacacguu acaaaacgug   6240
cuagccgcgg ccacuaaaag aaauuguaau gucacccaaa ugagagaauu accaccaug    6300 gacucugcgg uguuuaacgu agaaagcuuc aaaaaauacg ccuguaccgg cgaauauugg   6360
caagaauuua aagacaaucc uauacggauc accaccgaaa acauaacgac guacguggcu   6420
aaacucaagg guccaaaggc ugcugcccuu uuugccaaga cgcauaaccu ggugccgcuc   6480
caggaggugc caauggaccg cuucgugaug gauaugaaga gagaugugaa aguuacacca   6540
ggcaccaagc auaccgaaga aaggccuaaa gugcaaguga uucaagcggc ggaaccauug   6600
gccacggcau auuuaugcgg aauccacaga gaguuagca ggcggcuaaa agccguucug   6660
accccgaaca uucacacucu guuugacaug uccgcggagg acuuugaugc caucauagcg   6720
gcacauuuuc aaccgggaga ugcuguacug gagacagaua ucgcauccuu cgauaagagc   6780
caagacgacu ccuuagcgcu aacggcgcua augcuucugg aagaccucgg ggucgaccaa   6840
gaacugcugg accuuaucga agcgcguuu ggugagauca cgagugugca ucuaccacc    6900 gguacaagau uuaaauucgg ugcuaugaug aagucaggaa uguucuuac acuccucauc   6960 aacacgcugc ugaacauugu cauagcgugc cgcgucuuac gcgacaaauu aucguccucg   7020
gcgugcgccg ccuucauagg ugaugacaac auagugcacg gcgugaagguc agacccgcua   7080 auggcagaaa ggugugcgag uggggucaac auggaaguaa agaucaucga ugccacaaug   7140
ugugagaaac caccguacuu uguggaggau ucauccugu acgacagugu cgccgguaca   7200
gcguguaggg uugcagaccc guuaaagagg cuguucaaac ucgggaaacc gcucccagcg   7260
gacgacaacc aggaugaaga cagaagaagg gcacuaaaag acgaaacagu uaagguggucc   7320 cgcauaggau ugagagaaga auuagacgug gcacugagcu caagauacca agucagugcc   7380
gucgggaaca ucacuagagc gauguccacg cugucuaaga uuugaaguc uuuuaggaaa   7440 auaagagguc ccauuauaca ucuguacggc gguccaaauu agaugcagga uuacacuaca   7500
ucuaaagacc acguauuaca gacaccauga uuacaucccc aacucaaacc uuuuacggac   7560 gccguugcg accacgcccg gcguuccguc caugcggggu gccgaugcag ccggccccac   7620
ccaugauucc agagcugcaa acuccgaucg uccaggccca acagaugcag cagcuaauca   7680
```

-continued

```
gugcaguuuc ugcccugacg acuaagcaaa auggcaaagc accgaagaag ccgaagaaaa    7740
agccgcaaaa agcgaaggcu aagaaaaacg aacagcaaaa gaaaaacgag aacaagaaac    7800
caccaccuaa gcagaagaau ccggcuaaga agaagaaacc aggaaaaagg gaacgcaugu    7860
gcaugaagau agaaaaugau ugcaucuucg aggucaagcu ugacgguaag gucacgggau    7920
acgccugccu agucggggau aaagugauga agccggcaca cgucaaaggu gugaucgaca    7980
accccgaccu agcgaagcuu accacaaga aaucgagcaa guaugaccua gagugcgccc    8040
agauaccggu gcacaugaag ucagaugcuu caaaauacac ccaugaaaaa ccagaagggc    8100
acuacaauug gcaucacggu gcagugcagu acagcggugg cagguucaca auccgacag    8160
gcgcagguaa accaggagac agcggccggc cgaucuucga caacaaagga cgugugguggg    8220
ccauuguccu ggggagggcc aacgaaggag ccaggacugc ccuaucuguc ugaccugga    8280
ccaaagacau ggucacacgg uacaccccag aaggaacaga agaauggucc gccgccuuga    8340
ugaugugcgu cuuagccaac guuacauucc caugcucaga gcccgcaugu gcacccuguu    8400
gcuaugaaaa acaaccagaa cagacacuga ggauguugga ggacaacgug gaccgcccgg    8460
gcuacuacga ccugcucgag gccacgauga cguguaacaa cagugcacgc caccgucgca    8520
gugugacgaa acacuucaau gucuacaagg ccacgaaacc guaccuagcg uauugcgcgg    8580
acugcggaga cgggcaguuc uguuacagcc ggguggcuau agaaaaaauu agggaugagg    8640
cuuccgaugg caugauaaag auccaggucg cagcgcaaau uggcaucaac aaaggaggaa    8700
cacacgaaca caacaaaauc agguacaucg ccgggcauga caugaaagag gcaaaccggg    8760
auucuuuaca agugcauacu uccggugugu gcgcuauucg aggcacgaug gccacuuca    8820
ucguggccua cugcccucca gggggcgaac uaaaggucca guccaagau gcagaaucgc    8880
acacacaggc cugcaaagug caguacaaac acgucccggc cccaguaggc agagaaaaau    8940
ucaccgucag gcccacuuc gguaucgaag ugccaugcac aacguaccag cugacuaccg    9000
caccgacgga ggaagagauc gacaugcaua ccccaccgga uacccagac auaacguugc    9060
ugucgcagcg gucaggaac guaaagauca cagcaggagg aaaaaccauc agauacaacu    9120
gcacgugugg uagugcaac guggcacca ccaguagcga caagacuauc aauucgucga    9180
aaauagcaca gugccacgcu gcggugacua accacgauaa guggcaguac accuccucgu    9240
uuguccccuag agccgaccag uugucucgca aagguaaagu gcacguaccc uucccucuga    9300
ccaacuccac augcagggug cccuugcac gugcaccagg ugucauauac ggaaagagag    9360
aacugacagu gaaacugcau ccagaucauc ccacgcuguu gacguaccgg agucuaggag    9420
cagauccgcg uccguaugag gaguggauag accgauacgu cgaacggacc auaccgguga    9480
ccgaagaugg gauagaguac agaugggaa acaacccacc cgugcgcuug gggcccagc    9540
ugacaacuga aggcaaaccc cauggguggc cgcacgagau cauacucau uacuaugcgc    9600
uauaccagc agccaccauc gucgcugucu caggccgcug ucucgcaguc guacauacgc    9660
ugcuggcguc auguuacaug uucgccacug cacgccgcaa gugccugacc ccauacgccc    9720
ugacccccgg agccgucguc ccgguaacac uaggaguacu augcugcgca ccacgagcgc    9780
augccgcguc guuugcggaa ucuauggcgu aucuauggga ugagaaucaa acccuguuu    9840
ggcuggagcu ugcaacgccg cucgcugcca uaauacu uguaugcugc cugaagaacc    9900
ugcuuugcgu cugcaaaccg cuaucuuuu uaguguuggu gagccuggga acucccgucg    9960
uaaaaucuua cgaacacacc gcaacguccc cgaaugguggg gggauucccg uauaaggcu    10020
acauugagag gaacggcuuc ucccgauga cccuacagcu ugagguacuu ggaaccagcu    10080
```

-continued

```
uggaacccac acuaaacuua gaguacauaa ccugugaaua caagacaguc gugccgucac  10140
cuuauaucaa gugcugcggg acaucagaau gcagauccau ggagcgcccc gacuaucaau  10200
gccaggucua cacaggagug uacccauuua ugggggcgg cgcauacugc uucugcgaca   10260
cugagaaacac ccagcugagu gaagcauacg uugacagauc ggacguaugc aagcacgacc  10320
augccgcggc cuacaaggcg cauacugcgg caaugaaagc caccauccga auaagcuacg  10380
ggaaccucaa ucagacaaca acggcguucu caacgggga gcacacagug accgucggag  10440
gcagcagguu uacuuuuggu ccaaucucca cugccuggac gccuuucgac aacaagauug  10500
ucgucuauaa gaacgacguc uacaaccugg acuucccacc cuacgggguca ggacaaccag  10560
gaagguuugg agacauccag agcaggacgg uagagagcaa ggaccuguau gccaacaccg  10620
ccccucaaguu gucaagaccu ucguccggua cuguucacgu gccuuacaca cagaccccuu  10680
cuggcuuuaa guacuggaua aagagagag gcacgucgcu gaaugacaag gcucccuuug  10740
gaugcguaau caagaccaac ccaguuagag cagaaaauug cgccguuggc aacaucccag  10800
ucuccaugga caucccggac uccgcguuua cgcgcgugau ugaugcaccu gccgucacaa  10860
accuggagug ccaaguggcg gucugcacgc acucaucgga cuucggcggg auugcgacuc  10920
ugacuuucaa aaccgacaaa cccggaaaau gugcugucca uucucauucg aacguagcca  10980
ccauacagga ggcagcugug gacaucaaaa cagauggcaa gauaacccug cauuucucua  11040
cagcaucagc auccccggca uucaagguau cuguugcag ugccaaaacg acaugcaugg  11100
cagcguguga gccgccgaag gaucacaucg ucccuuaugg ggcgagccau aacaaccaag  11160
uuuuuccuga caugucuggc acggcaauga caugggugca gcgguagcu ggcggauucg  11220
gcgggcuaac acucgccgcu guggcaguac uuauacuggu gacgugugug acuaugcgcc  11280
gcuaaccggg aggcuugaca uaauguauau auauaagcau cauaguuuua auaaagcaua  11340
uaaauaauca aguagaucaa agggcuaccu aacccccugaa uaguaacaaa cgcaaaaua  11400
caaaaacauu aguucaaagg gccaguaacc ccugaauagu aacaaaacau aaaaaccaaa  11460
aaaaaaaaaa aacaguaguu caaagggcua uacaaccccu gaauaguaac aaaauacaga  11520
aaaaccauaa aaauuauaaa auuaacuaau cugaucaucu aaauuugacu aauuggaaau  11580
agccgaacuc uacggagaug uaggcguccg aacuccacgg agacguagga caaaauucug  11640
ccgaacccca gaccaucggg gacguaggcg ucuaauuugu uuuuuaauaa uuuuac       11696
```

<210> SEQ ID NO 6
<211> LENGTH: 534
<212> TYPE: PRT
<213> ORGANISM: Unknown
<220> FEATURE:
<223> OTHER INFORMATION: Alphavirus M1 NS1 protein

<400> SEQUENCE: 6

Met Lys Val Thr Val Asp Val Glu Ala Asp Ser Pro Phe Leu Lys Ala
1               5                   10                  15

Leu Gln Lys Ala Phe Pro Ala Phe Glu Val Glu Ser Gln Gln Val Thr
                20                  25                  30

Pro Asn Asp His Ala Asn Ala Arg Ala Phe Ser His Leu Ala Thr Lys
            35                  40                  45

Leu Ile Glu Gln Glu Val Pro Thr Gly Val Thr Ile Leu Asp Val Gly
        50                  55                  60

Ser Ala Pro Ala Arg Arg Leu Met Ser Asp His Thr Tyr His Cys Ile
65                  70                  75                  80

```
Cys Pro Met Lys Ser Ala Glu Asp Pro Glu Arg Leu Ala Asn Tyr Ala
                85                  90                  95

Arg Lys Leu Ala Lys Ala Ser Gly Thr Val Leu Asp Lys Asn Val Ser
            100                 105                 110

Gly Lys Ile Thr Asp Leu Gln Asp Val Met Ala Thr Pro Asp Leu Glu
        115                 120                 125

Ser Pro Thr Phe Cys Leu His Thr Asp Glu Thr Cys Arg Thr Arg Ala
    130                 135                 140

Glu Val Ala Val Tyr Gln Asp Val Tyr Ala Val His Ala Pro Thr Ser
145                 150                 155                 160

Leu Tyr His Gln Ala Ile Lys Gly Val Arg Thr Ala Tyr Trp Ile Gly
                165                 170                 175

Phe Asp Thr Thr Pro Phe Met Phe Glu Ala Leu Ala Gly Ala Tyr Pro
            180                 185                 190

Ala Tyr Ser Thr Asn Trp Ala Asp Glu Gln Val Leu Gln Ala Arg Asn
        195                 200                 205

Ile Gly Leu Cys Ala Thr Gly Leu Ser Glu Gly Arg Arg Gly Lys Leu
    210                 215                 220

Ser Ile Met Arg Lys Lys Cys Leu Arg Pro Ser Asp Arg Val Met Phe
225                 230                 235                 240

Ser Val Gly Ser Thr Leu Tyr Thr Glu Ser Arg Lys Leu Leu Arg Ser
                245                 250                 255

Trp His Leu Pro Ser Val Phe His Leu Lys Gly Lys Asn Ser Phe Thr
            260                 265                 270

Cys Arg Cys Asp Thr Val Val Ser Cys Glu Gly Tyr Val Val Lys Lys
        275                 280                 285

Ile Thr Ile Ser Pro Gly Ile Tyr Gly Lys Thr Val Asp Tyr Ala Val
    290                 295                 300

Thr His His Ala Glu Gly Phe Leu Val Cys Lys Ile Thr Asp Thr Val
305                 310                 315                 320

Arg Gly Glu Arg Val Ser Phe Pro Val Cys Thr Tyr Val Pro Ala Thr
                325                 330                 335

Ile Cys Asp Gln Met Thr Gly Ile Leu Ala Thr Asp Val Thr Pro Glu
            340                 345                 350

Asp Ala Gln Lys Leu Leu Val Gly Leu Asn Gln Arg Ile Val Val Asn
        355                 360                 365

Gly Arg Thr Gln Arg Asn Thr Asn Thr Met Lys Asn Tyr Leu Leu Pro
    370                 375                 380

Val Val Ala Gln Ala Phe Ser Lys Trp Ala Arg Glu Ala Arg Ala Asp
385                 390                 395                 400

Met Glu Asp Glu Lys Pro Leu Gly Thr Arg Glu Arg Thr Leu Thr Cys
                405                 410                 415

Cys Cys Leu Trp Ala Phe Lys Ser His Lys Thr His Thr Met Tyr Lys
            420                 425                 430

Arg Pro Glu Thr Gln Thr Ile Val Lys Val Pro Ser Thr Phe Asp Ser
        435                 440                 445

Phe Val Ile Pro Ser Leu Arg Ser Ser Ser Leu Ser Met Asp Ile Arg
    450                 455                 460

Arg Arg Ile Lys Leu Leu Leu Ser Ala Arg Met Ala Gln Gly Leu Pro
465                 470                 475                 480

Tyr Ser Gly Asp Arg Thr Glu Ala Arg Ala Ala Glu Glu Glu Glu Lys
                485                 490                 495
```

Glu Ala Gln Glu Ala Glu Leu Thr Arg Ala Ala Leu Pro Pro Leu Val
                500                 505                 510

Ser Gly Ser Cys Ala Asp Asp Ile Ala Gln Val Asp Val Glu Glu Leu
            515                 520                 525

Thr Phe Arg Ala Gly Ala
        530

<210> SEQ ID NO 7
<211> LENGTH: 798
<212> TYPE: PRT
<213> ORGANISM: Unknown
<220> FEATURE:
<223> OTHER INFORMATION: Alphavirus M1 NS2 protein

<400> SEQUENCE: 7

Gly Val Val Glu Thr Pro Arg Asn Ala Leu Lys Val Thr Pro Gln Ala
1               5                   10                  15

His Asp His Leu Ile Gly Ser Tyr Leu Ile Leu Ser Pro Gln Thr Val
            20                  25                  30

Leu Lys Ser Glu Lys Leu Ala Pro Ile His Pro Leu Ala Glu Gln Val
        35                  40                  45

Thr Val Met Thr His Ser Gly Arg Ser Gly Arg Tyr Pro Val Asp Lys
    50                  55                  60

Tyr Asp Gly Arg Val Leu Ile Pro Thr Gly Ala Ala Ile Pro Val Ser
65                  70                  75                  80

Glu Phe Gln Ala Leu Ser Glu Ser Ala Thr Met Val Tyr Asn Glu Arg
                85                  90                  95

Glu Phe Ile Asn Arg Lys Leu His His Ile Ala Leu Tyr Gly Pro Ala
            100                 105                 110

Leu Asn Thr Asp Glu Glu Ser Tyr Glu Lys Val Arg Ala Glu Arg Ala
        115                 120                 125

Glu Thr Glu Tyr Val Phe Asp Val Asp Lys Lys Ala Cys Ile Lys Lys
    130                 135                 140

Glu Glu Ala Ser Gly Leu Val Leu Thr Gly Asp Leu Ile Asn Pro Pro
145                 150                 155                 160

Phe His Glu Phe Ala Tyr Glu Gly Leu Lys Ile Arg Pro Ala Ala Pro
                165                 170                 175

Tyr His Thr Thr Ile Ile Gly Val Phe Gly Val Pro Gly Ser Gly Lys
            180                 185                 190

Ser Ala Ile Ile Lys Asn Met Val Thr Thr Arg Asp Leu Val Ala Ser
        195                 200                 205

Gly Lys Lys Glu Asn Cys Gln Glu Ile Met Asn Asp Val Lys Arg Gln
    210                 215                 220

Arg Gly Leu Asp Val Thr Ala Arg Thr Val Asp Ser Ile Leu Leu Asn
225                 230                 235                 240

Gly Cys Lys Lys Gly Val Glu Asn Leu Tyr Val Asp Glu Ala Phe Ala
                245                 250                 255

Cys His Ser Gly Thr Leu Leu Ala Leu Ile Ala Leu Val Arg Pro Ser
            260                 265                 270

Gly Lys Val Val Leu Cys Gly Asp Pro Lys Gln Cys Gly Phe Phe Asn
        275                 280                 285

Leu Met Gln Leu Lys Val His Tyr Asn His Asn Ile Cys Thr Arg Val
    290                 295                 300

Leu His Lys Ser Ile Ser Arg Arg Cys Thr Leu Pro Val Thr Ala Ile
305                 310                 315                 320

-continued

```
Val Ser Thr Leu His Tyr Gln Gly Lys Met Arg Thr Asn Arg Cys
                325                 330                 335

Asn Thr Pro Ile Gln Ile Asp Thr Thr Gly Ser Ser Lys Pro Ala Ser
            340                 345                 350

Gly Asp Ile Val Leu Thr Cys Phe Arg Gly Trp Val Lys Gln Leu Gln
                355                 360                 365

Ile Asp Tyr Arg Gly His Glu Val Met Thr Ala Ala Ser Gln Gly
370                 375                 380

Leu Thr Arg Lys Gly Val Tyr Ala Val Arg Gln Lys Val Asn Glu Asn
385                 390                 395                 400

Pro Leu Tyr Ser Pro Leu Ser Glu His Val Asn Val Leu Thr Arg
                405                 410                 415

Thr Glu Asn Arg Leu Val Trp Lys Thr Leu Ser Gly Asp Pro Trp Ile
            420                 425                 430

Lys Val Leu Thr Asn Val Pro Arg Gly Asp Phe Ser Ala Thr Leu Glu
                435                 440                 445

Glu Trp Gln Glu Glu His Asp Gly Ile Met Arg Val Leu Asn Glu Arg
            450                 455                 460

Pro Ala Glu Val Asp Pro Phe Gln Asn Lys Ala Lys Val Cys Trp Ala
465                 470                 475                 480

Lys Cys Leu Val Gln Val Leu Glu Thr Ala Gly Ile Arg Met Thr Ala
                485                 490                 495

Asp Glu Trp Asn Thr Ile Leu Ala Phe Arg Glu Asp Arg Ala Tyr Ser
                500                 505                 510

Pro Glu Val Ala Leu Asn Glu Ile Cys Thr Arg Tyr Tyr Gly Val Asp
            515                 520                 525

Leu Asp Ser Gly Leu Phe Ser Ala Gln Ser Val Ser Leu Phe Tyr Glu
            530                 535                 540

Asn Asn His Trp Asp Asn Arg Pro Gly Gly Arg Met Tyr Gly Phe Asn
545                 550                 555                 560

His Glu Val Ala Arg Lys Tyr Ala Ala Arg Phe Pro Phe Leu Arg Gly
                565                 570                 575

Asn Met Asn Ser Gly Leu Gln Leu Asn Val Pro Glu Arg Lys Leu Gln
                580                 585                 590

Pro Phe Ser Ala Glu Cys Asn Ile Val Pro Ser Asn Arg Arg Leu Pro
                595                 600                 605

His Ala Leu Val Thr Ser Tyr Gln Gln Cys Arg Gly Glu Arg Val Glu
            610                 615                 620

Trp Leu Leu Lys Lys Ile Pro Gly His Gln Met Leu Leu Val Ser Glu
625                 630                 635                 640

Tyr Asn Leu Val Ile Pro His Lys Arg Val Phe Trp Ile Ala Pro Pro
                645                 650                 655

Arg Val Ser Gly Ala Asp Arg Thr Tyr Asp Met Asp Leu Gly Leu Pro
            660                 665                 670

Met Asp Ala Gly Arg Tyr Asp Leu Val Phe Val Asn Ile His Thr Glu
            675                 680                 685

Tyr Arg Gln His His Tyr Gln Gln Cys Val Asp His Ser Met Arg Leu
            690                 695                 700

Gln Met Leu Gly Gly Asp Ser Leu His Leu Arg Pro Gly Gly Ser
705                 710                 715                 720

Leu Leu Met Arg Ala Tyr Gly Tyr Ala Asp Arg Val Ser Glu Met Val
                725                 730                 735
```

-continued

```
Val Thr Ala Leu Ala Arg Lys Phe Ser Ala Phe Arg Val Leu Arg Pro
            740                 745                 750

Ala Cys Val Thr Ser Asn Thr Glu Val Phe Leu Leu Phe Ser Asn Phe
            755                 760                 765

Asp Asn Gly Arg Arg Ala Val Thr Leu His Gln Ala Asn Gln Lys Leu
            770                 775                 780

Ser Ser Met Tyr Ala Cys Asn Gly Leu His Thr Ala Gly Cys
785                 790                 795

<210> SEQ ID NO 8
<211> LENGTH: 523
<212> TYPE: PRT
<213> ORGANISM: Unknown
<220> FEATURE:
<223> OTHER INFORMATION: Alphavirus M1 NS3 protein

<400> SEQUENCE: 8

Ala Pro Ser Tyr Arg Val Arg Arg Ala Asp Ile Ser Gly His Gly Glu
1               5                   10                  15

Glu Ala Val Val Asn Ala Ala Asn Ala Lys Gly Thr Val Ser Asp Gly
            20                  25                  30

Val Cys Arg Ala Val Ala Lys Lys Trp Pro Ser Ser Phe Lys Gly Ala
        35                  40                  45

Ala Thr Pro Val Gly Thr Ala Lys Met Ile Arg Ala Asp Gly Met Thr
    50                  55                  60

Val Ile His Ala Val Gly Pro Asn Phe Ser Thr Val Thr Glu Ala Glu
65                  70                  75                  80

Gly Asp Arg Glu Leu Ala Ala Ala Tyr Arg Ala Val Ala Ser Ile Ile
                85                  90                  95

Ser Thr Asn Asn Ile Lys Ser Val Ala Val Pro Leu Leu Ser Thr Gly
            100                 105                 110

Thr Phe Ser Gly Gly Lys Asp Arg Val Met Gln Ser Leu Asn His Leu
        115                 120                 125

Phe Thr Ala Leu Asp Ala Thr Asp Ala Asp Val Val Ile Tyr Cys Arg
    130                 135                 140

Asp Lys Asn Trp Glu Lys Lys Ile Gln Glu Ala Ile Asp Arg Arg Thr
145                 150                 155                 160

Ala Ile Glu Leu Val Ser Glu Asp Val Thr Leu Glu Thr Asp Leu Val
                165                 170                 175

Arg Val His Pro Asp Ser Cys Leu Val Gly Arg Asn Gly Tyr Ser Ala
            180                 185                 190

Thr Asp Gly Lys Leu Tyr Ser Tyr Leu Glu Gly Thr Arg Phe His Gln
        195                 200                 205

Thr Ala Val Asp Met Ala Glu Ile Ser Thr Leu Trp Pro Arg Leu Gln
    210                 215                 220

Asp Ala Asn Glu Gln Ile Cys Leu Tyr Ala Leu Gly Glu Thr Met Asp
225                 230                 235                 240

Ser Ile Arg Thr Lys Cys Pro Val Glu Asp Ala Asp Ser Ser Thr Pro
                245                 250                 255

Pro Lys Thr Val Pro Cys Leu Cys Arg Tyr Ala Met Thr Ala Glu Arg
            260                 265                 270

Val Ala Arg Leu Arg Met Asn Asn Thr Lys Asn Ile Ile Val Cys Ser
        275                 280                 285

Ser Phe Pro Leu Pro Lys Tyr Arg Ile Glu Gly Val Gln Lys Val Lys
    290                 295                 300
```

```
Cys Asp Arg Val Leu Ile Phe Asp Gln Thr Val Pro Ser Leu Val Ser
305                 310                 315                 320

Pro Arg Lys Tyr Ile Gln Gln Pro Pro Glu Gln Leu Asp Asn Val Ser
                325                 330                 335

Leu Thr Ser Thr Thr Ser Thr Gly Ser Ala Trp Ser Phe Pro Ser Glu
            340                 345                 350

Thr Thr Tyr Glu Thr Met Glu Val Val Ala Glu Val His Thr Glu Pro
        355                 360                 365

Pro Ile Pro Pro Pro Arg Arg Arg Arg Ala Ala Val Ala Gln Leu Arg
    370                 375                 380

Gln Asp Leu Glu Val Thr Glu Glu Ile Glu Pro Tyr Val Ile Gln Gln
385                 390                 395                 400

Ala Glu Ile Met Val Met Glu Arg Val Ala Thr Thr Asp Ile Arg Ala
                405                 410                 415

Ile Pro Val Pro Ala Arg Arg Ala Ile Thr Met Pro Val Pro Ala Pro
            420                 425                 430

Ser Val Arg Lys Val Ala Thr Glu Pro Pro Leu Glu Pro Glu Ala Pro
        435                 440                 445

Ile Pro Ala Pro Arg Lys Arg Arg Thr Thr Gly Thr Thr Pro Pro His
    450                 455                 460

Asn Pro Glu Asp Phe Val Pro Arg Val Pro Val Glu Leu Pro Trp Glu
465                 470                 475                 480

Pro Glu Asp Leu Asp Ile Gln Phe Gly Asp Leu Glu Pro Arg Arg Arg
                485                 490                 495

Asn Thr Arg Asp Arg Asp Val Ser Thr Gly Ile Gln Phe Gly Asp Ile
            500                 505                 510

Asp Phe Asn Gln Ser Leu Gly Arg Ala Gly Ala
        515                 520

<210> SEQ ID NO 9
<211> LENGTH: 611
<212> TYPE: PRT
<213> ORGANISM: Unknown
<220> FEATURE:
<223> OTHER INFORMATION: Alphavirus M1 NS4 protein

<400> SEQUENCE: 9

Tyr Ile Phe Ser Ser Asp Thr Gly Pro Gly His Leu Gln Gln Lys Ser
1               5                   10                  15

Val Arg Gln His Glu Leu Pro Cys Glu Thr Leu Tyr Ala His Glu Asp
            20                  25                  30

Glu Arg Ile Tyr Pro Pro Ala Phe Asp Gly Glu Lys Glu Lys Val Leu
        35                  40                  45

Gln Ala Lys Met Gln Met Ala Pro Thr Glu Ala Asn Lys Ser Arg Tyr
    50                  55                  60

Gln Ser Arg Lys Val Glu Asn Met Lys Ala Leu Ile Val Glu Arg Leu
65                  70                  75                  80

Arg Glu Gly Ala Lys Met Tyr Leu His Glu Gln Thr Asp Lys Val Pro
                85                  90                  95

Thr Tyr Thr Ser Lys Tyr Pro Arg Pro Val Tyr Ser Pro Ser Val Asp
            100                 105                 110

Asp Ser Leu Ser Asp Pro Asp Val Ala Val Ala Ala Cys Asn Ser Phe
        115                 120                 125

Leu Glu Glu Asn Tyr Pro Thr Val Ala Asn Tyr Gln Ile Thr Asp Glu
    130                 135                 140
```

```
Tyr Asp Ala Tyr Leu Asp Leu Val Asp Gly Ser Glu Ser Cys Leu Asp
145                 150                 155                 160

Arg Ala Thr Phe Cys Pro Ala Lys Leu Arg Cys Tyr Pro Lys His His
            165                 170                 175

Ala Tyr His Gln Pro Gln Ile Arg Ser Ala Val Pro Ser Pro Phe Gln
        180                 185                 190

Asn Thr Leu Gln Asn Val Leu Ala Ala Thr Lys Arg Asn Cys Asn
        195                 200                 205

Val Thr Gln Met Arg Glu Leu Pro Thr Met Asp Ser Ala Val Phe Asn
210                 215                 220

Val Glu Ser Phe Lys Lys Tyr Ala Cys Thr Gly Glu Tyr Trp Gln Glu
225                 230                 235                 240

Phe Lys Asp Asn Pro Ile Arg Ile Thr Thr Glu Asn Ile Thr Thr Tyr
                245                 250                 255

Val Ala Lys Leu Lys Gly Pro Lys Ala Ala Leu Phe Ala Lys Thr
        260                 265                 270

His Asn Leu Val Pro Leu Gln Glu Val Pro Met Asp Arg Phe Val Met
        275                 280                 285

Asp Met Lys Arg Asp Val Lys Val Thr Pro Gly Thr Lys His Thr Glu
290                 295                 300

Glu Arg Pro Lys Val Gln Val Ile Gln Ala Ala Glu Pro Leu Ala Thr
305                 310                 315                 320

Ala Tyr Leu Cys Gly Ile His Arg Glu Leu Val Arg Arg Leu Lys Ala
            325                 330                 335

Val Leu Thr Pro Asn Ile His Thr Leu Phe Asp Met Ser Ala Glu Asp
            340                 345                 350

Phe Asp Ala Ile Ile Ala Ala His Phe Gln Pro Gly Asp Ala Val Leu
        355                 360                 365

Glu Thr Asp Ile Ala Ser Phe Asp Lys Ser Gln Asp Asp Ser Leu Ala
370                 375                 380

Leu Thr Ala Leu Met Leu Leu Glu Asp Leu Gly Val Asp Gln Glu Leu
385                 390                 395                 400

Leu Asp Leu Ile Glu Ala Ala Phe Gly Glu Ile Thr Ser Val His Leu
                405                 410                 415

Pro Thr Gly Thr Arg Phe Lys Phe Gly Ala Met Met Lys Ser Gly Met
            420                 425                 430

Phe Leu Thr Leu Phe Ile Asn Thr Leu Leu Asn Ile Val Ile Ala Cys
        435                 440                 445

Arg Val Leu Arg Asp Lys Leu Ser Ser Ser Ala Cys Ala Ala Phe Ile
        450                 455                 460

Gly Asp Asp Asn Ile Val His Gly Val Arg Ser Asp Pro Leu Met Ala
465                 470                 475                 480

Glu Arg Cys Ala Ser Trp Val Asn Met Glu Val Lys Ile Ile Asp Ala
            485                 490                 495

Thr Met Cys Glu Lys Pro Pro Tyr Phe Cys Gly Gly Phe Ile Leu Tyr
            500                 505                 510

Asp Ser Val Ala Gly Thr Ala Cys Arg Val Ala Asp Pro Leu Lys Arg
        515                 520                 525

Leu Phe Lys Leu Gly Lys Pro Leu Pro Ala Asp Asp Asn Gln Asp Glu
        530                 535                 540

Asp Arg Arg Arg Ala Leu Lys Asp Glu Thr Val Lys Trp Ser Arg Ile
545                 550                 555                 560
```

```
Gly Leu Arg Glu Glu Leu Asp Val Ala Leu Ser Ser Arg Tyr Gln Val
                565                 570                 575
Ser Gly Val Gly Asn Ile Thr Arg Ala Met Ser Thr Leu Ser Lys Asn
            580                 585                 590
Leu Lys Ser Phe Arg Lys Ile Arg Gly Pro Ile Ile His Leu Tyr Gly
        595                 600                 605
Gly Pro Lys
        610

<210> SEQ ID NO 10
<211> LENGTH: 267
<212> TYPE: PRT
<213> ORGANISM: Unknown
<220> FEATURE:
<223> OTHER INFORMATION: Alphavirus M1 C protein

<400> SEQUENCE: 10

Met Asn Tyr Ile Pro Thr Gln Thr Phe Tyr Gly Arg Arg Trp Arg Pro
1               5                   10                  15
Arg Pro Ala Phe Arg Pro Trp Arg Val Pro Met Gln Pro Ala Pro Pro
            20                  25                  30
Met Ile Pro Glu Leu Gln Thr Pro Ile Val Gln Ala Gln Gln Met Gln
        35                  40                  45
Gln Leu Ile Ser Ala Val Ser Ala Leu Thr Thr Lys Gln Asn Gly Lys
    50                  55                  60
Ala Pro Lys Lys Pro Lys Lys Pro Gln Lys Ala Lys Ala Lys Lys
65                  70                  75                  80
Asn Glu Gln Gln Lys Lys Asn Glu Asn Lys Lys Pro Pro Pro Lys Gln
                85                  90                  95
Lys Asn Pro Ala Lys Lys Lys Pro Gly Lys Arg Glu Arg Met Cys
            100                 105                 110
Met Lys Ile Glu Asn Asp Cys Ile Phe Glu Val Lys Leu Asp Gly Lys
        115                 120                 125
Val Thr Gly Tyr Ala Cys Leu Val Gly Asp Lys Val Met Lys Pro Ala
    130                 135                 140
His Val Lys Gly Val Ile Asp Asn Pro Asp Leu Ala Lys Leu Thr Tyr
145                 150                 155                 160
Lys Lys Ser Ser Lys Tyr Asp Leu Glu Cys Ala Gln Ile Pro Val His
                165                 170                 175
Met Lys Ser Asp Ala Ser Lys Tyr Thr His Glu Lys Pro Glu Gly His
            180                 185                 190
Tyr Asn Trp His His Gly Ala Val Gln Tyr Ser Gly Gly Arg Phe Thr
        195                 200                 205
Ile Pro Thr Gly Ala Gly Lys Pro Gly Asp Ser Gly Arg Pro Ile Phe
    210                 215                 220
Asp Asn Lys Gly Arg Val Val Ala Ile Val Leu Gly Gly Ala Asn Glu
225                 230                 235                 240
Gly Ala Arg Thr Ala Leu Ser Val Val Thr Trp Thr Lys Asp Met Val
                245                 250                 255
Thr Arg Tyr Thr Pro Glu Gly Thr Glu Glu Trp
            260                 265

<210> SEQ ID NO 11
<211> LENGTH: 64
<212> TYPE: PRT
<213> ORGANISM: Unknown
<220> FEATURE:
```

<223> OTHER INFORMATION: Alphavirus M1 E3 protein

<400> SEQUENCE: 11

Ser Ala Ala Leu Met Met Cys Val Leu Ala Asn Val Thr Phe Pro Cys
1               5                   10                  15

Ser Glu Pro Ala Cys Ala Pro Cys Cys Tyr Glu Lys Gln Pro Glu Gln
                20                  25                  30

Thr Leu Arg Met Leu Glu Asp Asn Val Asp Arg Pro Gly Tyr Tyr Asp
            35                  40                  45

Leu Leu Glu Ala Thr Met Thr Cys Asn Asn Ser Ala Arg His Arg Arg
        50                  55                  60

<210> SEQ ID NO 12
<211> LENGTH: 422
<212> TYPE: PRT
<213> ORGANISM: Unknown
<220> FEATURE:
<223> OTHER INFORMATION: Alphavirus M1 E2 protein

<400> SEQUENCE: 12

Ser Val Thr Lys His Phe Asn Val Tyr Lys Ala Thr Lys Pro Tyr Leu
1               5                   10                  15

Ala Tyr Cys Ala Asp Cys Gly Asp Gly Gln Phe Cys Tyr Ser Pro Val
                20                  25                  30

Ala Ile Glu Lys Ile Arg Asp Glu Ala Ser Asp Gly Met Ile Lys Ile
            35                  40                  45

Gln Val Ala Ala Gln Ile Gly Ile Asn Lys Gly Gly Thr His Glu His
        50                  55                  60

Asn Lys Ile Arg Tyr Ile Ala Gly His Asp Met Lys Glu Ala Asn Arg
65              70                  75                  80

Asp Ser Leu Gln Val His Thr Ser Gly Val Cys Ala Ile Arg Gly Thr
                85                  90                  95

Met Gly His Phe Ile Val Ala Tyr Cys Pro Pro Gly Gly Glu Leu Lys
            100                 105                 110

Val Gln Phe Gln Asp Ala Glu Ser His Thr Gln Ala Cys Lys Val Gln
        115                 120                 125

Tyr Lys His Ala Pro Ala Pro Val Gly Arg Glu Lys Phe Thr Val Arg
    130                 135                 140

Pro His Phe Gly Ile Glu Val Pro Cys Thr Thr Tyr Gln Leu Thr Thr
145                 150                 155                 160

Ala Pro Thr Glu Glu Glu Ile Asp Met His Thr Pro Pro Asp Ile Pro
                165                 170                 175

Asp Ile Thr Leu Leu Ser Gln Arg Ser Gly Asn Val Lys Ile Thr Ala
            180                 185                 190

Gly Gly Lys Thr Ile Arg Tyr Asn Cys Thr Cys Gly Ser Gly Asn Val
        195                 200                 205

Gly Thr Thr Ser Ser Asp Lys Thr Ile Asn Ser Cys Lys Ile Ala Gln
    210                 215                 220

Cys His Ala Ala Val Thr Asn His Asp Lys Trp Gln Tyr Thr Ser Ser
225                 230                 235                 240

Phe Val Pro Arg Ala Asp Gln Leu Ser Arg Lys Gly Lys Val His Val
                245                 250                 255

Pro Phe Pro Leu Thr Asn Ser Thr Cys Arg Val Pro Leu Ala Arg Ala
            260                 265                 270

Pro Gly Val Thr Tyr Gly Lys Arg Glu Leu Thr Val Lys Leu His Pro
        275                 280                 285

```
Asp His Pro Thr Leu Leu Thr Tyr Arg Ser Leu Gly Ala Asp Pro Arg
    290                 295                 300

Pro Tyr Glu Glu Trp Ile Asp Arg Tyr Val Glu Arg Thr Ile Pro Val
305                 310                 315                 320

Thr Glu Asp Gly Ile Glu Tyr Arg Trp Gly Asn Asn Pro Pro Val Arg
                325                 330                 335

Leu Trp Ala Gln Leu Thr Thr Glu Gly Lys Pro His Gly Trp Pro His
            340                 345                 350

Glu Ile Ile Leu Tyr Tyr Tyr Gly Leu Tyr Pro Ala Ala Thr Ile Val
        355                 360                 365

Ala Val Ser Ala Ala Cys Leu Ala Val Val Leu Ser Leu Leu Ala Ser
    370                 375                 380

Cys Tyr Met Phe Ala Thr Ala Arg Arg Lys Cys Leu Thr Pro Tyr Ala
385                 390                 395                 400

Leu Thr Pro Gly Ala Val Val Pro Val Thr Leu Gly Val Leu Cys Cys
                405                 410                 415

Ala Pro Arg Ala His Ala
            420

<210> SEQ ID NO 13
<211> LENGTH: 61
<212> TYPE: PRT
<213> ORGANISM: Unknown
<220> FEATURE:
<223> OTHER INFORMATION: Alphavirus M1 6K protein

<400> SEQUENCE: 13

Ala Ser Phe Ala Glu Ser Met Ala Tyr Leu Trp Asp Glu Asn Gln Thr
1               5                   10                  15

Leu Phe Trp Leu Glu Leu Ala Thr Pro Leu Ala Ala Ile Ile Ile Leu
            20                  25                  30

Val Cys Cys Leu Lys Asn Leu Leu Cys Cys Cys Lys Pro Leu Ser Phe
        35                  40                  45

Leu Val Leu Val Ser Leu Gly Thr Pro Val Val Lys Ser
    50                  55                  60

<210> SEQ ID NO 14
<211> LENGTH: 438
<212> TYPE: PRT
<213> ORGANISM: Unknown
<220> FEATURE:
<223> OTHER INFORMATION: Alphavirus M1 E1 protein

<400> SEQUENCE: 14

Tyr Glu His Thr Ala Thr Ile Pro Asn Val Val Gly Phe Pro Tyr Lys
1               5                   10                  15

Ala His Ile Glu Arg Asn Gly Phe Ser Pro Met Thr Leu Gln Leu Glu
            20                  25                  30

Val Leu Gly Thr Ser Leu Glu Pro Thr Leu Asn Leu Glu Tyr Ile Thr
        35                  40                  45

Cys Glu Tyr Lys Thr Val Val Pro Ser Pro Tyr Ile Lys Cys Cys Gly
    50                  55                  60

Thr Ser Glu Cys Arg Ser Met Glu Arg Pro Asp Tyr Gln Cys Gln Val
65                  70                  75                  80

Tyr Thr Gly Val Tyr Pro Phe Met Trp Gly Gly Ala Tyr Cys Phe Cys
                85                  90                  95
```

```
Asp Thr Glu Asn Thr Gln Leu Ser Glu Ala Tyr Val Asp Arg Ser Asp
            100                 105                 110

Val Cys Lys His Asp His Ala Ala Tyr Lys Ala His Thr Ala Ala
        115                 120                 125

Met Lys Ala Thr Ile Arg Ile Ser Tyr Gly Asn Leu Asn Gln Thr Thr
    130                 135                 140

Thr Ala Phe Val Asn Gly Glu His Thr Val Thr Val Gly Gly Ser Arg
145                 150                 155                 160

Phe Thr Phe Gly Pro Ile Ser Thr Ala Trp Thr Pro Phe Asp Asn Lys
                165                 170                 175

Ile Val Val Tyr Lys Asn Asp Val Tyr Asn Leu Asp Phe Pro Pro Tyr
                180                 185                 190

Gly Ser Gly Gln Pro Gly Arg Phe Gly Asp Ile Gln Ser Arg Thr Val
                195                 200                 205

Glu Ser Lys Asp Leu Tyr Ala Asn Thr Ala Leu Lys Leu Ser Arg Pro
        210                 215                 220

Ser Ser Gly Thr Val His Val Pro Tyr Thr Gln Thr Pro Ser Gly Phe
225                 230                 235                 240

Lys Tyr Trp Ile Lys Glu Arg Gly Thr Ser Leu Asn Asp Lys Ala Pro
                245                 250                 255

Phe Gly Cys Val Ile Lys Thr Asn Pro Val Arg Ala Glu Asn Cys Ala
                260                 265                 270

Val Gly Asn Ile Pro Val Ser Met Asp Ile Pro Asp Ser Ala Phe Thr
        275                 280                 285

Arg Val Ile Asp Ala Pro Ala Val Thr Asn Leu Glu Cys Gln Val Ala
        290                 295                 300

Val Cys Thr His Ser Ser Asp Phe Gly Gly Ile Ala Thr Leu Thr Phe
305                 310                 315                 320

Lys Thr Asp Lys Pro Gly Lys Cys Ala Val His Ser His Ser Asn Val
                325                 330                 335

Ala Thr Ile Gln Glu Ala Ala Val Asp Ile Lys Thr Asp Gly Lys Ile
        340                 345                 350

Thr Leu His Phe Ser Thr Ala Ser Ala Ser Pro Ala Phe Lys Val Ser
        355                 360                 365

Val Cys Ser Ala Lys Thr Thr Cys Met Ala Ala Cys Glu Pro Pro Lys
    370                 375                 380

Asp His Ile Val Pro Tyr Gly Ala Ser His Asn Asn Gln Val Phe Pro
385                 390                 395                 400

Asp Met Ser Gly Thr Ala Met Thr Trp Val Gln Arg Val Ala Gly Gly
                405                 410                 415

Phe Gly Gly Leu Thr Leu Ala Ala Val Ala Val Leu Ile Leu Val Thr
                420                 425                 430

Cys Val Thr Met Arg Arg
        435

<210> SEQ ID NO 15
<211> LENGTH: 11696
<212> TYPE: RNA
<213> ORGANISM: Unknown
<220> FEATURE:
<223> OTHER INFORMATION: Alphavirus M

<400> SEQUENCE: 15

```
auggcggacg ugugacauca ucguucgcuc uuucuaggau ccuuugcuac uccacauagu    60
gagagacaaa caacccaaau gaagguaacc guggacguug aggcugauag cccauuccuu   120
aaggcccuuc agaaggcguu ucccgccuuu gagguugaau cacagcaggu cacaccgaau   180
gaccaugcua acgcuagagc auuuucgcau cuggcuacua aacugauuga gcaagagguu   240
ccaacaggcg ucaccauccu ggacgugggu agugcacccg caaggagguu gaugucugac   300
cacaccuacc acugcaucug ccccaugaaa agugcggaag acccagagag gcuggcgaau   360
uacgcucgaa agcuggcgaa agcaucgggg acugugcuag acaagaaugu guccggaaag   420
auaacggacc uacaagacgu cauggccacu ccagacuugg aauccccgac uuuuugccug   480
cacacugacg agacgugccg cacuagggcu gaggucgcug uguaccagga cguauacgcu   540
gugcacgcac cgacgucacu guaucaccag gccaucaaag gugucaggac ggcguauugg   600
auuggauucg acaccacucc auucauguuc gaggcacuag cgggcgcgua ccugcguac   660
ucgaccaacu gggcagauga gcaagugcug caggcucgua acaucggccu gugcgcgaca   720
ggccucuccg aggggcgucg cggcaaacuc uccaucauga gaaagaagug cuugcgaccg   780
agcgacagag uaauguuuuc gguugggucc accuuguaca ccgagagccg aaagcugcug   840
cgcagcuggc auuuaccuuc cguguuucac cugaagggua agaacaguuu uaccugcagg   900
ucgacacgg ugguucaug cgaagguuac gugguaaaga agaucaccau aagcccgggc   960
auauauggaa aaacagucga uuacgcaguu acccaucacg cagagggguuu ucuggugugu  1020
aagaucacug auacagucag aggagaaaga gucucuuucc gguculugac cuugugccu  1080
gcaaccauau gcgaucagau gacgggauaua cuugccaccg acgugacacc agaggaugcc  1140
cagaagcucc ugguuggauu gaaccaacgc auagugguga augguaggac gcaaagaaac  1200
acaaacacaa ugaaaaacua ucuacugcca gugguagcgc aagcauucag uaaaugggca  1260
cgagaggcac gcgcagacau ggaggaugaa aaacccuag gcaccagaga acgcacguug  1320
acguugguu gccugugggc guuuaaaagc cacaaaaccc acaccaugua uaagcggccu  1380
gaaacucaaa cuaucgucaa agugccuucc acuuuugacu ccuuugugau accgagccug  1440
aggucaucca gucuuuccau ggauaucaga cggaggauca aacugcuacu cagcgcaaga  1500
augggccaag gccuaccaua ucaggagac cgcacugaag cucgcgcggc agaagaagaa  1560
gagaaggagg cgcaggaggc agaacuuacg agggcagcgc ugccaccgcu agugagcggc  1620
ucuugugcug acgauaucgc ccagguggau guagaggaau uaaccuucag agccggagcc  1680
ggggugugg aaacacccag gaaugcccug aagguuacac cgcaagcaca cgaccaccuc  1740
auaggcuccu acuugauccu uccccccaa acggucuuga aaagcgagaa gcuggcaccc  1800
auccaccuuc uugcugagca agucacgguc augacccacu cuggaagauc cggcagauac  1860
ccagucgaca aguacgacgg acgguauugg auccccaacag gagcggccau cccagugagu  1920
gaguuccagg cacucagcga gagcgcaacc auggugguaca augagaggga auuuauaaau  1980
cgcaagcuac accacauagc gcuauacggg ccagccuuga uaccgacga ggaaagcuac  2040
gaaaaaguga gagcugagag gcagagaca gaguaugugu uugacgugga caagaaggca  2100
uguaucaaga aggaggaggc aucaggccuu guguuaacag gggaccuaau caauccaccu  2160
uuccacgaau ucgcauacga aggacuucaag auccgcccag cagccccgua ccacacgacg  2220
aucauuggug uguuuggcgu uccagguuc ggcaagucgg cuaucauuaa gaacaugguug  2280
```

-continued

```
acgacucgcg aucggugc cagggaaag aaggagaacu gccaagagau caugaaugau      2340
guaaagaggc aacgcggguu ggacgugacc gcuaggaccg ucgacucaau cuuauugaau   2400
gggugcaaga aaggcguaga aaaccuuuac gucgaugagg cguucgcgug ucacucgggc   2460
acuuugcuag cgcucaucgc gcuggugaga ccgucaggua agguaguacu gugcggcgac   2520
cccaagcagu guggguucu caauugaug caacugaagg ugcacuauaa ccacaacauu     2580
uguacaaggg ugucccauaa gagcaucucc agaagaugca cucuaccugu uacggcgauc   2640
guguccaccu ugcacuacca agggaagaug agaacgacga accgaugcaa caccccauu    2700 cagauugaca ccaccgguuc uuccaaacca gccucaggag auaucuguu aacgugcuuc    2760 cgcggcuggg ugaagcaacu gcaaaucgac uaucguggac acgaggugau gaccgcagcu   2820
gcuucccagg gucugacaag gaaaggcgug uacgccguga gacagaaagu gaacgaaaac   2880
ccacuguacu caccacuguc ggagcacguc aaugugcugu ugacccgaac ugaaaaccga   2940 cugugugga agacacuguc ggggugacccg uggauaaagg uguuaaccaa uguccacgu    3000 gggauuuca gugcaacuu ggaggaaugg caagaagaac augacgguau caugagagug     3060
uugaacgagc gaccggcgga gguugaucca uccaaaaca aggccaaagu gugcugggca    3120
aaaugucugg ugcaaguucu ugagacggcc ggaauacgua ugcggcaga ugaauggaac    3180 accaucuugg cuucagaga ggacagagcg uacucaccag aagucgcucu caacgagauu    3240
ugcacucguu acuacggcgu ugaccuagac agcggccuau ucucagcca gucaguuucc    3300 cucuuuuaug agaacaacca cugggacaac aggcccggag gacgcaugua cgggguucaac  3360 caugaaguag ccaggaaaua ugcagccagg uuccauuuc uacggcaa caugaacucg      3420 gggcuacaac uaaacguccc ugagaggaag cuccaaccuu uuagcgcuga augcaauaua   3480 gucccauccaa aucgcgggu accgcaugcu cuaucacaa gcaucagca gugccggggg    3540 gagagggcag aguggugcu gaaaaagau ccaggucacc aaauguuaucu uguaagugag    3600 uacaaccugu ugauaccuca caaaagagcu uucuggauug caccuccgcg ggugucaggc   3660
gcggaccgca cgacgacau ggaccuaggg uuaccuaugg augcaggcg uuacgaucug     3720 guauucguca acaucauac ugagugccgg caacaccacu accaacaaug cgucgaccau    3780
ucaaugcguc ugcagaugcu gggaggggau ucacuacacc ugcuuagacc aggaggcucg   3840
cugcugauga gagcauaugg uuacgcagac agaucucgag augguggu gacagcccug    3900 gcuaggaaau ucucggcguu ccgugucucu agaccggcgu gugugacgag caacacagaa   3960
guguuccugc uguuucucaa cuuugauaac ggcagaagag cgguaaccuu gcaccaagcu   4020
aaccagaaac uuagcucaau guagccugc aacggacugc acacugcugg cugugcaccg   4080
ucauacaggg uccgccgcgc agauauauca ggacacggug aggaagcagu cguaaaugcu   4140
gccaaugcca aggguaccgu gagcgaugga guugcaggg cggucgcuaa gaaguggcca   4200
ucaucuuuca aaggggcugc aacuccagcc ggcacagcca agaugauccg cgcagauggc   4260
augaccguaa uccacgcagu gggaccgaac uucuccaccg uaacagaagc cgaagggac    4320 agagagcuag cggccgcgua ccgagcugug gcuagcauaa uuaguaccaa caauauaag    4380 agcgucgcag uaccgcugcu auccacaggc accuuuuccg gcguaagga cagagugaug   4440 caguccuuga ccacuuauu cacggcauug gaugccaccg augcagacgu gguuaucuac     4500
ugcagaauaa aaacagggga aaagaagauu caggaagcca ucgacaggcg gacggcaaua    4560
gagcucucua uccgaagacg ugaccuugga accgaucugg uuaggguaca cccgacagu    4620 ugcuuagucg gcagaaaugg uuacagugca acugacggua aacuguacuc uuaccuugag    4680
```

-continued

```
ggcacgaggu uccaccagac ggcggucgac auggcugaaa uaucaacuuu auggccaaga   4740
cuccaagaug cuaacgagca gaucugccug uacgcccuag gggagacgau ggacagcaua   4800
cgcacuaaau gcccaguaga ggacgccgau ucgucuacgc cgccgaaaac gguaccgugu   4860
cuaugucggu acgcgaugac cgcggagcgg guugccagac uuaggaugaa uaacaccaaa   4920
aacaucaucg ugugcccuc cuuuccauug ccgaaguaca ggauagaagg cgugcagaag    4980
gugaagugug accgagugcu aauuuuugac cagaccgucc cgucacuagu aagucccaga   5040
aaguacauac agcagccgcc ggaacagcug gauaaugug gccugacuuc uacgacgucg    5100
acgggauccg cauggucauu ccaucgaaa cgaccuacg aaaccaugga agucguagcc    5160
gagguacaca ccgaaccucc gaucccuccg ccucgccgac guagagcagc cgucgcccaa   5220
cuuagacagu aucuggaagu caccgaggag aucgagccgu acgugauaca gcaagcagag   5280
aucauggucu uggagagggu cgcgacgaca gacauacgcg cuaucccagu cccggcacgg   5340
cgggccauua caaugccagu cccagccccc aguguucgua aggucgcuac cgaaccucca   5400
uuagaaccgg aagcuccuau cccggcacca agaaagagaa gaaccacugg caccacaccu   5460
ccgcauaacc ccgaggauuu cguucccagg guaccgguug aguuaccgug ggagccggaa   5520
gaccuagaca uccaauucgg ugacuuggag ccacgccgcc ggaacaccag ggaccgagau   5580
gucagcacag gaauacaguu cggugacauc gacuuuaacc aguccugacu aggcagggcu   5640
ggcgcguaua ucuuucguc ugacacuggc ccgggucacc uacagcagaa guccguaagg    5700
caacaugaau ugccaugcga gacucuguau gcccaugaag acgaacgcau auacccgccg   5760
gcauuugacg gagagaaaga gaagguacuc caggcaaaga ugcagauggc cccgacagaa   5820
gcgaauaaga gcagguacca gucgaggaaa guagagaaca ugaaggcauu aauuguagaa   5880
agacuacgcg aaggagcaaa gauguaccuc caugagcaaa ccgacaaagu acccacguac   5940
accagcaagu acccuagacc uguguacuca ccaucggugg augacagccu gagcgauccg   6000
gaaguggcug uggccgccug uaacucuuuc uuagaggaga auuauccgac cguggcgaac   6060
uaccagauaa ccgaugagua ugaugcuau cuggacuugg ucgacggcuc ugaaagcugc   6120
cucgacagag cuacguucug cccggccaaa cuaagauguu acccuaagca ccacgcauac   6180
caccaaccac aaaucaggag cgcaguaccu ucccuuucc aaaacacguu acaaaacgug   6240
cuagccgcgg ccacuaaaag aaauuguaau gucacccaaa ugagagaauu accaccaug    6300 gacucugcgg uguuaacgu agaaagcuuc aaaaaauacg ccuguaccgg cgaauauugg   6360
caagaauuua aagacaaucc uauacggauc accaccgaaa acauaacgac guacguggcu   6420
aaacucaagg guccaaaggc ugcugcccuu uuugccaaga cgcauaaccu ggugccgcuc   6480
caggaggugc caauggaccg cuucgugaug gauaugaaga gagaugugaa aguuacacca   6540
ggcaccaagc auaccgaaga aaggccuaaa gugcaaguga uucaagcggc ggaaccauug   6600
gccacggcau auuuaugcgg aauccacaga gaguuaguca ggcggcuaaa agccguucug   6660
accccgaaca uucacacucu guugacaug ucggcggagg acuuugaugc caucauagcg   6720
gcacauuuuc aaccgggaga ugcuguacug gagacagaua ucgcauccuu cgauaagagc   6780
caagacgacu ccuuagcgcu aacgcgcua augcuucugg aagaccucgg ggucgaccaa   6840
gaacugcugg accuuaucga agcugcguuu ggugagauca cgagugugca ucuaccacc    6900 gguacaagau uuaaauucgg ugcuaugaug aagucaggaa uguuucuuac acucuucauc   6960
aacacgcugc ugaacauugu cauagcgugc cgcgucuuac gcgacaaauu aucguccucg   7020
```

| | |
|---|---|
| gcgugcgccg ccuucauagg ugaugacaac auagugcacg cgcugagguc agacccgcua | 7080 |
| auggcagaaa ggugugcgag uugggucaac auggaaguaa agaucaucga ugccacaaug | 7140 |
| ugugagaaac caccguacuu uuguggagga uucauccugu acgacagugu cgccgguaca | 7200 |
| gcguguaggu uugcagaccc guuaaagagg cuguucaaac ucgggaaacc gcucccagcg | 7260 |
| gacgacaacc aggaugaaga cagaagaagg gcacuaaaag acgaaacagu uaaguggucc | 7320 |
| cgcauaggau ugagagaaga auuagacgug gcacugagcu caagauacca agucaguggc | 7380 |
| gucgggaaca ucacuagagc gauguccacg cugucuaaga auuugaaguc uuuuaggaaa | 7440 |
| auaagagguc ccauuauaca ucuguacggc gguccuaaau agaugcagga uuacacuaca | 7500 |
| ucuaaagacc acguauuaca gacaccauga auuacauccc aacucaaacc uuuuacggac | 7560 |
| gccguuggcg accacgcccg gcguuccguc cauggcgggu gccgaugcag ccggccccac | 7620 |
| ccaugauucc agagcugcaa acuccgaucg uccaggccca acagaugcag cagcuaauca | 7680 |
| gugcaguuuc ugcccugacg acuaagcaaa auggcaaagc accgaagaag ccgaagaaaa | 7740 |
| agccgcaaaa agcgaaggcu aagaaaaacg aacagcaaaa gaaaaacgag aacaagaaac | 7800 |
| caccaccuaa gcagaagaau ccggcuaaga agaagaaacc aggaaaaagg gaacgcaugu | 7860 |
| gcaugaagau agaaaaugau ugcaucuucg aggucaagcu ugacgguaag gucacgggau | 7920 |
| acgccugccu agucgggggau aaagugauga gccggcaca cgucaaaggu gugaucgaca | 7980 |
| accccgaccu agcgaagcuu accacaagaa aucgagcaa guagaccua gagugcgccc | 8040 |
| agauaccggu gcacaugaag ucagaugcuu caaauacac ccaugaaaaa ccagaagggc | 8100 |
| acuacaauug gcaucacggu gcagugcagu acagcggugg cagguucaca aucccgacag | 8160 |
| gcgcagguaa accaggagac agcggccggc cgaucuucga caacaaagga cgugugugg | 8220 |
| ccauugccu gggagggggcc aacgaaggag ccaggacugc ccuaucuguc ugaccuggaa | 8280 |
| ccaaagacau ggucacacgg uacaccccag aaggaacaga agaaugguce gccgccuuga | 8340 |
| ugaugugcgu cuuagccaac guuacauucc caugccagga gcccgcaugu gcacccuguu | 8400 |
| gcuaugaaaa acaaccagaa cagacacuga ggauguugga ggacaacgug gaccgcccgg | 8460 |
| gcuacuacga ccugcucgag gccacgauga cguuaacaa caguagcagc caccgucgca | 8520 |
| gugugacgga acacuucaau gucuacaagg ccacgaaacc guaccuagcg uauugcgcgg | 8580 |
| acugcggaga cgggcaguuc uguuacagcc cggugguaau agaaaaaauu agggaugagg | 8640 |
| cuuccgaugg caugauaaag auccaggucg cagcgcaaau uggcaucaac aaaggaggaa | 8700 |
| cacacgaaca cagcaaaauc agguacaucg ccgggcauga caugaagag gcaaaccggg | 8760 |
| auucuuuaca agugcauacu ccggugugu gcgcauucg aggcacgaug ggccacuuca | 8820 |
| ucguggccua cugcccucca ggggggcgaac uaaggucca guccaagau gcagaaucgc | 8880 |
| acacacaggc cugcaaagug caguacaaac acgcuccggc cccaguaggc agagaaaaau | 8940 |
| ucaccgucag gccccacuuc gguaucgaag ugccaugcac aacguaccag cugacuaccg | 9000 |
| caccgacgga ggaagagauc uacaugcaua cccccaccgg auccagac auaacguugc | 9060 |
| ugucgcagcg gucagguaac guaaagauca cagcaggagg aaaaccauc agauacaacu | 9120 |
| gcacgugugg uagggcaac gugggcacca ccaguagcga caagacuauc aaucgugca | 9180 |
| aaauagcaca gugccacgcu gcggugacua accacgauaa guggcaguac accuccucgu | 9240 |
| uuguccuag agccgaccag uugucucgca agguaaagu gcacguaccc uuccccucga | 9300 |
| ccaacuccac augcagggug ccccuugcac gugcaccagg ugcacauac ggaaagagag | 9360 |
| aacugacagu gaaacugcau ccagaucauc ccacgcuguu gacguaccgg agucuaggag | 9420 |

-continued

```
cagauccgcg uccguaugag gaguggauag accgauacgu cgaacggacc auaccgguga    9480
ccgaagaugg gauagaguac agaugggaa acaacccacc cgugcgcuug ugggcccagc     9540
ugacaacuga aggcaaaccc caugggugge cgcacgagau cauacucuau uacuauggge    9600 uauacccagc agccaccauc gucgcugucu cagccgcgug ucucgcaguc guacuaucgc    9660
ugcuggcguc auguuacaug uucgccacug cacgccgcaa gugccugacc ccauacgccc    9720 ugaccccgg agccgucguc ccgguaacac uaggaguacu augcugcgca ccacgagcgc     9780
augccgcguc guuugcggaa ucuauggcgu aucuauggga ugagaaucaa acccguuuu     9840 ggcuggagcu ugcaacgccg cucgcugcca uaaucauacu uguaugcugc cugaagaacc    9900
ugcuuugcug cugcaaaccg cuaucuuuuu uaguguuggu gagccuggga acucccgucg    9960
uaaaaucuua cgaacacacc gcaacgaucc cgaaugugg gggauucccg uauaaggcuc     10020
acauugagag gaacggcuuc uccccgauga cccuacagcu ugagguacuu ggaaccagcu    10080
uggaacccac acuaaacuua gaguacauaa ccugugaaua caagacaguc gugccgucac    10140
cuuauaucaa gugcugcggg acaucagaau gcagauccau ggagcgcccc gacuaucaau    10200
gccaggucua cacaggagug uacccauuua uguggggcgg cgcauacugc uucugcgaca    10260
cugagaacac ccagcugagu gaagcauacg uugacagauc ggacguaugc aagcacgacc    10320
augccgcggc cuacaaggcg cauacugcgg caaugaaagc caccauccga auaagcuacg    10380
ggaaccucaa ucagacaaca acggcguucg ucaacgggga gcacacagug accgucggag    10440
gcagcagguu uacuuuuggu ccaaucucca cugccuggac gccuuucgac aacaagauug    10500
ucgucuauaa gaacgacguc uacaaccugg acuucccacc cuacgggucg ggacaaccag    10560
gaagguuugg agacauccag agcaggacgu uagagagcaa ggaccuguau gccaacaccg    10620
cccucaaguu gucaagaccu ucguccggua cuguucacgu gccuuacaca cagaccccuu    10680
cuggcuuuaa guacuggaua aaagagagag gcacgucgcu gaaugacaag gcucccuuug    10740
gaugcguaau caagaccaac ccaguuagag cagaaaauug cgccguuggc aacaucccag    10800
ucuccaugga caucccggac uccgcguuua cgcgcgugau ugaugcaccu gccgucacaa    10860
accuggagug ccaagugcg gucugcacgc acucaucgga cuucggcggg auugcgacuc     10920
ugacuuucaa aaccgacaaa cccggaaaau gucugcucca uucucauucg aacguagcca    10980
ccauacagga ggcagcugug gacaucaaaa cagauggcaa gauaacccug cauuucucua    11040
cagcaucagc auccccggca uucaagguau cugugugcag ugccaaaacg acaugcaugg    11100
cagcguguga gccgccgaag gaucacaucg ucccuuaugg ggcgagccau aacaaccaag    11160
uuuuuccuga caugucuggc acggcaauga caugggugca gcgguagcu ggcggauucg     11220 gcgggcuaac acucgccgcu guggcaguac uuauacuggu gacgugugug acuaugcgcc    11280
gcuaaccggg aggcuugaca uaauguauau auauaagcau cauaguuuua auaaagcaua    11340
uaaauaauca aguagaucaa agggcuaccu aaccccugaa uaguaacaaa acgcaaaaua    11400
caaaaacauu aguucaaagg gccaguaacc ccugaauagu aacaaaacau aaaaaccaaa    11460
aaaaaaaaaa aacaguaguu caaagggcua uaacccccu gaauaguaac aaaauacaga     11520 aaaccauaa aaauuauaaa auuaacuauu cugaucaucu aaauuugacu aauuggaauu     11580
agccgaacuc uacggagaug uaggcguccg aacuccacgg agacguagga caaaauucug    11640 ccgaaccccca gaccaucggg gacguaggcg ucuaauuugu uuuuuaauaa uuuuac       11696
```

<210> SEQ ID NO 16

```
<211> LENGTH: 534
<212> TYPE: PRT
<213> ORGANISM: Unknown
<220> FEATURE:
<223> OTHER INFORMATION: Alphavirus M1 NS1 protein

<400> SEQUENCE: 16

Met Lys Val Thr Val Asp Val Glu Ala Asp Ser Pro Phe Leu Lys Ala
1               5                   10                  15

Leu Gln Lys Ala Phe Pro Ala Phe Glu Val Glu Ser Gln Gln Val Thr
            20                  25                  30

Pro Asn Asp His Ala Asn Ala Arg Ala Phe Ser His Leu Ala Thr Lys
        35                  40                  45

Leu Ile Glu Gln Glu Val Pro Thr Gly Val Thr Ile Leu Asp Val Gly
    50                  55                  60

Ser Ala Pro Ala Arg Arg Leu Met Ser Asp His Thr Tyr His Cys Ile
65                  70                  75                  80

Cys Pro Met Lys Ser Ala Glu Asp Pro Glu Arg Leu Ala Asn Tyr Ala
                85                  90                  95

Arg Lys Leu Ala Lys Ala Ser Gly Thr Val Leu Asp Lys Asn Val Ser
            100                 105                 110

Gly Lys Ile Thr Asp Leu Gln Asp Val Met Ala Thr Pro Asp Leu Glu
        115                 120                 125

Ser Pro Thr Phe Cys Leu His Thr Asp Glu Thr Cys Arg Thr Arg Ala
    130                 135                 140

Glu Val Ala Val Tyr Gln Asp Val Tyr Ala Val His Ala Pro Thr Ser
145                 150                 155                 160

Leu Tyr His Gln Ala Ile Lys Gly Val Arg Thr Ala Tyr Trp Ile Gly
                165                 170                 175

Phe Asp Thr Thr Pro Phe Met Phe Glu Ala Leu Ala Gly Ala Tyr Pro
            180                 185                 190

Ala Tyr Ser Thr Asn Trp Ala Asp Glu Gln Val Leu Gln Ala Arg Asn
        195                 200                 205

Ile Gly Leu Cys Ala Thr Gly Leu Ser Glu Gly Arg Arg Gly Lys Leu
    210                 215                 220

Ser Ile Met Arg Lys Lys Cys Leu Arg Pro Ser Asp Arg Val Met Phe
225                 230                 235                 240

Ser Val Gly Ser Thr Leu Tyr Thr Glu Ser Arg Lys Leu Leu Arg Ser
                245                 250                 255

Trp His Leu Pro Ser Val Phe His Leu Lys Gly Lys Asn Ser Phe Thr
            260                 265                 270

Cys Arg Cys Asp Thr Val Val Ser Cys Glu Gly Tyr Val Val Lys Lys
        275                 280                 285

Ile Thr Ile Ser Pro Gly Ile Tyr Gly Lys Thr Val Asp Tyr Ala Val
    290                 295                 300

Thr His His Ala Glu Gly Phe Leu Val Cys Lys Ile Thr Asp Thr Val
305                 310                 315                 320

Arg Gly Glu Arg Val Ser Phe Pro Val Cys Thr Tyr Val Pro Ala Thr
                325                 330                 335

Ile Cys Asp Gln Met Thr Gly Ile Leu Ala Thr Asp Val Thr Pro Glu
            340                 345                 350

Asp Ala Gln Lys Leu Leu Val Gly Leu Asn Gln Arg Ile Val Val Asn
        355                 360                 365

Gly Arg Thr Gln Arg Asn Thr Asn Thr Met Lys Asn Tyr Leu Leu Pro
    370                 375                 380
```

```
Val Val Ala Gln Ala Phe Ser Lys Trp Ala Arg Glu Ala Arg Ala Asp
385 390 395 400

Met Glu Asp Glu Lys Pro Leu Gly Thr Arg Glu Arg Thr Leu Thr Cys
405 410 415

Cys Cys Leu Trp Ala Phe Lys Ser His Lys Thr His Thr Met Tyr Lys
420 425 430

Arg Pro Glu Thr Gln Thr Ile Val Lys Val Pro Ser Thr Phe Asp Ser
435 440 445

Phe Val Ile Pro Ser Leu Arg Ser Ser Ser Leu Ser Met Asp Ile Arg
450 455 460

Arg Arg Ile Lys Leu Leu Leu Ser Ala Arg Met Ala Gln Gly Leu Pro
465 470 475 480

Tyr Ser Gly Asp Arg Thr Glu Ala Arg Ala Ala Glu Glu Glu Glu Lys
485 490 495

Glu Ala Gln Glu Ala Glu Leu Thr Arg Ala Ala Leu Pro Pro Leu Val
500 505 510

Ser Gly Ser Cys Ala Asp Asp Ile Ala Gln Val Asp Val Glu Glu Leu
515 520 525

Thr Phe Arg Ala Gly Ala
530

<210> SEQ ID NO 17
<211> LENGTH: 798
<212> TYPE: PRT
<213> ORGANISM: Unknown
<220> FEATURE:
<223> OTHER INFORMATION: Alphavirus M1 NS2 protein

<400> SEQUENCE: 17

Gly Val Val Glu Thr Pro Arg Asn Ala Leu Lys Val Thr Pro Gln Ala
1 5 10 15

His Asp His Leu Ile Gly Ser Tyr Leu Ile Leu Ser Pro Gln Thr Val
20 25 30

Leu Lys Ser Glu Lys Leu Ala Pro Ile His Pro Leu Ala Glu Gln Val
35 40 45

Thr Val Met Thr His Ser Gly Arg Ser Gly Arg Tyr Pro Val Asp Lys
50 55 60

Tyr Asp Gly Arg Val Leu Ile Pro Thr Gly Ala Ala Ile Pro Val Ser
65 70 75 80

Glu Phe Gln Ala Leu Ser Glu Ser Ala Thr Met Val Tyr Asn Glu Arg
85 90 95

Glu Phe Ile Asn Arg Lys Leu His His Ile Ala Leu Tyr Gly Pro Ala
100 105 110

Leu Asn Thr Asp Glu Glu Ser Tyr Glu Lys Val Arg Ala Glu Arg Ala
115 120 125

Glu Thr Glu Tyr Val Phe Asp Val Asp Lys Lys Ala Cys Ile Lys Lys
130 135 140

Glu Glu Ala Ser Gly Leu Val Leu Thr Gly Asp Leu Ile Asn Pro Pro
145 150 155 160

Phe His Glu Phe Ala Tyr Glu Gly Leu Lys Ile Arg Pro Ala Ala Pro
165 170 175

Tyr His Thr Thr Ile Ile Gly Val Phe Gly Val Pro Gly Ser Gly Lys
180 185 190

Ser Ala Ile Ile Lys Asn Met Val Thr Thr Arg Asp Leu Val Ala Ser
195 200 205

```
Gly Lys Lys Glu Asn Cys Gln Glu Ile Met Asn Asp Val Lys Arg Gln
    210             215             220

Arg Gly Leu Asp Val Thr Ala Arg Thr Val Asp Ser Ile Leu Leu Asn
225             230             235             240

Gly Cys Lys Lys Gly Val Glu Asn Leu Tyr Val Asp Glu Ala Phe Ala
            245             250             255

Cys His Ser Gly Thr Leu Leu Ala Leu Ile Ala Leu Val Arg Pro Ser
            260             265             270

Gly Lys Val Val Leu Cys Gly Asp Pro Lys Gln Cys Gly Phe Phe Asn
            275             280             285

Leu Met Gln Leu Lys Val His Tyr Asn His Asn Ile Cys Thr Arg Val
    290             295             300

Leu His Lys Ser Ile Ser Arg Arg Cys Thr Leu Pro Val Thr Ala Ile
305             310             315             320

Val Ser Thr Leu His Tyr Gln Gly Lys Met Arg Thr Thr Asn Arg Cys
            325             330             335

Asn Thr Pro Ile Gln Ile Asp Thr Thr Gly Ser Ser Lys Pro Ala Ser
            340             345             350

Gly Asp Ile Val Leu Thr Cys Phe Arg Gly Trp Val Lys Gln Leu Gln
            355             360             365

Ile Asp Tyr Arg Gly His Glu Val Met Thr Ala Ala Ala Ser Gln Gly
    370             375             380

Leu Thr Arg Lys Gly Val Tyr Ala Val Arg Gln Lys Val Asn Glu Asn
385             390             395             400

Pro Leu Tyr Ser Pro Leu Ser Glu His Val Asn Val Leu Leu Thr Arg
            405             410             415

Thr Glu Asn Arg Leu Val Trp Lys Thr Leu Ser Gly Asp Pro Trp Ile
            420             425             430

Lys Val Leu Thr Asn Val Pro Arg Gly Asp Phe Ser Ala Thr Leu Glu
            435             440             445

Glu Trp Gln Glu Glu His Asp Gly Ile Met Arg Val Leu Asn Glu Arg
    450             455             460

Pro Ala Glu Val Asp Pro Phe Gln Asn Lys Ala Lys Val Cys Trp Ala
465             470             475             480

Lys Cys Leu Val Gln Val Leu Glu Thr Ala Gly Ile Arg Met Thr Ala
            485             490             495

Asp Glu Trp Asn Thr Ile Leu Ala Phe Arg Glu Asp Arg Ala Tyr Ser
            500             505             510

Pro Glu Val Ala Leu Asn Glu Ile Cys Thr Arg Tyr Tyr Gly Val Asp
            515             520             525

Leu Asp Ser Gly Leu Phe Ser Ala Gln Ser Val Ser Leu Phe Tyr Glu
    530             535             540

Asn Asn His Trp Asp Asn Arg Pro Gly Gly Arg Met Tyr Gly Phe Asn
545             550             555             560

His Glu Val Ala Arg Lys Tyr Ala Ala Arg Phe Pro Phe Leu Arg Gly
            565             570             575

Asn Met Asn Ser Gly Leu Gln Leu Asn Val Pro Glu Arg Lys Leu Gln
            580             585             590

Pro Phe Ser Ala Glu Cys Asn Ile Val Pro Ser Asn Arg Arg Leu Pro
            595             600             605

His Ala Leu Val Thr Ser Tyr Gln Gln Cys Arg Gly Glu Arg Val Glu
    610             615             620
```

```
Trp Leu Leu Lys Lys Ile Pro Gly His Gln Met Leu Leu Val Ser Glu
625                 630                 635                 640

Tyr Asn Leu Val Ile Pro His Lys Arg Val Phe Trp Ile Ala Pro Pro
            645                 650                 655

Arg Val Ser Gly Ala Asp Arg Thr Tyr Asp Met Asp Leu Gly Leu Pro
        660                 665                 670

Met Asp Ala Gly Arg Tyr Asp Leu Val Phe Val Asn Ile His Thr Glu
    675                 680                 685

Tyr Arg Gln His His Tyr Gln Gln Cys Val Asp His Ser Met Arg Leu
690                 695                 700

Gln Met Leu Gly Gly Asp Ser Leu His Leu Leu Arg Pro Gly Gly Ser
705                 710                 715                 720

Leu Leu Met Arg Ala Tyr Gly Tyr Ala Asp Arg Val Ser Glu Met Val
                725                 730                 735

Val Thr Ala Leu Ala Arg Lys Phe Ser Ala Phe Arg Val Leu Arg Pro
            740                 745                 750

Ala Cys Val Thr Ser Asn Thr Glu Val Phe Leu Leu Phe Ser Asn Phe
        755                 760                 765

Asp Asn Gly Arg Arg Ala Val Thr Leu His Gln Ala Asn Gln Lys Leu
    770                 775                 780

Ser Ser Met Tyr Ala Cys Asn Gly Leu His Thr Ala Gly Cys
785                 790                 795

<210> SEQ ID NO 18
<211> LENGTH: 523
<212> TYPE: PRT
<213> ORGANISM: Unknown
<220> FEATURE:
<223> OTHER INFORMATION: Alphavirus M1 NS3 protein

<400> SEQUENCE: 18

Ala Pro Ser Tyr Arg Val Arg Arg Ala Asp Ile Ser Gly His Gly Glu
1               5                   10                  15

Glu Ala Val Val Asn Ala Ala Asn Ala Lys Gly Thr Val Ser Asp Gly
                20                  25                  30

Val Cys Arg Ala Val Ala Lys Lys Trp Pro Ser Ser Phe Lys Gly Ala
            35                  40                  45

Ala Thr Pro Val Gly Thr Ala Lys Met Ile Arg Ala Asp Gly Met Thr
        50                  55                  60

Val Ile His Ala Val Gly Pro Asn Phe Ser Thr Val Thr Glu Ala Glu
65                  70                  75                  80

Gly Asp Arg Glu Leu Ala Ala Ala Tyr Arg Ala Val Ala Ser Ile Ile
                85                  90                  95

Ser Thr Asn Asn Ile Lys Ser Val Ala Val Pro Leu Leu Ser Thr Gly
                100                 105                 110

Thr Phe Ser Gly Gly Lys Asp Arg Val Met Gln Ser Leu Asn His Leu
            115                 120                 125

Phe Thr Ala Leu Asp Ala Thr Asp Ala Asp Val Val Ile Tyr Cys Arg
        130                 135                 140

Asp Lys Asn Trp Glu Lys Lys Ile Gln Glu Ala Ile Asp Arg Arg Thr
145                 150                 155                 160

Ala Ile Glu Leu Val Ser Glu Asp Val Thr Leu Glu Thr Asp Leu Val
                165                 170                 175

Arg Val His Pro Asp Ser Cys Leu Val Gly Arg Asn Gly Tyr Ser Ala
            180                 185                 190
```

```
Thr Asp Gly Lys Leu Tyr Ser Tyr Leu Glu Gly Thr Arg Phe His Gln
            195                 200                 205

Thr Ala Val Asp Met Ala Glu Ile Ser Thr Leu Trp Pro Arg Leu Gln
    210                 215                 220

Asp Ala Asn Glu Gln Ile Cys Leu Tyr Ala Leu Gly Glu Thr Met Asp
225                 230                 235                 240

Ser Ile Arg Thr Lys Cys Pro Val Glu Asp Ala Asp Ser Ser Thr Pro
                245                 250                 255

Pro Lys Thr Val Pro Cys Leu Cys Arg Tyr Ala Met Thr Ala Glu Arg
            260                 265                 270

Val Ala Arg Leu Arg Met Asn Asn Thr Lys Asn Ile Ile Val Cys Ser
        275                 280                 285

Ser Phe Pro Leu Pro Lys Tyr Arg Ile Glu Gly Val Gln Lys Val Lys
    290                 295                 300

Cys Asp Arg Val Leu Ile Phe Asp Gln Thr Val Pro Ser Leu Val Ser
305                 310                 315                 320

Pro Arg Lys Tyr Ile Gln Gln Pro Pro Glu Gln Leu Asp Asn Val Ser
                325                 330                 335

Leu Thr Ser Thr Thr Ser Thr Gly Ser Ala Trp Ser Phe Pro Ser Glu
            340                 345                 350

Thr Thr Tyr Glu Thr Met Glu Val Val Ala Glu Val His Thr Glu Pro
        355                 360                 365

Pro Ile Pro Pro Pro Arg Arg Arg Ala Ala Val Ala Gln Leu Arg
    370                 375                 380

Gln Asp Leu Glu Val Thr Glu Glu Ile Glu Pro Tyr Val Ile Gln Gln
385                 390                 395                 400

Ala Glu Ile Met Val Met Glu Arg Val Ala Thr Thr Asp Ile Arg Ala
                405                 410                 415

Ile Pro Val Pro Ala Arg Arg Ala Ile Thr Met Pro Val Pro Ala Pro
            420                 425                 430

Ser Val Arg Lys Val Ala Thr Glu Pro Pro Leu Glu Pro Glu Ala Pro
        435                 440                 445

Ile Pro Ala Pro Arg Lys Arg Arg Thr Thr Gly Thr Thr Pro His
    450                 455                 460

Asn Pro Glu Asp Phe Val Pro Arg Val Pro Val Glu Leu Pro Trp Glu
465                 470                 475                 480

Pro Glu Asp Leu Asp Ile Gln Phe Gly Asp Leu Glu Pro Arg Arg Arg
                485                 490                 495

Asn Thr Arg Asp Arg Asp Val Ser Thr Gly Ile Gln Phe Gly Asp Ile
            500                 505                 510

Asp Phe Asn Gln Ser Leu Gly Arg Ala Gly Ala
    515                 520

<210> SEQ ID NO 19
<211> LENGTH: 611
<212> TYPE: PRT
<213> ORGANISM: Unknown
<220> FEATURE:
<223> OTHER INFORMATION: Alphavirus M1 NS4 protein

<400> SEQUENCE: 19

Tyr Ile Phe Ser Ser Asp Thr Gly Pro Gly His Leu Gln Gln Lys Ser
1               5                   10                  15

Val Arg Gln His Glu Leu Pro Cys Glu Thr Leu Tyr Ala His Glu Asp
            20                  25                  30
```

-continued

```
Glu Arg Ile Tyr Pro Pro Ala Phe Asp Gly Lys Glu Lys Val Leu
         35                  40                  45
Gln Ala Lys Met Gln Met Ala Pro Thr Glu Ala Asn Lys Ser Arg Tyr
 50                  55                  60
Gln Ser Arg Lys Val Glu Asn Met Lys Ala Leu Ile Val Glu Arg Leu
 65                  70                  75                  80
Arg Glu Gly Ala Lys Met Tyr Leu His Glu Gln Thr Asp Lys Val Pro
                 85                  90                  95
Thr Tyr Thr Ser Lys Tyr Pro Arg Pro Val Tyr Ser Pro Ser Val Asp
             100                 105                 110
Asp Ser Leu Ser Asp Pro Glu Val Ala Val Ala Ala Cys Asn Ser Phe
             115                 120                 125
Leu Glu Glu Asn Tyr Pro Thr Val Ala Asn Tyr Gln Ile Thr Asp Glu
    130                 135                 140
Tyr Asp Ala Tyr Leu Asp Leu Val Asp Gly Ser Glu Ser Cys Leu Asp
145                 150                 155                 160
Arg Ala Thr Phe Cys Pro Ala Lys Leu Arg Cys Tyr Pro Lys His His
                 165                 170                 175
Ala Tyr His Gln Pro Gln Ile Arg Ser Ala Val Pro Ser Pro Phe Gln
             180                 185                 190
Asn Thr Leu Gln Asn Val Leu Ala Ala Ala Thr Lys Arg Asn Cys Asn
             195                 200                 205
Val Thr Gln Met Arg Glu Leu Pro Thr Met Asp Ser Ala Val Phe Asn
    210                 215                 220
Val Glu Ser Phe Lys Lys Tyr Ala Cys Thr Gly Glu Tyr Trp Gln Glu
225                 230                 235                 240
Phe Lys Asp Asn Pro Ile Arg Ile Thr Thr Glu Asn Ile Thr Thr Tyr
                 245                 250                 255
Val Ala Lys Leu Lys Gly Pro Lys Ala Ala Leu Phe Ala Lys Thr
             260                 265                 270
His Asn Leu Val Pro Leu Gln Glu Val Pro Met Asp Arg Phe Val Met
             275                 280                 285
Asp Met Lys Arg Asp Val Lys Val Thr Pro Gly Thr Lys His Thr Glu
    290                 295                 300
Glu Arg Pro Lys Val Gln Val Ile Gln Ala Ala Glu Pro Leu Ala Thr
305                 310                 315                 320
Ala Tyr Leu Cys Gly Ile His Arg Glu Leu Val Arg Arg Leu Lys Ala
                 325                 330                 335
Val Leu Thr Pro Asn Ile His Thr Leu Phe Asp Met Ser Ala Glu Asp
             340                 345                 350
Phe Asp Ala Ile Ile Ala Ala His Phe Gln Pro Gly Asp Ala Val Leu
             355                 360                 365
Glu Thr Asp Ile Ala Ser Phe Asp Lys Ser Gln Asp Asp Ser Leu Ala
    370                 375                 380
Leu Thr Ala Leu Met Leu Leu Glu Asp Leu Gly Val Asp Gln Glu Leu
385                 390                 395                 400
Leu Asp Leu Ile Glu Ala Ala Phe Gly Glu Ile Thr Ser Val His Leu
                 405                 410                 415
Pro Thr Gly Thr Arg Phe Lys Phe Gly Ala Met Met Lys Ser Gly Met
             420                 425                 430
Phe Leu Thr Leu Phe Ile Asn Thr Leu Leu Asn Ile Val Ile Ala Cys
             435                 440                 445
```

```
Arg Val Leu Arg Asp Lys Leu Ser Ser Ser Ala Cys Ala Ala Phe Ile
            450                 455                 460

Gly Asp Asp Asn Ile Val His Gly Val Arg Ser Asp Pro Leu Met Ala
465                 470                 475                 480

Glu Arg Cys Ala Ser Trp Val Asn Met Glu Val Lys Ile Ile Asp Ala
                485                 490                 495

Thr Met Cys Glu Lys Pro Pro Tyr Phe Cys Gly Gly Phe Ile Leu Tyr
            500                 505                 510

Asp Ser Val Ala Gly Thr Ala Cys Arg Val Ala Asp Pro Leu Lys Arg
            515                 520                 525

Leu Phe Lys Leu Gly Lys Pro Leu Pro Ala Asp Asp Asn Gln Asp Glu
            530                 535                 540

Asp Arg Arg Arg Ala Leu Lys Asp Glu Thr Val Lys Trp Ser Arg Ile
545                 550                 555                 560

Gly Leu Arg Glu Glu Leu Asp Val Ala Leu Ser Ser Arg Tyr Gln Val
                565                 570                 575

Ser Gly Val Gly Asn Ile Thr Arg Ala Met Ser Thr Leu Ser Lys Asn
            580                 585                 590

Leu Lys Ser Phe Arg Lys Ile Arg Gly Pro Ile Ile His Leu Tyr Gly
            595                 600                 605

Gly Pro Lys
    610

<210> SEQ ID NO 20
<211> LENGTH: 267
<212> TYPE: PRT
<213> ORGANISM: Unknown
<220> FEATURE:
<223> OTHER INFORMATION: Alphavirus M1 C protein

<400> SEQUENCE: 20

Met Asn Tyr Ile Pro Thr Gln Thr Phe Tyr Gly Arg Arg Trp Arg Pro
1               5                   10                  15

Arg Pro Ala Phe Arg Pro Trp Arg Val Pro Met Gln Pro Ala Pro Pro
            20                  25                  30

Met Ile Pro Glu Leu Gln Thr Pro Ile Val Gln Ala Gln Gln Met Gln
            35                  40                  45

Gln Leu Ile Ser Ala Val Ser Ala Leu Thr Thr Lys Gln Asn Gly Lys
        50                  55                  60

Ala Pro Lys Lys Pro Lys Lys Pro Gln Lys Ala Lys Ala Lys Lys
65                  70                  75                  80

Asn Glu Gln Gln Lys Lys Asn Glu Asn Lys Lys Pro Pro Lys Gln
                85                  90                  95

Lys Asn Pro Ala Lys Lys Lys Pro Gly Lys Arg Glu Arg Met Cys
            100                 105                 110

Met Lys Ile Glu Asn Asp Cys Ile Phe Glu Val Lys Leu Asp Gly Lys
            115                 120                 125

Val Thr Gly Tyr Ala Cys Leu Val Gly Asp Lys Val Met Lys Pro Ala
130                 135                 140

His Val Lys Gly Val Ile Asp Asn Pro Asp Leu Ala Lys Leu Thr Tyr
145                 150                 155                 160

Lys Lys Ser Ser Lys Tyr Asp Leu Glu Cys Ala Gln Ile Pro Val His
                165                 170                 175

Met Lys Ser Asp Ala Ser Lys Tyr Thr His Glu Lys Pro Glu Gly His
            180                 185                 190
```

Tyr Asn Trp His His Gly Ala Val Gln Tyr Ser Gly Gly Arg Phe Thr
            195                 200                 205

Ile Pro Thr Gly Ala Gly Lys Pro Gly Asp Ser Gly Arg Pro Ile Phe
        210                 215                 220

Asp Asn Lys Gly Arg Val Val Ala Ile Val Leu Gly Gly Ala Asn Glu
225                 230                 235                 240

Gly Ala Arg Thr Ala Leu Ser Val Val Thr Trp Thr Lys Asp Met Val
                245                 250                 255

Thr Arg Tyr Thr Pro Glu Gly Thr Glu Glu Trp
            260                 265

<210> SEQ ID NO 21
<211> LENGTH: 49
<212> TYPE: DNA
<213> ORGANISM: Artificial sequence
<220> FEATURE:
<223> OTHER INFORMATION: Synthetic construct 5173

<400> SEQUENCE: 21
ttgaccagac cgtcccgtca ctagtaagtc ccagaaagta catacagca        49

<210> SEQ ID NO 22
<211> LENGTH: 23
<212> TYPE: DNA
<213> ORGANISM: Artificial sequence
<220> FEATURE:
<223> OTHER INFORMATION: Synthetic construct 5230

<400> SEQUENCE: 22
acttccaggg tttcgtaggt cgt        23

<210> SEQ ID NO 23
<211> LENGTH: 48
<212> TYPE: DNA
<213> ORGANISM: Artificial sequence
<220> FEATURE:
<223> OTHER INFORMATION: Synthetic construct 4907

<400> SEQUENCE: 23
actccaagat gctaacgagc agatctgcct gtacgcccta ggggagac        48

<210> SEQ ID NO 24
<211> LENGTH: 23
<212> TYPE: DNA
<213> ORGANISM: Artificial sequence
<220> FEATURE:
<223> OTHER INFORMATION: Synthetic construct 5298

<400> SEQUENCE: 24
acgacctacg aaaccctgga agt        23

<210> SEQ ID NO 25
<211> LENGTH: 58
<212> TYPE: DNA
<213> ORGANISM: Artificial sequence
<220> FEATURE:
<223> OTHER INFORMATION: Synthetic construct 7104

<400> SEQUENCE: 25
ctgacttcat catagcaccg aatttaaatc ttgtaccggt aggtagatgc acactcgt        58

<210> SEQ ID NO 26
<211> LENGTH: 54

<210> SEQ ID NO 26
<211> LENGTH: 54
<212> TYPE: DNA
<213> ORGANISM: Artificial sequence
<220> FEATURE:
<223> OTHER INFORMATION: Synthetic construct 9420

<400> SEQUENCE: 26
cgggctacta cgacctgctc gaggccacga tgacgtgtaa caacagtgca cgcc    54

<210> SEQ ID NO 27
<211> LENGTH: 58
<212> TYPE: DNA
<213> ORGANISM: Artificial sequence
<220> FEATURE:
<223> OTHER INFORMATION: Synthetic construct 9510

<400> SEQUENCE: 27
ttgtagacat tgaagtggtt cgtcacactg cgacggtggc gtgcactgtt gttacacg    58

<210> SEQ ID NO 28
<211> LENGTH: 25
<212> TYPE: DNA
<213> ORGANISM: Artificial sequence
<220> FEATURE:
<223> OTHER INFORMATION: Synthetic construct 9486

<400> SEQUENCE: 28
tgacgaacca cttcaatgtc tacaa    25

<210> SEQ ID NO 29
<211> LENGTH: 45
<212> TYPE: DNA
<213> ORGANISM: Artificial sequence
<220> FEATURE:
<223> OTHER INFORMATION: Synthetic construct 10521

<400> SEQUENCE: 29
ggtttgcctt cagttgtcag ctgggcccac aagcgcacgg gtggg    45

<210> SEQ ID NO 30
<211> LENGTH: 64
<212> TYPE: PRT
<213> ORGANISM: Unknown
<220> FEATURE:
<223> OTHER INFORMATION: Alphavirus M1 E3 protein

<400> SEQUENCE: 30

Ser Ala Ala Leu Met Met Cys Val Leu Ala Asn Val Thr Phe Pro Cys
1               5                   10                  15

Ser Glu Pro Ala Cys Ala Pro Cys Cys Tyr Glu Lys Gln Pro Glu Gln
            20                  25                  30

Thr Leu Arg Met Leu Glu Asp Asn Val Asp Arg Pro Gly Tyr Tyr Asp
        35                  40                  45

Leu Leu Glu Ala Thr Met Thr Cys Asn Asn Ser Ala Arg His Arg Arg
    50                  55                  60

<210> SEQ ID NO 31
<211> LENGTH: 422
<212> TYPE: PRT
<213> ORGANISM: Unknown
<220> FEATURE:
<223> OTHER INFORMATION: Alphavirus M1 E2 protein

<400> SEQUENCE: 31

Ser Val Thr Glu His Phe Asn Val Tyr Lys Ala Thr Lys Pro Tyr Leu
1               5                   10                  15

```
Ala Tyr Cys Ala Asp Cys Gly Asp Gly Gln Phe Cys Tyr Ser Pro Val
            20              25              30

Ala Ile Glu Lys Ile Arg Asp Glu Ala Ser Asp Gly Met Ile Lys Ile
            35              40              45

Gln Val Ala Ala Gln Ile Gly Ile Asn Lys Gly Thr His Glu His
50              55              60

Ser Lys Ile Arg Tyr Ile Ala Gly His Asp Met Lys Glu Ala Asn Arg
65              70              75              80

Asp Ser Leu Gln Val His Thr Ser Gly Val Cys Ala Ile Arg Gly Thr
                85              90              95

Met Gly His Phe Ile Val Ala Tyr Cys Pro Gly Gly Glu Leu Lys
            100             105             110

Val Gln Phe Gln Asp Ala Glu Ser His Thr Gln Ala Cys Lys Val Gln
            115             120             125

Tyr Lys His Ala Pro Ala Pro Val Gly Arg Glu Lys Phe Thr Val Arg
            130             135             140

Pro His Phe Gly Ile Glu Val Pro Cys Thr Thr Tyr Gln Leu Thr Thr
145             150             155             160

Ala Pro Thr Glu Glu Glu Ile Tyr Met His Thr Pro Pro Asp Ile Pro
                165             170             175

Asp Ile Thr Leu Leu Ser Gln Arg Ser Gly Asn Val Lys Ile Thr Ala
            180             185             190

Gly Gly Lys Thr Ile Arg Tyr Asn Cys Thr Cys Gly Ser Gly Asn Val
            195             200             205

Gly Thr Thr Ser Ser Asp Lys Thr Ile Asn Ser Cys Lys Ile Ala Gln
    210             215             220

Cys His Ala Ala Val Thr Asn His Asp Lys Trp Gln Tyr Thr Ser Ser
225             230             235             240

Phe Val Pro Arg Ala Asp Gln Leu Ser Arg Lys Gly Lys Val His Val
            245             250             255

Pro Phe Pro Leu Thr Asn Ser Thr Cys Arg Val Pro Leu Ala Arg Ala
            260             265             270

Pro Gly Val Thr Tyr Gly Lys Arg Glu Leu Thr Val Lys Leu His Pro
            275             280             285

Asp His Pro Thr Leu Leu Thr Tyr Arg Ser Leu Gly Ala Asp Pro Arg
            290             295             300

Pro Tyr Glu Glu Trp Ile Asp Arg Tyr Val Glu Arg Thr Ile Pro Val
305             310             315             320

Thr Glu Asp Gly Ile Glu Tyr Arg Trp Gly Asn Asn Pro Pro Val Arg
                325             330             335

Leu Trp Ala Gln Leu Thr Thr Gly Lys Pro His Gly Trp Pro His
            340             345             350

Glu Ile Ile Leu Tyr Tyr Tyr Gly Leu Tyr Pro Ala Ala Thr Ile Val
            355             360             365

Ala Val Ser Ala Ala Cys Leu Ala Val Leu Ser Leu Leu Ala Ser
            370             375             380

Cys Tyr Met Phe Ala Thr Ala Arg Arg Lys Cys Leu Thr Pro Tyr Ala
385             390             395             400

Leu Thr Pro Gly Ala Val Val Pro Val Thr Leu Gly Val Leu Cys Cys
                405             410             415

Ala Pro Arg Ala His Ala
            420
```

<210> SEQ ID NO 32
<211> LENGTH: 61
<212> TYPE: PRT
<213> ORGANISM: Unknown
<220> FEATURE:
<223> OTHER INFORMATION: Alphavirus M1 6K protein

<400> SEQUENCE: 32

```
Ala Ser Phe Ala Glu Ser Met Ala Tyr Leu Trp Asp Glu Asn Gln Thr
1               5                   10                  15

Leu Phe Trp Leu Glu Leu Ala Thr Pro Leu Ala Ala Ile Ile Ile Leu
            20                  25                  30

Val Cys Cys Leu Lys Asn Leu Leu Cys Cys Cys Lys Pro Leu Ser Phe
        35                  40                  45

Leu Val Leu Val Ser Leu Gly Thr Pro Val Val Lys Ser
    50                  55                  60
```

<210> SEQ ID NO 33
<211> LENGTH: 438
<212> TYPE: PRT
<213> ORGANISM: Unknown
<220> FEATURE:
<223> OTHER INFORMATION: Alphavirus M1 E1 protein

<400> SEQUENCE: 33

```
Tyr Glu His Thr Ala Thr Ile Pro Asn Val Val Gly Phe Pro Tyr Lys
1               5                   10                  15

Ala His Ile Glu Arg Asn Gly Phe Ser Pro Met Thr Leu Gln Leu Glu
            20                  25                  30

Val Leu Gly Thr Ser Leu Glu Pro Thr Leu Asn Leu Glu Tyr Ile Thr
        35                  40                  45

Cys Glu Tyr Lys Thr Val Val Pro Ser Pro Tyr Ile Lys Cys Cys Gly
    50                  55                  60

Thr Ser Glu Cys Arg Ser Met Glu Arg Pro Asp Tyr Gln Cys Gln Val
65                  70                  75                  80

Tyr Thr Gly Val Tyr Pro Phe Met Trp Gly Gly Ala Tyr Cys Phe Cys
                85                  90                  95

Asp Thr Glu Asn Thr Gln Leu Ser Glu Ala Tyr Val Asp Arg Ser Asp
            100                 105                 110

Val Cys Lys His Asp His Ala Ala Ala Tyr Lys Ala His Thr Ala Ala
        115                 120                 125

Met Lys Ala Thr Ile Arg Ile Ser Tyr Gly Asn Leu Asn Gln Thr Thr
    130                 135                 140

Thr Ala Phe Val Asn Gly Glu His Thr Val Thr Val Gly Gly Ser Arg
145                 150                 155                 160

Phe Thr Phe Gly Pro Ile Ser Thr Ala Trp Thr Pro Phe Asp Asn Lys
                165                 170                 175

Ile Val Val Tyr Lys Asn Asp Val Tyr Asn Leu Asp Phe Pro Pro Tyr
            180                 185                 190

Gly Ser Gly Gln Pro Gly Arg Phe Gly Asp Ile Gln Ser Arg Thr Val
        195                 200                 205

Glu Ser Lys Asp Leu Tyr Ala Asn Thr Ala Leu Lys Leu Ser Arg Pro
    210                 215                 220

Ser Ser Gly Thr Val His Val Pro Tyr Thr Gln Thr Pro Ser Gly Phe
225                 230                 235                 240

Lys Tyr Trp Ile Lys Glu Arg Gly Thr Ser Leu Asn Asp Lys Ala Pro
                245                 250                 255
```

```
Phe Gly Cys Val Ile Lys Thr Asn Pro Val Arg Ala Glu Asn Cys Ala
            260                 265                 270

Val Gly Asn Ile Pro Val Ser Met Asp Ile Pro Asp Ser Ala Phe Thr
            275                 280                 285

Arg Val Ile Asp Ala Pro Ala Val Thr Asn Leu Glu Cys Gln Val Ala
            290                 295                 300

Val Cys Thr His Ser Ser Asp Phe Gly Gly Ile Ala Thr Leu Thr Phe
305                 310                 315                 320

Lys Thr Asp Lys Pro Gly Lys Cys Ala Val His Ser His Ser Asn Val
                325                 330                 335

Ala Thr Ile Gln Glu Ala Ala Val Asp Ile Lys Thr Asp Gly Lys Ile
            340                 345                 350

Thr Leu His Phe Ser Thr Ala Ser Ala Ser Pro Ala Phe Lys Val Ser
            355                 360                 365

Val Cys Ser Ala Lys Thr Thr Cys Met Ala Ala Cys Glu Pro Pro Lys
370                 375                 380

Asp His Ile Val Pro Tyr Gly Ala Ser His Asn Asn Gln Val Phe Pro
385                 390                 395                 400

Asp Met Ser Gly Thr Ala Met Thr Trp Val Gln Arg Val Ala Gly Gly
                405                 410                 415

Phe Gly Gly Leu Thr Leu Ala Ala Val Ala Val Leu Ile Leu Val Thr
                420                 425                 430

Cys Val Thr Met Arg Arg
            435
```

```
<210> SEQ ID NO 34
<211> LENGTH: 48
<212> TYPE: DNA
<213> ORGANISM: Artificial Sequence
<220> FEATURE:
<223> OTHER INFORMATION: Synthetic construct NS3 protein consensus
      sequence

<400> SEQUENCE: 34
tccatcggaa acgacctacg aaaccctgga agtcgtagcc gaggtaca              48

<210> SEQ ID NO 35
<211> LENGTH: 48
<212> TYPE: DNA
<213> ORGANISM: Artificial Sequence
<220> FEATURE:
<223> OTHER INFORMATION: Synthetic construct rM1-E2M-NS3seq.abi

<400> SEQUENCE: 35
tccatcggaa acgacctacg aaaccatgga agtcgtagcc gaggtaca              48

<210> SEQ ID NO 36
<211> LENGTH: 48
<212> TYPE: DNA
<213> ORGANISM: Artificial Sequence
<220> FEATURE:
<223> OTHER INFORMATION: Synthetic construct C6V1-NS3sep.abi

<400> SEQUENCE: 36
tccatcggaa acgacctacg aaaccctgga agtcgtagcc gaggtaca              48

<210> SEQ ID NO 37
<211> LENGTH: 48
<212> TYPE: DNA
<213> ORGANISM: Artificial Sequence
```

<220> FEATURE:
<223> OTHER INFORMATION: Synthetic construct rM1-N3E2M-NS3seq.abi

<400> SEQUENCE: 37
tccatcggaa acgacctacg aaaccctgga agtcgtagcc gaggtaca         48

<210> SEQ ID NO 38
<211> LENGTH: 48
<212> TYPE: DNA
<213> ORGANISM: Artificial Sequence
<220> FEATURE:
<223> OTHER INFORMATION: Synthetic construct rM1-NS3M-NS3seq.abi

<400> SEQUENCE: 38
tccatcggaa acgacctacg aaaccctgga agtcgtagcc gaggtaca         48

<210> SEQ ID NO 39
<211> LENGTH: 48
<212> TYPE: DNA
<213> ORGANISM: Artificial Sequence
<220> FEATURE:
<223> OTHER INFORMATION: Synthetic construct E2 protein consensus
      sequence

<400> SEQUENCE: 39
gtgcacgcca ccgtcgcagt gtgacgaacc acttcaatgt ctacaagg         48

<210> SEQ ID NO 40
<211> LENGTH: 48
<212> TYPE: DNA
<213> ORGANISM: Artificial Sequence
<220> FEATURE:
<223> OTHER INFORMATION: Synthetic construct rM1-E2M-E2seq.abi

<400> SEQUENCE: 40
gtgcacgcca ccgtcgcagt gtgacgaacc acttcaatgt ctacaagg         48

<210> SEQ ID NO 41
<211> LENGTH: 48
<212> TYPE: DNA
<213> ORGANISM: Artificial Sequence
<220> FEATURE:
<223> OTHER INFORMATION: Synthetic construct rM1-N3E2M-E2seq.abi

<400> SEQUENCE: 41
gtgcacgcca ccgtcgcagt gtgacgaacc acttcaatgt ctacaagg         48

<210> SEQ ID NO 42
<211> LENGTH: 48
<212> TYPE: DNA
<213> ORGANISM: Artificial Sequence
<220> FEATURE:
<223> OTHER INFORMATION: Synthetic construct C6V1-E2seq.abi

<400> SEQUENCE: 42
gtgcacgcca ccgtcgcagt gtgacggacc acttcaatgt ctacaagg         48

<210> SEQ ID NO 43
<211> LENGTH: 48
<212> TYPE: DNA
<213> ORGANISM: Artificial Sequence
<220> FEATURE:
<223> OTHER INFORMATION: Synthetic construct rM1-NS3M-E2seq.abi

```
<400> SEQUENCE: 43
gtgcacgcca ccgtcgcagt gtgacgaaac acttcaatgt ctacaagg                          48
```